US009038981B2

(12) United States Patent
Hoshihara et al.

(10) Patent No.: US 9,038,981 B2
(45) Date of Patent: May 26, 2015

(54) SEAT APPARATUS FOR VEHICLE

(71) Applicant: AISIN SEIKI KABUSHIKI KAISHA, Kariya-shi (JP)

(72) Inventors: Naoaki Hoshihara, Obu (JP); Eiichiro Tsuji, Kariya (JP); Mikihito Nagura, Okazaki (JP); Yukifumi Yamada, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/050,868

(22) Filed: Oct. 10, 2013

(65) Prior Publication Data

US 2014/0110553 A1  Apr. 24, 2014

(30) Foreign Application Priority Data

Oct. 19, 2012 (JP) ................................. 2012-232223
Oct. 19, 2012 (JP) ................................. 2012-232225
Nov. 1, 2012 (JP) ................................. 2012-241899

(51) Int. Cl.
*B60N 2/06* (2006.01)
*B60N 2/07* (2006.01)
*B60N 2/08* (2006.01)

(52) U.S. Cl.
CPC ............... *B60N 2/06* (2013.01); *B60N 2/0727* (2013.01); *B60N 2/0705* (2013.01); *B60N 2/0715* (2013.01); *B60N 2/0818* (2013.01); *B60N 2/085* (2013.01)

(58) Field of Classification Search
CPC ........ B60N 2/06; B60N 2/0727; B60N 2/075; B60N 2/0715; B60N 2/08; B60N 2/0818; B60N 2/085
See application file for complete search history.

(56) References Cited

U.S. PATENT DOCUMENTS

2012/0205512 A1* 8/2012 Fujishiro et al. ............... 248/429
2014/0353454 A1* 12/2014 Yamada et al. ............... 248/430

FOREIGN PATENT DOCUMENTS

| DE | 20 2007 004 524 U1 | 9/2008 |
| JP | 2000-142188 | 5/2000 |
| JP | 2005-263049 | 9/2005 |
| JP | 2008-184033 | 8/2008 |
| JP | 2010-100077 | 5/2010 |

OTHER PUBLICATIONS

U.S. Appl. No. 14/050,618, filed Oct. 10, 2013, Yamada, et al.
European Search Report dated Mar. 24, 2015 in Europe Patent Application No. 13189244.0.

* cited by examiner

*Primary Examiner* — Amy Sterling
(74) *Attorney, Agent, or Firm* — Oblon, McClelland, Maier & Neustadt, L.L.P.

(57) ABSTRACT

A seat slide apparatus for a vehicle includes a first rail, a second rail, a lock member, a biasing member, the lock member being rotatably connected to the second rail in a state where a support shaft fixed to one of the second rail and the lock member is positioned within an elongated hole formed at the other of the second rail and the lock member to be movable in first and second directions of the relative movement and is biased by a support shaft biasing member in a direction orthogonal to the first and second directions, and a restriction portion restricting the support shaft from moving within the elongated hole in the first and second directions in a case where a load applied in one of the first and second directions is smaller than a predetermined value.

15 Claims, 24 Drawing Sheets

Width direction

Front ←

Front ←　　　　　　　　　　　　　　　　　　　　　　　→ Rear

Width direction

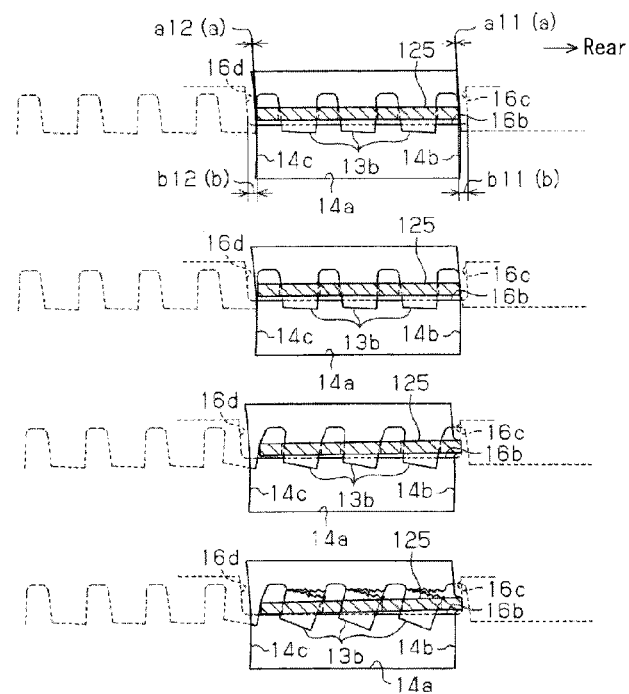

F I G. 16
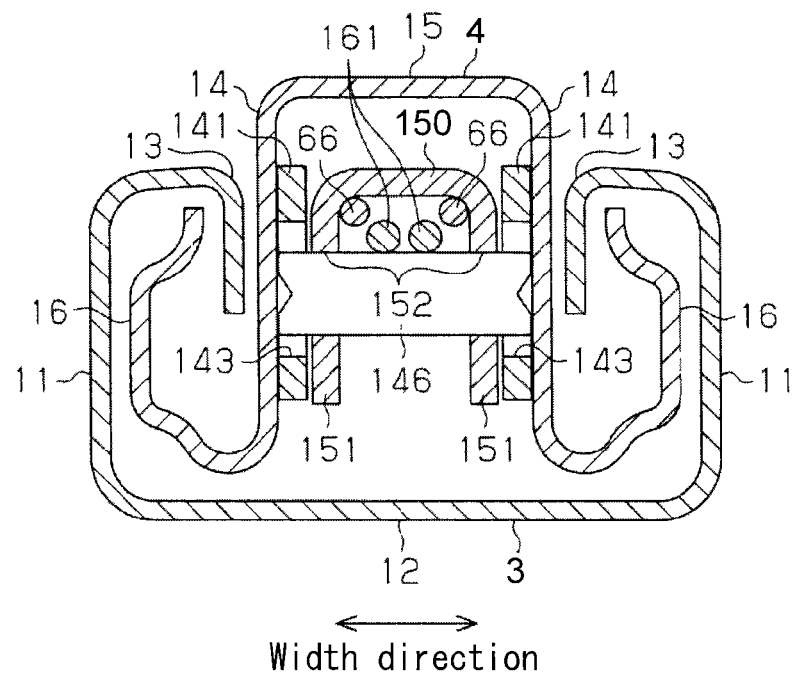
Width direction

SEAT APPARATUS FOR VEHICLE

CROSS REFERENCE TO RELATED APPLICATIONS

This application is based on and claims priority under 35 U.S.C. §119 to Japanese Patent Application 2012-232223, filed on Oct. 19, 2012, Japanese Patent Application 2012-232225, filed on Oct. 19, 2012, and Japanese Patent Application 2012-241899, filed on Nov. 1, 2012, the entire contents of which are incorporated herein by reference.

TECHNICAL FIELD

This disclosure generally relates to a seat slide apparatus for a vehicle.

BACKGROUND DISCUSSION

Various types of seat slide apparatuses for vehicles have been developed, for example, as disclosed in JP2010-100077A and JP2005-263049A. As illustrated in FIG. 25, a seat slide apparatus for a vehicle disclosed in JP2005-263049A, which will be hereinafter referred to as Reference 1, includes a lower rail 101, an upper rail 102 connected to the lower rail 101 to be movable in a longitudinal direction of the lower rail 101, and a lock member 103 arranged within a void formed between the lower rail 101 and the upper rail 102. The lock member 103 is connected, via a pin 104 of which an axis line extends in a width direction of the lower rail 101 and the upper rail 102, to a rivet 105 that is fixed to the upper rail 102 so that the lock member 103 is rotatable in a substantially vertical direction of the vehicle. Locking protrusions 101b each in a sawtooth form are formed at a flange 101a of the lower rail 101. In addition, lock portions 103a each in a square form are formed at the lock member 103. The lock member 103 is biased to move upwardly by a lock spring 106 so that a portion of the locking protrusions 101b of the lower rail 101 engage with the lock portions 103a of the lock member 103. As a result, the movement of the upper rail 102 relative to the lower rail 101 is restricted, i.e., the upper rail 102 is brought to a locked state relative to the lower rail 101. On the other hand, the lock member 103 moves downward against the biasing force of the lock spring 106 by an operation force of an operation member so that the locking protrusions 101b disengage from the respective lock portions 103a. As a result, the locked state of the upper rail 102 relative to the lower rail 101 is released.

In addition, a known seat slide apparatus for a vehicle is disclosed, for example, in JP2008-184033A, which will be hereinafter referred to as Reference 2. As illustrated in FIG. 26, the seat slide apparatus disclosed in Reference 2 includes a lower rail 201, an upper rail 202 connected to the lower rail 201 to be movable in a longitudinal direction of the lower rail 201, and a lock member 203 arranged within a void formed between the lower rail 201 and the upper rail 202. The lock member 203 is connected, via a pin 204 of which an axis line extends in a width direction of the lower rail 201 and the upper rail 202, to a rivet 205 that is fixed to the upper rail 202 so that the lock member 203 is rotatable in a substantially vertical direction of the vehicle. Locking protrusions 201b each in a sawtooth form are formed at a flange 201a of the lower rail 201. In addition, lock portions 203a each in a square form are formed at the lock member 203. The lock member 203 is biased to move upwardly by a lock spring 206 so that a portion of the locking protrusions 201b of the lower rail 201 engage with the lock portions 203a of the lock member 203. As a result, the movement of the upper rail 202 relative to the lower rail 201 is restricted, i.e., the upper rail 202 is brought to a locked state relative to the lower rail 201. On the other hand, the lock member 203 moves downward against the biasing force of the lock spring 206 by an operation force of an operation member so that the locking protrusions 201b disengage from the respective lock portions 203a. As a result, the locked state of the upper rail 202 relative to the lower rail 201 is released. The lock member 203 integrally includes a flat plate portion 203b that includes the lock portions 203a with which the locking protrusions 201b engage respectively. An opening portion 202c is formed at the upper rail 202 by penetrating through inner flanges 202a and outer flanges 202b thereof. The flat plate portion 203b penetrates through the opening portion 202c in the width direction so that the lock member 203 is allowed to move in the substantially vertical direction while rotating. Accordingly, the flat plate portion 230b is arranged at the opening portion 202c while having a clearance with an edge of the opening portion 202c in a longitudinal direction of the upper rail 202, i.e., a moving direction of the upper rail 202, so as to ensure operability of the lock member 203, for example.

Further, a known seat slide apparatus for a vehicle is disclosed, for example, in JP2000-142188A, which will be hereinafter referred to as Reference 3. The seat slide apparatus disclosed in Reference 3 includes a pair of lower rails (left and right lower rails) provided at opposing ends in a width direction of the vehicle, a pair of upper rails (left and right upper rails) connected to the pair of lower rails to be rotatable thereto in a longitudinal direction of the vehicle, and a pair of lock plates serving as lock members rotatably connected to respective side walls of the pair of upper rails. Each of the lock plates includes lock bores at a free end so that a portion of lock teeth formed at each of the lower rails engage with the lock bores. As a result, the movement of the upper rails, i.e., of the seat, is locked and restricted in the longitudinal direction of the vehicle. Lock springs are provided for biasing the respective lock plates in a direction where the movement of the upper rails is restricted. According to the seat slide apparatus disclosed in Reference 3, an operation lever 300 formed in a substantially U-shape in a plan view is provided at a front side of the lock plates as illustrated in FIG. 27. The operation lever 300 includes a handle portion 301 extending in the width direction of the vehicle and a pair of end portions 302 and 303 extending rearward from opposing ends of the handle portion 301. The end portions 302 and 303 are connected to front edges of the lock plates respectively. The operation lever 300 is operated to simultaneously rotate the pair of lock plates against the biasing force of the lock springs. The engagement between the lock bores and the lock teeth is released. The movement of the upper rails in the longitudinal direction is allowed accordingly. At this time, a belt anchor serving as an end portion of a seatbelt is attached to one of the left and right upper rails. In a case where a large load is applied to the belt anchor in the longitudinal direction of the vehicle by a vehicle collision, for example, a left-right asymmetric deformation may occur at a vehicle body, for example, at a vehicle floor. As a result, the left and right upper rails may be relatively distorted or twisted each other. In order to inhibit each of the lock plates to relatively rotate in a direction where the lock teeth disengage from the lock bores because the lock plate holds and maintains the position thereof by rigidity of the operation lever 300, a phase angle absorption means 310 is provided at one corner portion of the operation lever 300 in the width direction. That is, the end portion 303 arranged at a side where the belt anchor is not mounted is rotatably attached, via the phase angle absorption means 310, to a separation portion of the operation lever 100 at which the operation lever 100 is separated.

According to the seat slide apparatus disclosed in Reference 1, in a case where backlash of the upper rail 102 occurs in a moving direction thereof, backlash of a seat to which the upper rail 102 is fixed occurs in the moving direction, which may cause an occupant of the seat to have an uncomfortable feeling. The backlash of the upper rail 102 depends on a clearance between the pin 104 fixed to the lock member 103 and a bearing portion 105a formed at the rivet 105 that is fixed to the upper rail 102. In a case where the clearance between the pin 104 and the bearing portion 105a is reduced so that the restraint of the backlash of the upper rail 102 is given priority, a high accuracy is needed for the pin 104, which may result in a difficult control of the pin 104 (i.e., difficult control of components). On the other hand, in a case where the clearance is enlarged so that the control of the pin 14 (control of the components) is given priority, the backlash of the upper rail 102 is likely to occur. Further, in a case where a large load is input in a moving direction of the vehicle because of a vehicle collision, for example, in a state where the upper rail 102 is in the locked state relative to the lower rail 101 by the lock member 103, the pin 104 is deformed by the aforementioned load applied in the moving direction of the vehicle to the pin 104. The locked state of the movement of the upper rail 102 relative to the lower rail 101 by the lock member 103 may thus become unstable. According to the seat slide apparatus disclosed in Reference 2, in a case where a large load is input in a moving direction of the vehicle because of a vehicle collision, for example, in a state where the upper rail 202 is in the locked state relative to the lower rail 201 by the lock member 203, the pin 204 is first deformed by the aforementioned load applied in the moving direction of the vehicle to the pin 204. In association with the deformation of the pin 204, the edge of the opening portion 202c of the upper rail 202 and the flat plate portion 203b of the lock member 203 make contact with each other to thereby receive the load. Then, because of a stress concentration at locked portions between the locking protrusions 201b and the lock portions 203a, the locking protrusions 201b are deformed to incline in the moving direction of the vehicle so that a contact angle of each of the locking protrusions 201b relative to each of the corresponding lock portions 203a increases. At this time, the lock portions 203a slide on inclination portions of the locking protrusions 201b so that the lock member 203 rotates to move downward. As a result, the locking protrusions 201b substantially disengage from the lock portions 103a, which may rapidly eliminate a holding force for holding the upper rail 202 so as not to move relative to the lower rail 201. According to the seat slide apparatus disclosed in Reference 3, the phase angle absorption means 310 serving as a bearing mechanism is provided at one corner portion of the operation lever 300, which may lead to complex configurations.

A need thus exists for a seat slide apparatus for a vehicle which is not susceptible to the drawback mentioned above.

SUMMARY

According to an aspect of this disclosure, a seat slide apparatus for a vehicle includes a first rail including first and second flanges arranged side by side in a width direction of the first rail, each of the first and second flanges including a plurality of locking protrusions at an end portion, a second rail connected to the first rail to be relatively movable to the first rail, the second rail including first and second inner flanges arranged side by side in the width direction at an inner side of the first and second flanges of the first rail in the width direction, the second rail including first and second outer flanges that are arranged to be extended outwardly from respective ends of the first and second inner flanges in the width direction to separate from each other and are arranged to be folded back at an outer side of the first and second flanges of the first rail in the width direction, the first and second inner flanges including inner opening portions respectively, the first and second outer flanges including outer opening portions respectively, the inner opening portions and the outer opening portions being connected to one another in the width direction, a lock member connected to the second rail to be rotatable about an axis line that extends in the width direction at an inner side of the first and second inner flanges in the width direction, the lock member including a flat plate portion that passes through the inner opening portions and the outer opening portions in the width direction and that includes lock portions with which the locking protrusions are engageable, the lock portions being formed at opposing ends of the flat plate portion in the width direction, the lock member selectively restricting a relative movement between the first rail and the second rail by engagement and disengagement between the lock portions and the corresponding locking protrusions in association with the rotation of the lock member, a biasing member biasing the lock member to rotate in a direction to restrict the relative movement between the first rail and the second rail, the lock member being rotatably connected to the second rail in a state where a support shaft fixed to one of the second rail and the lock member and including the axis line that extends in the width direction is inserted to be positioned within an elongated hole formed at the other of the second rail and the lock member to be movable in first and second directions of the relative movement between the first rail and the second rail and is biased by a support shaft biasing member in a direction orthogonal to the first and second directions of the relative movement between the first rail and the second rail, and a restriction portion restricting the support shaft from moving within the elongated hole in the first and second directions of the relative movement between the first rail and the second rail in a case where a load applied in one of the first and second directions of the relative movement between the first rail and the second rail is smaller than a predetermined value.

According to another aspect of this disclosure, a seat slide apparatus for a vehicle includes a first rail including first and second flanges arranged side by side in a width direction of the first rail, each of the first and second flanges including a plurality of locking protrusions at an end portion, a second rail connected to the first rail to be relatively movable to the first rail, the second rail including first and second inner flanges arranged side by side in the width direction at an inner side of the first and second flanges of the first rail in the width direction, the second rail including first and second outer flanges that are arranged to be extended outwardly from respective ends of the first and second inner flanges in the width direction to separate from each other and are arranged to be folded back at an outer side of the first and second flanges of the first rail in the width direction, the first and second inner flanges including inner opening portions respectively, the first and second outer flanges including outer opening portions respectively, the inner opening portions and the outer opening portions being connected to one another in the width direction, a lock member connected to the second rail to be rotatable about an axis line that extends in the width direction at an inner side of the first and second inner flanges in the width direction, the lock member including a flat plate portion that passes through the inner opening portions and the outer opening portions in the width direction and that includes lock portions with which the locking protrusions are engageable, the lock portions being formed at opposing ends of the flat plate portion in the width direction, the lock member selectively restricting a relative movement between the first rail and the second rail by engagement and disengagement between the lock portions and the corresponding locking protrusions in association with the rotation of the lock member, and a biasing member biasing the lock member to rotate in a direction to restrict the relative movement between the first rail and the second rail. A clearance between each of the first and second outer flanges and the flat plate portion is specified to be greater than a clearance between each of the first and second inner flanges and the flat plate portion in at least one of first and second directions of the relative movement between the first rail and the second rail in a state where the relative movement is locked by the lock member.

According to a further aspect of this disclosure, a seat slide apparatus for a vehicle includes first and second lower rails arranged to be extended in a front/rear direction of a vehicle and arranged at opposing ends in a width direction of the vehicle, first and second upper rails connected to the first and second lower rails to be movable to the first and second lower rails in the front/rear direction, each of the first and second upper rails including first and second inner flanges arranged side by side in the width direction, the first and second inner flanges including inner opening portions respectively that are connected to each other in the width direction, first and second lock members connected to the first and second upper rails respectively, each of the first and second lock members being rotatable about an axis line that extends in the width direction at an inner side of the first and second inner flanges in the width direction, each of the first and second lock members including a flat plate portion that passes through the inner opening portions in the width direction, the first and second lock members selectively restricting a relative movement between the first and second lower rails and the first and second upper rails by rotating to engage and disengage relative to the lower rails, first and second biasing members biasing the first and second lock members to rotate in a direction to restrict the relative movement between the first and second lower rails and the first and second upper rails, an operation handle arranged to be extended in the width direction and including opposing end portions connected to the first and second lock members respectively, the operation handle being configured to transmit an operation force for releasing a locked state of the relative movement between the first and second lower rails and the first and second upper rails, each of the first and second lock members being rotatably connected to each of the first and second upper rails in a state where a support shaft fixed to one of the first or second upper rail and the first or second lock member and including the axis line that extends in the width direction is inserted to be positioned within an elongated hole formed at the other of the first or second upper rail and the first or second lock member to be movable in the front/rear direction of the vehicle and is biased by a support shaft biasing member in a direction orthogonal to the front/rear direction of the vehicle, a wedging portion formed at at least one of the elongated hole and the support shaft biasing member to make pressure-contact with the support shaft, the wedging portion restricting the support shaft from moving in the front/rear direction of the vehicle within the elongated hole in a case where a load applied in the front/rear direction of the vehicle is smaller than a predetermined value, and a resistance generating portion provided at a contact portion between the flat plate portion and each of the first and second inner opening portions obtained in a state where a load applied to at least one of the front and rear directions of the vehicle exceeds the predetermined value, the resistance generating portion rapidly increasing an operation force for releasing the locked state of the relative movement between the first and second lower rails and the first and second upper rails.

According to a still further aspect of this disclosure, a seat slide apparatus for a vehicle includes first and second lower rails arranged to be extended in a front/rear direction of a vehicle and arranged at opposing ends in a width direction of the vehicle, first and second upper rails connected to the first and second lower rails to be movable to the first and second lower rails in the front/rear direction, each of the first and second upper rails including first and second inner flanges arranged side by side in the width direction, the first and second inner flanges including inner opening portions respectively that are connected to each other in the width direction, first and second lock members connected to the first and second upper rails respectively, each of the first and second lock members being rotatable about an axis line that extends in the width direction at an inner side of the first and second inner flanges in the width direction, each of the first and second lock members including a flat plate portion that passes through the inner opening portions in the width direction, the first and second lock members selectively restricting a relative movement between the first and second lower rails and the first and second upper rails by rotating to engage and disengage relative to the lower rails, first and second biasing members biasing the first and second lock members to rotate in a direction to restrict the relative movement between the first and second lower rails and the first and second upper rails, an operation handle arranged to be extended in the width direction and including opposing end portions connected to the first and second lock members respectively, the operation handle being configured to transmit an operation force for releasing a locked state of the relative movement between the first and second lower rails and the first and second upper rails, each of the first and second lock members being rotatably connected to each of the first and second upper rails in a state where a support shaft fixed to one of the first or second upper rail and the first or second lock member and including the axis line that extends in the width direction is inserted to be positioned within an elongated hole formed at the other of the first or second upper rail and the first or second lock member to be movable in the front/rear direction of the vehicle and is biased by a support shaft biasing member in a direction orthogonal to the front/rear direction of the vehicle, a wedging portion formed at at least one of the elongated hole and the support shaft biasing member to make pressure-contact with the support shaft, the wedging portion restricting the support shaft from moving in the front/rear direction of the vehicle within the elongated hole in a case where a load applied in the front/rear direction of the vehicle is smaller than a predetermined value, and first and second negative angle portions causing contact portions between the flat plate portion and the first and second inner opening portions obtained in a state where a load applied to at least one of the front and rear directions of the vehicle exceeds the predetermined value to form a negative angle.

According to a still further aspect of this disclosure, a seat slide apparatus for a vehicle includes first and second lower rails arranged to be extended in a front/rear direction of a vehicle and arranged at opposing ends in a width direction of the vehicle, each of the first and second lower rails including first and second flanges that are arranged side by side in the width direction, each of the first and second flanges including a plurality of locking protrusions at an end portion, first and second upper rails connected to the first and second lower rails to be movable relative to the first and second lower rails, each of the first and second upper rails including first and second inner flanges arranged side by side in the width direction at an inner side of the first and second flanges of each of the first and second lower rails in the width direction, the first and second inner flanges including inner opening portions respectively connected to each other in the width direction, first and second lock members connected to the first and second upper rails to be rotatable about axis lines, each of the axis lines extending in the width direction at an inner side of the first and second inner flanges in the width direction, each of the first and second lock members including a flat plate portion that passes through the inner opening portions in the width direction and that includes lock holes with which the locking protrusions are engageable, the lock holes being formed at opposing ends of the flat plate portion in the width direction, the first and second lock members selectively restricting a relative movement between the first and second lower rails and the first and second upper rails by engagement and disengagement between the lock portions and the corresponding locking protrusions in association with the rotation of the first and second lock members, first and second biasing members biasing the first and second lock members to rotate in a direction to restrict the relative movement between the first and second lower rails and the first and second upper rails, an operation handle arranged to be extended in the width direction and including opposing end portions connected to the first and second lock members respectively, the operation handle being configured to transmit an operation force for releasing a locked state of the relative movement between the first and second lower rails and the first and second upper rails, each of the first and second lock members being rotatably connected to each of the first and second upper rails in a state where a support shaft fixed to one of the first or second upper rail and the first or second lock member and including the axis line that extends in the width direction is inserted to be positioned within an elongated hole formed at the other of the first or second upper rail and the first or second lock member to be movable in the front/rear direction of the vehicle and is biased by a support shaft biasing member in a direction orthogonal to the front/rear direction of the vehicle, a wedging portion formed at at least one of the elongated hole and the support shaft biasing member to make pressure-contact with the support shaft, the wedging portion restricting the support shaft from moving in the front/rear direction of the vehicle within the elongated hole in a case where a load applied in the front/rear direction of the vehicle is smaller than a predetermined value, and a cut portion formed at a contact portion between the flat plate portion and each of the first and second inner opening portions obtained in a state where a load applied to at least one of the front and rear directions of the vehicle exceeds the predetermined value, the cut portion inducing a deformation of at least one of the lock holes with which at least one of the locking protrusions is engaged, the deformation of at least one of the lock holes causing at least one of the locking protrusions to be wound.

BRIEF DESCRIPTION OF THE DRAWINGS

The foregoing and additional features and characteristics of this disclosure will become more apparent from the following detailed description considered with the reference to the accompanying drawings, wherein:

FIG. 16 is a section view taken along line XVI-XVI in FIG. 17A illustrating the seat slide apparatus according to the third embodiment;

DETAILED DESCRIPTION

A first embodiment of this disclosure will be explained. Hereunder, a vehicle front/rear direction will be referred to as "a front/rear direction".

Figure 1:
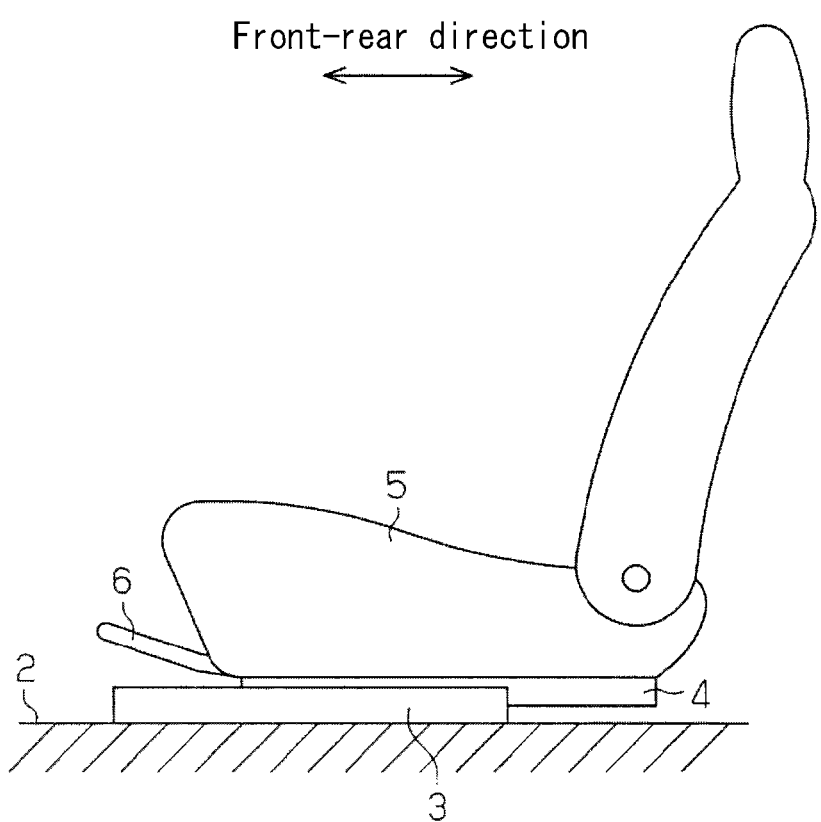
FIG. 1 is a lateral view illustrating a seat for a vehicle at which a seat slide apparatus for a vehicle according to first to sixth embodiments disclosed here is applied.

As illustrated in FIG. 1, a lower rail 3 (i.e., a first rail) is fixed at a vehicle floor 2 so as to extend in the front/rear direction. An upper rail 4 (i.e., a second rail) is attached to or mounted on the lower rail 3 so as to be movable in the front/rear direction relative to the lower rail 3. That is, in this embodiment, a long-side direction (a direction of the relative movement) of the lower rail 3 and the upper rail 4 coincides with the front/rear direction.

The lower rails 3 are provided as a pair and the upper rails 4 are provided as a pair, in a width direction (that is, in FIG. 1, a direction that is orthogonal to a paper surface on which FIG. 1 is drawn). Here, the lower rail 3 and the upper rail 4 which are arranged on the left side when facing the front direction are illustrated. A seat 5, which forms or includes a seating portion for an occupant, is fixedly supported at the upper rails 4. Normally, the relative movement of the lower rails 3 and the upper rails 4 relative to each other is in a locked state, and a release handle 6 for releasing the locked state is provided at the apparatus.

Figure 2:
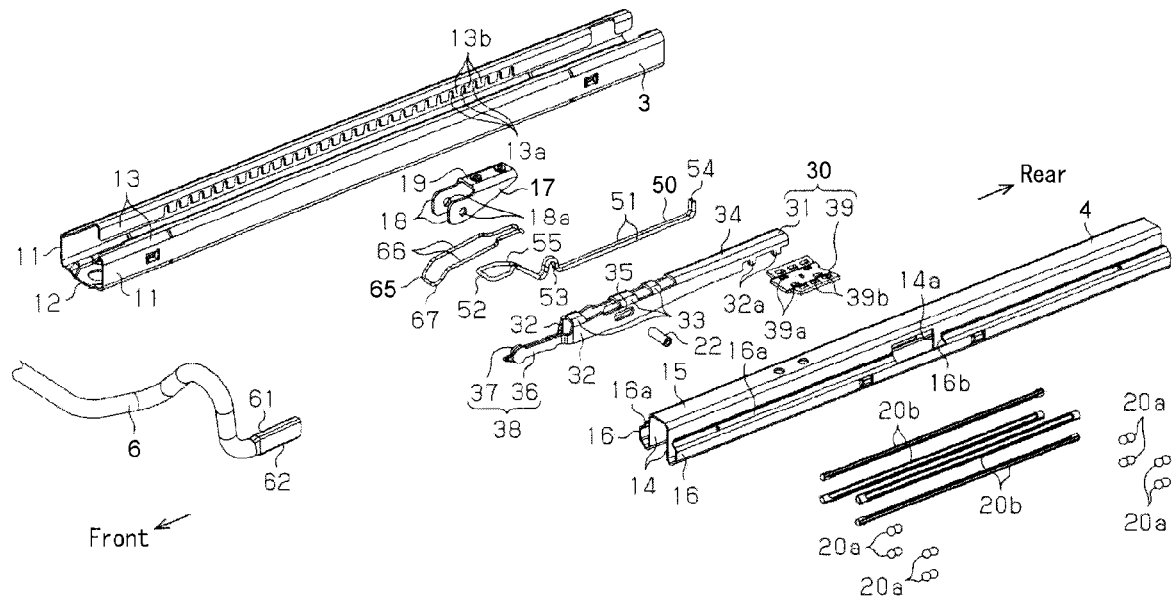
FIG. 2 is an exploded perspective view illustrating the seat slide apparatus according to the first and fourth embodiments.

As illustrated in FIG. 2, the lower rail 3 is made of plate material, and includes a pair of side wall portions 11 and a bottom wall portion 12. The side wall portions 11 are provided at respective sides of the lower rail 3 in the width direction and extend in an up/down direction. The bottom wall portion 12 connects base ends (that is, lower ends) of the respective side wall portions 11 to each other. A flange 13 is continuously formed at a distal end (that is, an upper end) of each of the side wall portions 11. The flange 13 projects inwardly in the width direction and is folded back towards the base end of the corresponding side wall portion 11.

At an intermediate portion in the long-side direction of each of the flanges 13 (i.e., first and second flanges) of the lower rail 3, plural cut-outs 13a are provided. The cut-outs 13a are formed upwardly from a distal end (that is, a lower end) of the flange 13 and are spaced away from each other for a predetermined distance in the long-side direction. A locking protrusion 13b formed in a rectangular-shaped tooth is provided between every adjacent cut-outs 13a. Thus, the plural locking protrusions 13b are arranged at the lower rail 3 in the long-side direction thereof so as to be spaced away from each other by the predetermined distance.

Figure 3A:
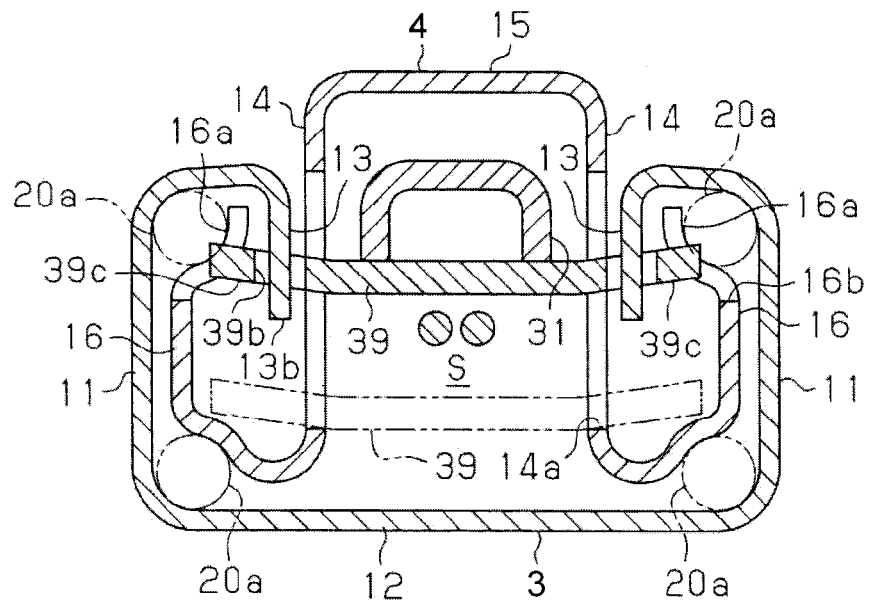
FIG. 3A is a cross-sectional view taken along line IIIA-IIIA in FIG. 4A and FIG. 19A illustrating the seat slide apparatus according to the first and fourth embodiments.
Figure 3B:
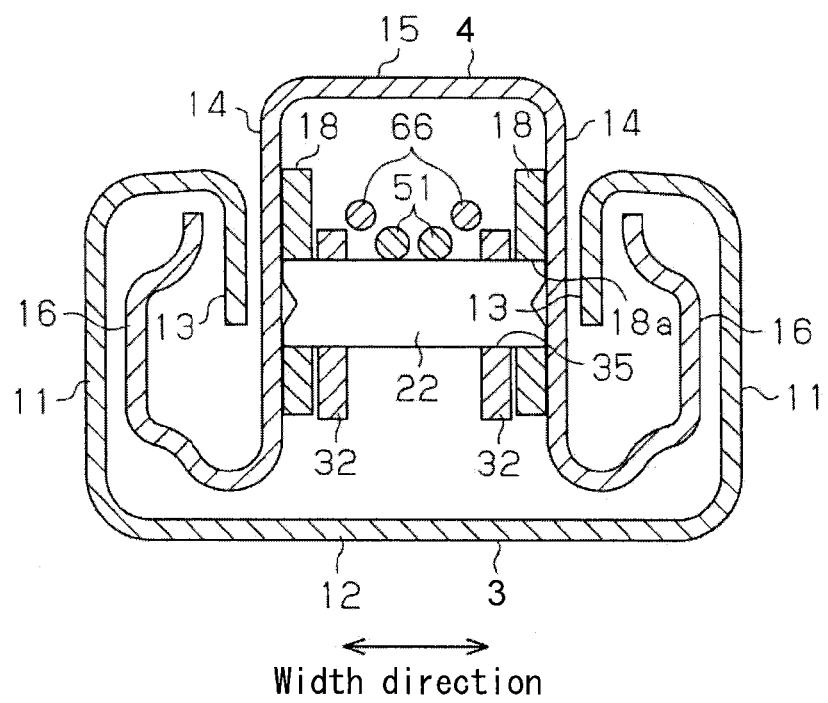
FIG. 3B is a cross-sectional view taken along line IIIB-IIIB in FIG. 4A and FIG. 19A illustrating the seat slide apparatus according to the first and fourth embodiments.

On the other hand, the upper rail 4 is made of plate material, and includes a pair of inner flanges 14 (i.e., first and second inner flanges) and a cover wall portion 15 as illustrated in FIGS. 3A and 3B. The pair of inner flanges 14 is arranged to extend in the up/down direction between the flanges 13 of the lower rail 3. The cover wall portion 15 connects base ends (that is, upper ends), which are away from the lower rail 3, of the inner flanges 14 to each other. An outer flange 16 is continuously formed at a distal end (that is, a lower end) of each of the inner flanges 14. The outer flange 16 projects outwardly in the width direction and is folded back so as to be surrounded by the corresponding side wall portion 11 and the flange 13.

That is, the lower rail 3 includes a rail cross section formed in a shape of a letter U, the upper rail 4 includes a rail cross section formed in a shape of a letter U, and opening sides of the cross sections of the lower rail 3 and the upper rail 4 face each other. The lower rail 3 and the upper rail 4 are prevented from coming off from each other in the up/down direction mainly by means of engagement of the flanges 13 and the outer flanges 16 (i.e., first and second outer flanges) with each other. A rail cross section formed by the lower rail 3 and the upper rail 4 is a so-called box shape including a rectangular shape. The lower rail 3, in cooperation with the upper rail 4, defines a space portion S.

Plurality of balls 20a are arranged so as to be interposed between a lower end portion of each of the outer flanges 16 and the lower end portion of the corresponding side wall portion 11, and between an upper end portion of each of the outer flanges 16 and the upper end portion of the corresponding side wall portion 11. At the upper end portion of each of the outer flanges 16, a guide portion 16a is provided. The guide portion 16a is formed in an arc shape by being bent inwardly in the width direction towards an upper side so that the guide portion 16a matches an outer shape of the ball 20a.

As illustrated in FIG. 2 and FIG. 3, each of the balls 20a is attached to a holder 20b which is made of resin and is arranged to extend in the front/rear direction (that is, a rail long-side direction). The balls 20a are arranged at a front end portion of each holder 20b as a pair and at a rear end portion of each holder 20b as a pair. That is, in this embodiment, for example, four of the balls 20a are arranged at each holder 20b. The upper rail 4 is supported at the lower rail 3 so as to be slidable in the long-side direction (that is, the front/rear direction) relative to the lower rail 3 in a manner that the balls 20a are rolled between the upper rail 4 and the lower rail 3.

An inner opening 14a (i.e., an inner opening portion) formed in a substantially rectangular shape is provided at an intermediate portion, in the long-side direction, of each of the inner flanges 14 of the upper rail 4. An outer opening 16b (i.e., an outer opening portion) formed in a substantially rectangular shape is provided at the upper end portion (that is, the guide portion 16a) of each of the outer flanges 16 of the upper rail 4 so that a position of the outer opening 16b matches a position of the corresponding inner opening 14a in the long-side direction. The inner opening 14a and the outer opening 16b are in communication with each other in the width direction. Specifically, each of the outer openings 16b corresponds to a cut-out which opens also in an upward direction.

A bracket 17 is attached to the cover wall portion 15 of the upper rail 4, at a forward portion relative to the inner opening 14a and the like. The bracket 17 includes a pair of support wall portions 18 extending in the up/down direction between the inner flanges 14 of the upper rail 4, and a ceiling plate portion 19 connecting base ends (that is, upper ends), which are away from the lower rail 3, of the support wall portions 18 to each other. In a state where the support wall portions 18 are interposed between the inner flanges 14 of the upper rail 4 in the width direction, the bracket 17 is fastened to the cover wall portion 15 of the upper rail 4 at the ceiling plate portion 19. A shaft attachment hole 18a formed in a circular shape is provided at a front end lower portion of each of the support wall portions 18. The shaft attachment holes 18a provided at the respective support wall portions 18 are concentric relative to each other and are in communication with each other in the width direction.

As illustrated in FIG. 3B, a support shaft 22 formed in a cylindrical shape is supported at the support wall portions 18 of the bracket 17. End portions of the support shaft 22 are secured at the respective shaft attachment holes 18a by insertion. A central line (i.e., an axis line) of the support shaft 22 extends in the width direction. At an inner side of the support wall portions 18 in the width direction, a lock lever 30 (i.e., a lock member) is rotatably connected to an inside of the upper rail 4 by means of the support shaft 22.

Specifically, as illustrated in FIG. 2, the lock lever 30 includes a stem portion 31 made of plate material extending in the front/rear direction. The stem portion 31 is arranged in a standing condition in a manner that a pair of longitudinal wall portions 32 each extending in the long-side direction of the stem portion 31 are arranged side by side in the width direction. A distance between the longitudinal wall portions 32 in the width direction is set to be smaller than a distance between the support wall portions 18 of the bracket 17 in the width direction. At front end portions of the respective longitudinal wall portions 32, upper end edges of the longitudinal wall portions 32 are connected to each other in the width direction via plural (for example, three) connection walls 33 which are arranged side by side in the front/rear direction. At rear end portions of the respective longitudinal wall portions 32, the upper end edges of the longitudinal wall portions 32 are connected to each other in the width direction via a ceiling plate portion 34.

Figure 4A:
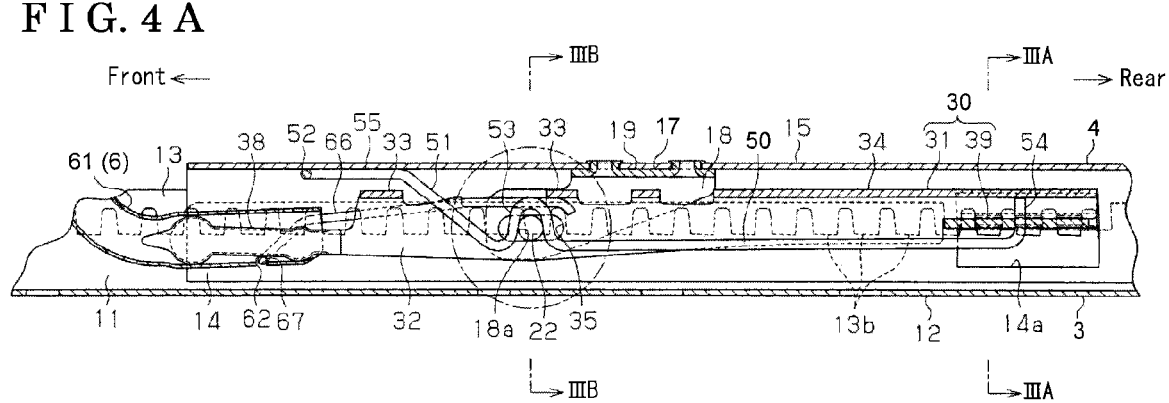
FIG. 4A is a section view illustrating the seat slide apparatus according to the first embodiment.
Figure 4B:
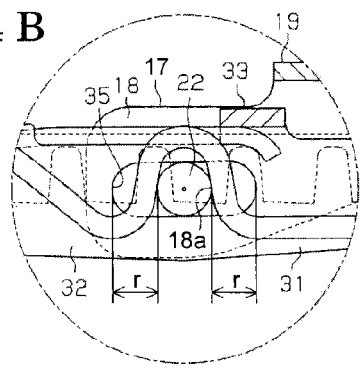
FIG. 4B is an enlarged partial view of FIG. 4A.

As illustrated in FIGS. 4A and 4B, a long hole 35 (i.e., an elongated hole) is provided at each of the longitudinal wall portions 32. The long hole 35 is formed so that the elongated shape thereof extends in the front/rear direction and is provided at a height position which is equivalent to a height position of the support shaft 22 (the shaft attachment holes 18*a*). In this embodiment, the long hole 35 is, for example, a through hole. An opening width of the long hole 35 in a short-side direction (that is, the up/down direction) is set to be equivalent to a diameter of the support shaft 22. The support shaft 22, of which end portions are secured at the respective shaft attachment holes 18*a*, is inserted in the long holes 35 (i.e., is inserted to be positioned within the long holes 35) in a state where the longitudinal wall portions 32 of the stem portion 31 are interposed between the support wall portions 18 of the bracket 17 in the width direction. Thus, the stem portion 31 is connected to the upper rail 4 (the bracket 17) so as to be rotatable in the up/down direction relative to the upper rail 4 (the bracket 17) in a state where the stem portion 31 is allowed to move in the front/rear direction in a range of the long hole 35.

As illustrated in FIG. 2, the stem portion 31 includes a pair of insertion configuration portions 36, 37 each extending from a front end of each of the longitudinal wall portions 32 towards the vehicle front. The insertion configuration portions 36, 37 are formed to be reduced in size towards a downward direction relative to the front ends of the longitudinal wall portions 32. The insertion configuration portions 36, 37 are formed so as to come closer to each other in the width direction, in which the insertion configuration portions 36, 37 face each other, in a manner that the insertion configuration portions 36, 37 overlap with each other, thereby forming a handle insertion portion 38.

A pair of engagement pieces 32*a* is provided at the rear end portion of each of the longitudinal wall portions 32. The engagement pieces 32*a* are arranged to be away from each other in the front/rear direction and to protrude downwardly from a lower end of the rear end portion of each of the longitudinal wall portions 32. On the other hand, the lock lever 30 includes a lock plate 39 (i.e., a flat plate portion) extending or spreading in the front/rear direction and in the width direction in a manner that the lock plate 39 passes through the inner openings 14*a* and the outer openings 16*b*. At the lock plate 39, an engagement hole 39*a* which is formed in a slit-shape and opens in the up/down direction is provided at four positions in total so that the engagement holes 39*a* face the respective engagement pieces 32*a*. The engagement pieces 32*a* engage in the corresponding engagement holes 39*a* and fixed thereat, and thus the lock plate 39 is fixed at the stem portion 31.

In addition, plural, for example, three locking holes 39*b* (i.e., lock portions) are provided at the lock plate 39, at an outer side in the width direction relative to each pair of engagement pieces 32*a*. The locking holes 39*b* are arranged side by side in the front/rear direction while being away from each other in the front/rear direction by the predetermined distance. As illustrated in FIG. 3A, each of the locking holes 39*b* opens in the up/down direction to face the corresponding flange 13. The locking holes 39*b*, which are arranged side by side in the front/rear direction, are arranged at positions configured to match or conform to the plural (three) locking protrusions 13*b* that are adjacent to each other in the long-side direction of the lower rail 3.

As illustrated in FIG. 3A with the solid lines, in a case where the lock lever 30 rotates about the support shaft 22 so that the lock plate 39 rises, the corresponding locking protrusion 13*b* are engageable in each of the locking holes 39*b*. In a case where the locking protrusions 13*b* are engaged in the corresponding locking holes 39*b*, the relative movement of the lower rail 3 and the upper rail 4 relative to each other is locked. On the other hand, as illustrated in FIG. 3A with the double-dotted lines, in a case where the lock lever 30 rotates about the support shaft 22 so that the lock plate 39 lowers, each of the locking holes 39*b* is set to come out of, that is, to disengage from the corresponding locking protrusion 13*b*. At this time, the locking imposed on the relative movement of the lower rail 3 and the upper rail 4 with each other, that is, the state where the relative movement of the lower rail 3 and the upper rail 4 relative to each other is locked (locked state of the relative movement), is released.

A dimension of the lock plate 39 in the width direction is set to be greater than a distance in the width direction between the guide portions 16*a* of the upper rail 4 and to be smaller than a distance in the width direction between the outer flanges 16, which are positioned lower than the guide portions 16*a*. Accordingly, the lock plate 39 passes through the outer openings 16*b* in the width direction in a state where the relative movement of the lower rail 3 and the upper rail 4 relative to each other is locked, however, the lock plate 39 does not interfere with the outer flanges 16 in a state where the locking imposed on the relative movement of the lower rail 3 and the upper rail 4 relative to each other is released.

In addition, each of edge portions (i.e., opposing edges) of the lock plate 39 in the width direction forms or defines an inclined portion 39*c* formed to incline upwardly towards the outer side in the width direction. The inclined portions 39*c* are provided in order that the lock plate 39 intersects with the guide portions 16*a*, which are bent and formed in the above-described manner, at an angle that is closer to the right angles even in a case where the lock plate 39 is in contact with the guide portions 16*a* of the outer flanges 16 in a state where the relative movement of the lower rail 3 and the upper rail 4 relative to each other is locked. Accordingly, engagement between the lock plate 39 (the inclined portions 39*c*) and the guide portions 16*a* in a shear direction thereof, which is in association with the contact of the lock plate 39 (the inclined portions 39*c*) and the guide portions 16*a* with each other, becomes more robust.

Figure 5A:
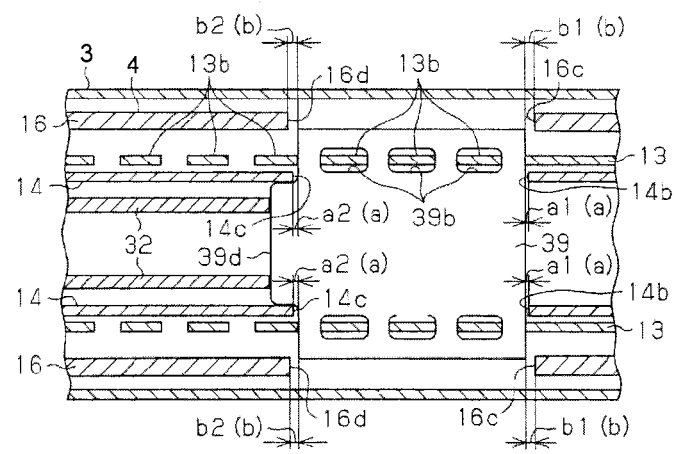
FIGS. 5A and 5B are section views illustrating operations of the seat slide apparatus according to the first embodiment.

As illustrated in FIG. 5A, a restriction protruding portion 39*d* (i.e., a widthwise restriction member) formed in a rectangular shape, of which dimension in the width direction is reduced and which protrudes in the vehicle front direction, is provided at a front end of the lock plate 39. As the restriction protruding portion 39*d* is held by insertion between the inner flanges 14 of the upper rail 4 so as to be sandwiched therebetween, clearance between the lock plate 39 and the upper rail 4 in the width direction is reduced and movement (backlash) of the lock plate 39 relative to the upper rail 4 in the width direction is restricted. Particularly, even in a case where the lock plate 39 is dislocated in the vehicle rear direction relative to the upper rail 4, the lock plate 39 is restricted from moving in the width direction relative to the upper rail 4 in a range of a length of a protrusion of the restriction protruding portion 39d.

As illustrated in FIG. 2 and FIG. 4, a lock spring 50 (i.e., a biasing member and a support shaft biasing member) made of a single wire rod is arranged in the upper rail 4. The lock spring 50 is formed in a substantially letter-U-shape which opens rearward when viewed in a plan view. The lock spring 50 includes a pair of extending portions 51 extending in the front/rear direction and being left-right symmetrical to each other. The lock spring 50 includes a connection portion 52 connecting front edges of the front end portions, which are away from each other, of the respective extending portions 51 in the width direction. As illustrated in FIGS. 4A and 4B, the lock spring 50 includes a wedging portion 53 (i.e., a restriction portion) which is provided at an intermediate portion of each of the extending portions 51 in the long-side direction thereof. The wedging portion 53 is formed in a curved shape made by bending the intermediate portion of the extending portion 51 upwardly. The lock spring 50 includes a lever-side lock end portion 54 formed by bending a rear end portion of each of the extending portions 51 upwardly. In addition, the front end portions, which are away from each other, of the respective extending portions 51 and the connection portion 52 make up a substantially pentagonal-shape as a whole, thereby forming a rail-side lock end portion 55.

The lock spring 50 is arranged substantially in the stem portion 31 in a manner that the rail-side lock end portion 55 protrudes upwardly from between the adjacent connection walls 33 of the stem portion 31, at a front side relative to the support shaft 22. The lock spring 50 is supported at, for example, the upper rail 4 in a manner that the support shaft 22 is inserted in and held at the wedging portions 53, and that the wedging portions 53 hold the support shaft 22 from above the support shaft 22, the lever-side lock end portions 54 are fixed at the lock plate 39 by insertion through the lock plate 39 from below the lock plate 39, and the rail-side lock end portion 55 is in contact with a bottom surface of the cover wall portion 15 of the upper rail 4. At this time, at the rear end portions of the extending portions 51, the lock spring 50 biases or pushes the lock lever 30 so that the lock lever 30 rotates towards a side at which the lock plate 39 rises, that is, the side at which the locking protrusions 13b engage in the corresponding locking holes 39b. In addition, by means of a reaction force of the biasing force acting on the lock lever 30, at the wedging portion 53, the lock spring 50 biases the support shaft 22 in a downward direction, that is, in a direction intersecting with the long-side direction of the long hole 35. Thus, the lock spring 50 locks movement of the support shaft 22 in the front/rear direction (i.e., first and second directions of the relative movement between the lower rail 3 and the upper rail 4) within the long hole 35.

That is, the support shaft 22 is biased by the wedging portions 53 of the lock spring 50, and thus a position of the support shaft 22 in the front/rear direction within the long hole 35 is retained by the wedging portions 53 of the lock spring 50. In this embodiment, the support shaft 22 is biased and is kept at a central portion of the long hole 35 in the front/rear direction. However, in a case where a load applied in the front/rear direction equals to or exceeds a predetermined value, the support shaft 22 moves at the long hole 35, that is, within the long hole, in the front/rear direction while the support shaft 22 resiliently deforming the wedging portions 53.

Figure 5B:
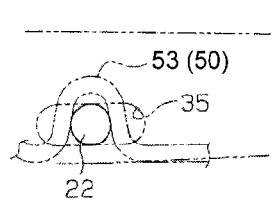
Figure 5B:
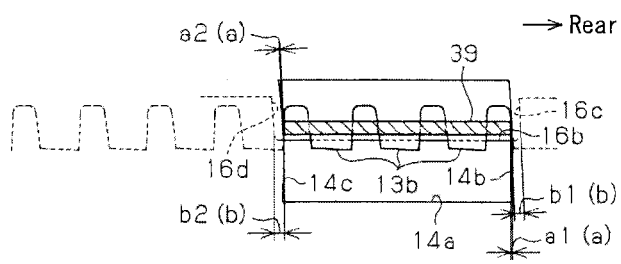

As illustrated in FIG. 5B, a rear end surface 14b and a front end surface 14c of each of the inner flanges 14 at the inner openings 14a is formed in an arc shape whose center corresponds to the support shaft 22 (the shaft attachment hole 18a). Accordingly, a clearance a1 between the lock plate 39 and each of the rear end surfaces 14b in the front/rear direction is set to be constant regardless of a rotational position of the lock lever 30, and a clearance a2 between the lock plate 39 and each of the front end surfaces 14c in the front/rear direction is set to be constant regardless of the rotational position of the lock lever 30. In this embodiment, the clearance a1 and the clearance a2 are set to be equivalent to each other, that is, the clearance a1 and the clearance a2 are set at a clearance a.

In addition, in the state where the relative movement of the lower rail 3 and the upper rail 4 relative to each other is locked, a clearance b1 in the front/rear direction between the lock plate 39 and a rear end surface 16c of each of the outer flanges 16 at the outer openings 16b, and a clearance b2 in the front/rear direction between the lock plate 39 and a front end surface 16d of each of the outer flanges 16 at the outer openings 16b are set to be equivalent to each other, that is, the clearance b1 and the clearance b2 are set at a clearance b. The clearance b is set to be greater than the clearance a and to be smaller than a movable distance r of the support shaft 22 from the central portion of the long hole 35 in the front/rear direction. That is, for example, in a case where the upper rail 4 and the lock lever 30 (the lock plate 39) move relative to each other in the front/rear direction due to the load, in the front/rear direction, which is associated with a vehicle collision, and the lock plate 39 is in contact with the rear end surface 14b or the front end surface 14c of the inner opening 14a, the lock plate 39 is not in contact with the rear end surface 16c or the front end surface 16d of the outer opening 16b. Alternatively, even in a case where the lock plate 39 is in contact with the rear end surface 16c or the front end surface 16d of the outer opening 16b, the support shaft 22 does not reach end edges of the long hole 35 in the front/rear direction. In other words, even in a case where the lock plate 39 is in contact with the rear end surface 16c or the front end surface 16d of the outer opening 16b, the support shaft 22 moves in the front/rear direction in the range of the long hole 35 while resiliently deforming the lock spring 50 (the wedging portions 53).

As illustrated in FIG. 2, the release handle 6 is made of pipe material or tube material by means of bending and forming. The release handle 6 is arranged at a front side relative to the upper rails 4 in a manner that the release handle 6 apparently bridges the upper rails 4 with each other in the width direction. A distal end portion 61 extending rearward from a rear portion of the release handle 6 is formed in a flat cylindrical configuration which is reduced in size in the width direction. The distal end portion 61 includes an inner diameter, in the width direction, which is greater than a dimension of the handle insertion portion 38 in the width direction. The distal end portion 61 includes and an outer diameter, in the width direction, which is smaller than a distance between the inner flanges 14 of the upper rail 4 in the width direction. The distal end portion 61 is inserted in the upper rail 4 from a front-side opening edge of the upper rail 4 and the handle insertion portion 38 is inserted in the distal end portion 61, and thus the distal end portion 61 is connected to the lock lever 30. Thus, basically, the distal end portion 61 rotates about the support shaft 22 integrally with the lock lever 30. A support groove 62 formed in a slit configuration and extending in the width direction is provided at a lower portion of the distal end portion 61.

A handle spring 65 made of a single wire rod is arranged in the upper rail 4. The handle spring 65 is formed in a substantially letter-U-shape which opens rearward when viewed in a plan view. The handle spring 65 includes a pair of extending portions 66 extending in the front/rear direction and being left-right symmetrical to each other. The handle spring 65 includes a connection portion 67 connecting the front ends of the respective extending portions 66 in the width direction.

As illustrated in FIG. 4A, the handle insertion portion 38 is inserted in the distal end portion 61 (the release handle 6). The connection portion 67 of the handle spring 65 engages in the support groove 62 of the distal end portion 61 (the release handle 6). Rear end portions of the respective extending portions 66 are in contact with a bottom surface of the connection wall 33 of the lock lever 30 (the stem portion 31) at a vehicle rear-side relative to the support shaft 22. At the support groove 62, the distal end portion 61 is biased by the handle spring 65 so as to rise. The handle spring 65, which is arranged below relative to the rail-side lock end portion 55, is prevented from interfering with the lock spring 50 in a manner that the extending portions 66 extending from the connection portion 67 in a vehicle rear upward direction towards the bottom surface of the corresponding connection wall 33 straddle the extending portions 51 at a rear side relative to the rail-side lock end portion 55. That is, each of the extending portions 66 of the handle spring 65 is arranged outwardly in the width direction relative to the corresponding extending portion 51 of the lock spring 50.

A front end portion of the handle insertion portion 38 inserted in the distal end portion 61 is supported at a vehicle front-side relative to the support groove 62 (that is, a biasing point at which the distal end portion 61 is biased by the handle spring 65) so as to be pivotable or movable in the up/down direction, and is biased at the support groove 62 upwardly by the handle spring 65. Thus, a posture of the distal end portion 61 is controlled.

In a case where a front end of the distal end portion 61 is lifted upwardly, the lock lever 30, together with the distal end portion 61, rotates about the support shaft 22 towards a side at which the lock plate 39 is lowered, that is, the side at which each of the locking holes 39b disengages from the corresponding locking protrusion 13b, against the biasing force of the lock spring 50.

Here, in a case where an operation force applied to the release handle 6 is released, the lock lever 30, together with the distal end portion 61 (the release handle 6), is rotated about the support shaft 22 by the biasing force of the lock spring 50 towards a side at which the lock plate 39 rises, that is, the side at which each of the locking holes 39b engages in the corresponding locking protrusion 13b in the above-explained manner. Thus, the relative movement of the lower rail 3 and the upper rail 4 relative to each other is locked. Accordingly, a position, in the front/rear direction, of the seat 5 supported by the upper rails 4 is maintained.

After this, in a case where the release handle 6 is operated so that a front end thereof is lifted upwardly, the lock lever 30, together with the distal end portion 61 (the release handle 6), rotates about the support shaft 22 towards the side at which the lock plate 39 is lowered, that is, the side at which each of the locking holes 39b disengages from the corresponding locking protrusion 13b, against the biasing force of the lock spring 50. Thus, the locking which is imposed on the relative movement of the lower rail 3 and the upper rail 4 relative to each other is released in the above-explained manner.

Accordingly, the position of the seat 5 supported at the upper rails 4 can be adjusted in the front/rear direction.

Next, operation of this embodiment will be described hereunder. In the locked state in which the relative movement of the lower rail 3 and the upper rail 4 relative to each other is locked as illustrated in FIGS. 5A and 5B, the clearance b in the front/rear direction between the lock plate 39 and the rear end surfaces 16c of each of the outer flanges 16 or between the lock plate 39 and the front end surface 16d of each of the outer flanges 16 is set to be greater than the clearance a in the front/rear direction between the lock plate 39 and the rear end surface 14b of each of the inner flanges 14 or between the lock plate 39 and the front end surface 14c of each of the inner flanges 14. In addition, the clearance b is set to be smaller than the movable distance r of the support shaft 22 from the central portion of the long hole 35 in the front/rear direction.

In this state, in a case where a load in the vehicle front direction is inputted relative to the seat 5 in association with, for example, a front collision of the vehicle, the upper rail 4, together with the seat 5, tends to move in the vehicle front direction. Accordingly, the lock lever 30 tends to move relatively in the vehicle rear direction relative to the upper rail 4. At the same time, the lower rail 3 tends to move in the vehicle rear direction relative to the upper rail 4 and the like.

However, in a case where the load in the front/rear direction at this time is below a predetermined value F, the biasing force applied by the wedging portions 53 surpasses the load in the front/rear direction which is applied to the wedging portions 53, and therefore movement (backlash) of the support shaft 22 in the front/rear direction is prevented or reduced by a wedging action. On the other hand, in a case where the load in the front/rear direction at this time equals to or exceeds the predetermined value F, the biasing force applied by the wedging portions 53 yields to the load in the front/rear direction which is applied to the wedging portions 53, and thus the lock lever 30 starts to move in the vehicle rear direction, while the support shaft 22 resiliently deforming the wedging portions 53 so that the wedging portions 53 ride over the support shaft 22, and the support shaft 22 slides at the long hole 35.

Figure 6A:
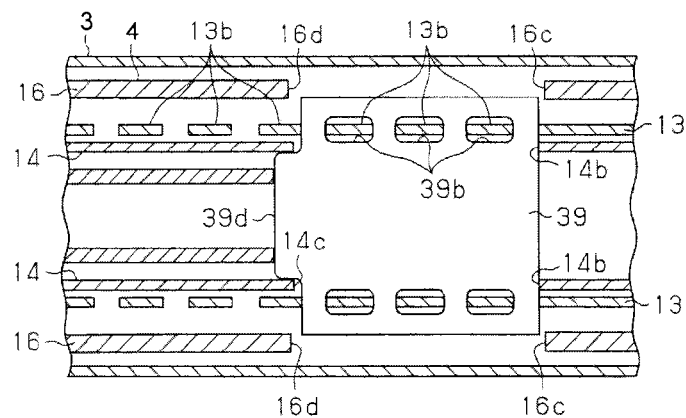
FIGS. 6A and 6B are section views illustrating the operations of the seat slide apparatus according to the first embodiment.
Figure 6B:
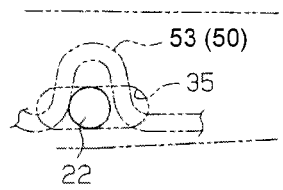
Figure 6B:
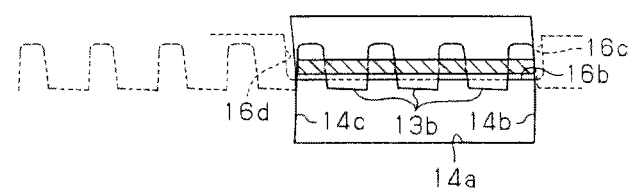

In a case where the load in the front/rear direction further increases, the lock plate 39 of the lock lever 30, which has moved in the vehicle rear direction, fills the clearance a and then comes in contact with the rear end surfaces 14b as illustrated in FIGS. 6A and 6B. Thus, for the time being, the load from the lock lever 30 at that time is received at the rear end surfaces 14b.

In this state, in a case where the load in the front/rear direction further increases, the lock plate 39 starts to fracture or break the rear end surfaces 14b and to bite into or dent into the rear end surfaces 14b. Thus, the rotation of the lock lever 30 in the up/down direction is restricted. Accordingly, at this stage, even in a case where the locking protrusions 13b are deformed so as to be inclined in the vehicle front direction and thus a contact angle between each of the locking protrusions 13b and the corresponding locking hole 39b increases, there is a low probability that the locking holes 39b disengage from the locking protrusions 13b because the lock lever 30 is restricted from rotating.

Figure 7A:
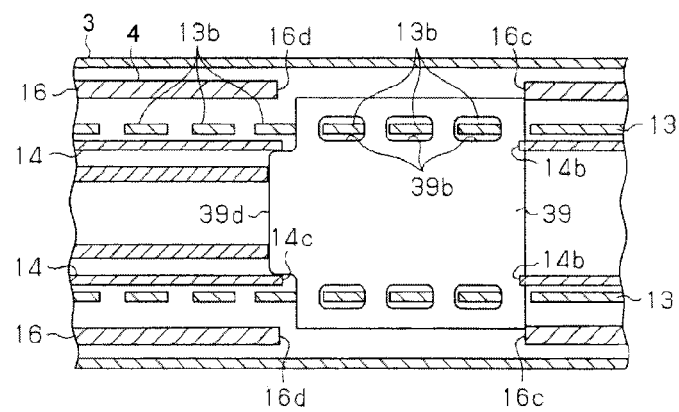
FIGS. 7A and 7B are section views illustrating the operations of the seat slide apparatus according to the first embodiment.
Figure 7B:
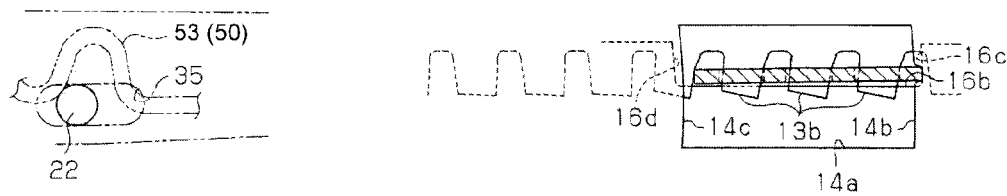
Figure 8A:
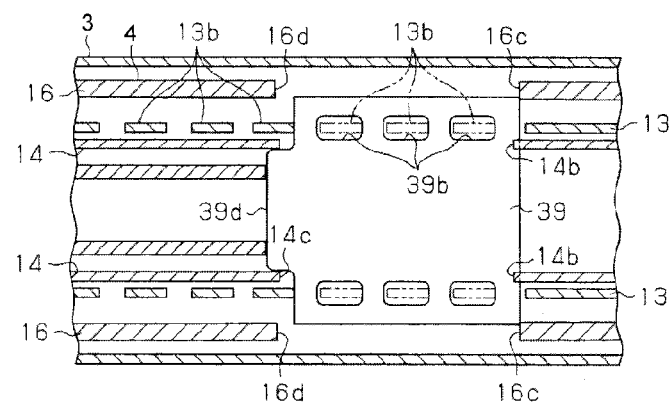
FIGS. 8A and 8B are section views illustrating the operations of the seat slide apparatus according to the first embodiment.
Figure 8B:
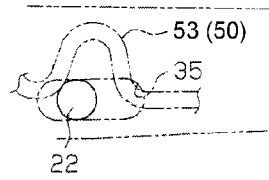
Figure 8B:
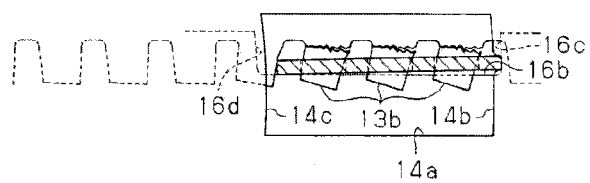

In a case where the load in the front/rear direction further increases, the lock plate 39 of the lock lever 30, which has bitten into the rear end surfaces 14b, fills the clearance b and then comes in contact also with the rear end surfaces 16c as illustrated in FIGS. 7A and 7B. Thus, the load from the lock lever 30 is received also at the rear end surfaces 16c. That is, the load is received by the inner flanges 14 and by the outer flanges 16 in cooperation with each other in a state where the rotation of the lock lever 30 in the up/down direction is restricted at the rear end surfaces 14b, which the lock plate 39 has bitten into. Because the load is received by the inner flanges 14 and by the outer flanges 16 in a manner that the load is shared therebetween, progression of the fracture of the rear end surfaces 14b is interrupted and bending fracture (shearing) of the locking protrusions 13b is reduced. In this state, a front end of the long hole 35 comes closer to the support shaft 22, however, the front end of the long hole 35 does not reach the support shaft 22. In other words, at least until this state is established, the support shaft 22 only moves at the long hole 35 relative thereto in the front/rear direction, and the support shaft 22 is not deformed by the inputted load or the support shaft 22 does not come off the long hole 35.

In a case where the load in the front/rear direction further increases, and even in a case where the locking protrusions 13b are deformed so as to be inclined in the vehicle front direction and thus the contact angle between each of the locking protrusions 13b and the corresponding locking hole 39b increases as the lower rails 3 move in the vehicle rear direction relative to the upper rails 4 and the like as indicated in a change from FIGS. 7A and 7B to FIGS. 8A and 8B, there is a low probability that the locking holes 39b disengage from the locking protrusions 13b because the rotation of the lock lever 30 is restricted. In a case where the load in the front/rear direction further increases, the currently-engaged locking protrusions 13b which are currently engaged in the corresponding locking hole 39b are bent and fractured (sheared), and then are removed from or come off the lower rail 3, and the next locking protrusion 13b which is positioned next to the currently-engaged locking protrusions 13b in the vehicle front direction comes in contact with the lock plate 39 as the upper rails 4 relatively move in the vehicle front direction, which serves as a resistance to the movement in the vehicle front direction. In a case where the load in the front/rear direction further increases, the bending fracture of the current locking protrusion 13b, and the contact between the lock plate 39 and the next locking protrusion 13b which is positioned next to the current locking protrusion 13b at the vehicle front side, are repeated. Thus, the resistance to the relative movement of the upper rails 4 in the vehicle front direction continuously exists without cease, and energy inputted as a result of, for example, the vehicle front collision is absorbed, while the movement of the upper rails 4 in the vehicle front direction is being prevented or reduced.

In a case where a load in the vehicle rear direction is inputted relative to the seat 5 in association with, for example, a rear collision of the vehicle, the operation which is identical to that in a case of the front collision of the vehicle is performed, except that a relation between front and rear is switched. Next, a relation between an amount of movement of the lower rail 3 relative to the upper rail 4 in the front/rear direction, and the load inputted in the front/rear direction will be explained.

Figure 9:
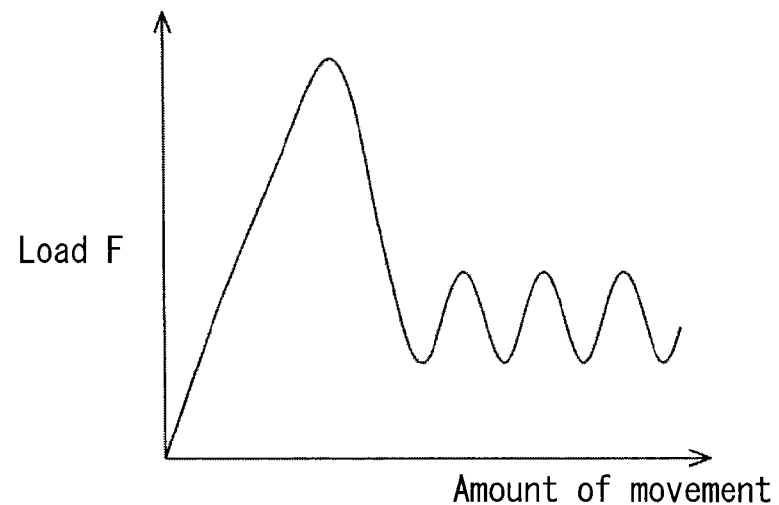
FIG. 9 is a graph showing a relation between an amount of movement of a lower rail and an upper rail relative to each other in a front/rear direction, and a load inputted in the front/rear direction.

As illustrated in FIG. 9, until the lock plate 39 bites into the rear end surfaces 14b (or the front end surfaces 14c) and then the currently-engaged locking protrusions 13b, which are currently engaged in the corresponding locking hole 39b, start to be bent and fractured, the load keeps increasing as the amount of movement of the lower rails 3 increases. That is, the more the amount of movement of the lower rails 3 increases, the less the lower rails 3 are likely to move. When the currently-engaged locking protrusions 13b, which are currently engaged in the corresponding locking hole 39b, come to be bent and fractured, the load with respect to the increment of the amount of movement of the lower rails 3 decreases rapidly. After this, the contact of the lock plate 39 with the next locking protrusion 13b which is positioned next to the currently-bent-and-fractured locking protrusion 13b in the vehicle front direction and the bending fracture of the locking protrusion 13b are repeated, and accordingly the load increases/decreases periodically or cyclically as the amount of movement of the lower rails 3 further increases. That is, even though the lower rails 3 once come to be movable easily, after that, the movement of the lower rails 3 is reduced.

Figure 10:
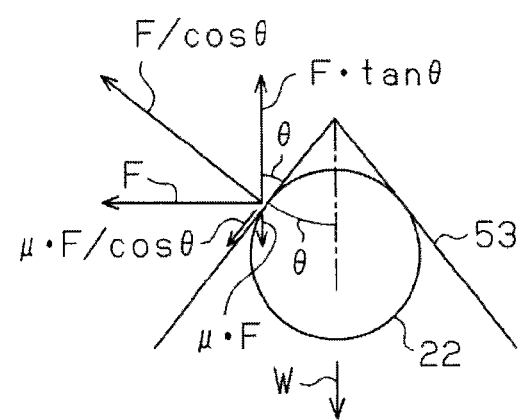
FIG. 10 is a schematic view explaining a condition under which a support shaft starts to move in the vehicle front/rear direction relative to a long hole.

Next, the predetermined value F, at which the support shaft 22 starts to move in the vehicle front direction relative to the long hole 35, will be explained. As illustrated in FIG. 10, a biasing force that the wedging portions 53 of the lock spring 50 biases or presses the support shaft 22 downwardly is W, and ½ (a half) of an apex angle of each of the wedging portions 53, which are pressed against the support shaft 22 and are in pressure contact therewith, is θ. In addition, a friction coefficient between the support shaft 22 and the wedging portions 53 is μ. In a case where the load in the front/rear direction which is inputted in the support shaft 22 is, that is, equals to, the predetermined value F, the support shaft 22 starts to move in the front/rear direction beyond the wedging portions 53.

In this case, a force "F·tan θ" is applied upwardly to the wedging portions 53 due to a wedging action thereof. In addition, a component force in a direction of a normal line at a contact portion at which each of the wedging portions 53 and the support shaft 22 are in contact with each other is "F/cos θ", and therefore a friction force at the contact portion is "μ·F/cos θ" and a component force of the friction force "μ·F/cos θ", which is directed downwardly, is "μ·F". That is, the friction force acts in a direction in which disengagement of the wedging portions 53 is prevented.

Thus, in order to enable the support shaft 22 to move in the front/rear direction relative to the long hole 35, the following relation needs to be satisfied.

$$F \cdot \tan \theta - \mu \cdot F > W$$

As is apparent from the above-explained relation, the smaller θ is and the greater μ is, the less the wedging portions 53 are likely to disengage from the support shaft 22. That is, in this embodiment, a target load (the predetermined value F) at or beyond which the support shaft 22 is allowed to move in the front/rear direction may be adjusted by adjusting the biasing force W (including, for example, an elastic coefficient, an amount of elastic deformation in an assembled state) of the wedging portions 53, the apex angle (½ of the apex angle is θ) of the wedging portion 53, and/or the friction coefficient μ (including, for example, friction material, surface finishing which are employed) of the contact portions at which the support shaft 22 and the respective wedging portions 53 are in contact with each other.

As explained in detail above, according to this embodiment, the following effects and advantages are obtained. (1) In this embodiment, the lock lever 30, which is rotatably connected to the upper rail 4 via the support shaft 22, is movable in the front/rear direction in the range of the long hole 35. In a case where the load applied in the front/rear direction is below the predetermined value F, the support shaft 22, which is biased by the lock spring 50, is restricted by the wedging portions 53 from moving in the front/rear direction at the long hole 35. Then, the lock lever 30 is restricted from moving relative to the upper rail 4 in the front/rear direction. Thus, the backlash of the upper rail 4 and the lock lever 30 in the front/rear direction, that is, the backlash of the lower rail 3 and the upper rail 4 in the front/rear direction is reduced. Then, without being strict about an opening width in the front/rear direction between the support shaft 22 and the long hole 35, backlash (or vibrations) of the seat 5 in the front/rear direction is reduced.

On the other hand, in the state where the relative movement of the lower rail 3 and the upper rail 4 relative to each other is locked by the lock lever 30, in a case where the load applied in the front/rear direction equals to or exceeds the predetermined value F as a result of, for example, a vehicle collision, the support shaft 22 resiliently deforms the lock spring 50, and the restriction on the movement of the support shaft 22 in the front/rear direction at the long hole 35, which is imposed by the wedging portions 53, is released. Thus, the support shaft 22, together with the upper rail 4, moves at the long hole 35 in the front/rear direction. Accordingly, the lock plate 39 is brought into contact with the inner flanges 14 (the rear end surfaces 14b or the front end surfaces 14c) and the inner flanges 14 receive the load. Consequently, in a case where the load is supported sufficiently by the inner flanges 14, the deformation of the support shaft 22 may be reduced to be extremely small or to be none because the support shaft 22 moves at the long hole 35. Thus, the locking imposed by the lock lever 30 on the relative movement may be more stabilized.

(2) According to this embodiment, the support shaft 22, which is biased by the lock spring 50, is restricted from moving in the front/rear direction at the long hole 35 by using the wedging portions 53 each including the extremely simple configuration. In addition, a restriction force for restricting the support shaft 22 from moving in the front/rear direction at the long hole 35 may be changed easily by adjusting, for example, the apex angle of each of the wedging portions 53, the friction coefficient between the support shaft 22 and the wedging portions 53, and the biasing force of the lock spring 50.

(3) According to this embodiment, in the state where the relative movement of the lower rail 3 and the upper rail 4 relative to each other is locked by the lock lever 30, the clearance b between the lock plate 39 and each of the outer flanges 16 at the outer opening 16b is set to be smaller than the movable distance r of the support shaft 22 at the long hole 35. Accordingly, even in a case where the load applied in the front/rear direction generated as a result of, for example, a vehicle collision equals to or exceeds the predetermined value F, the movement of the support shaft 22 is allowed in the range of the long hole 35 at least until the lock plate 39 comes in contact with the outer flanges 16 (the rear end surfaces 16c or the front end surfaces 16d) and the outer flanges 16 receive the load. Consequently, in a case where the load is supported sufficiently by the outer flanges 16 (and by the inner flanges 14), the support shaft 22 only moves at the long hole 35 and the deformation of the support shaft 22 is extremely small or none, and therefore the locking imposed by the lock lever 30 on the relative movement is more stabilized.

(4) According to this embodiment, the movement of the support shaft 22 in the front/rear direction at the long hole 35 is restricted without changing a configuration of the upper rail 4 (the bracket 17) or a configuration of the lock lever 30 because the wedging portions 53 are provided at the lock spring 50.

(5) According to this embodiment, in the state where the relative movement of the lower rail 3 and the upper rail 4 relative to each other is locked by the lock lever 30, in a case where, a large load in the front/rear direction is inputted as a result of, for example, a vehicle collision, and the lock lever 30 and the upper rail 4 are displaced in one of the front direction and the rear direction by a deformation associated with the large load, the lock plate 39 comes in contact with the inner flanges 14 (the rear end surfaces 14b or the front end surfaces 14c) and the inner flanges 14 receive the load. The clearance (a) between the lock plate 39 and each of the inner flanges 14 (the rear end surface 14b or the front end surface 14c) is smaller. In a case where the load in the front/rear direction further increases, the lock plate 39 fractures the inner flanges 14 and bites into the inner flanges 14. Thus, the rotation of the lock lever 30 is restricted. Then, in a case where the load in the front/rear direction further increases, the lock plate 39 comes in contact with the outer flanges 16 (the rear end surfaces 16c or the front end surfaces 16d) and the outer flanges 16 receive the load in cooperation with the inner flanges 14. The clearance (b) between the lock plate 39 and each of the outer flanges 16 (the rear end surface 16c or the front end surface 16d) is larger. Accordingly, even in a case where the locking protrusions 13b are deformed so as to be inclined in the other one of the front direction and the rear direction and thus the contact angle between each of the locking protrusions 13b and the corresponding locking hole 39b increases, the relative movement of the lower rail 3 and the upper rail 4 relative to each other is reduced because the lock lever 30 is restricted from rotating.

(6) According to this embodiment, at the guide portions 16a, the outer flanges 16 are formed to come closer to the inner side in the width direction towards a distal end side of the outer flanges 16. However, at the inclined portions 39c of the lock plate 39, the edge portions of the lock plate 39 in the width direction are formed to come closer to the distal end side of the outer flanges 16 towards the outer side in the width direction. Accordingly, in the state where the relative movement is locked, even in a case where the lock plate 39 is in contact with the guide portions 16a of the outer flanges 16, the lock plate 39 intersects with the guide portions 16a at an angle which is closer to the right angle. Thus, engagement between the lock plate 39 (the inclined portions 39c) and the guide portions 16a in a shear direction, the engagement which is associated with the contact between the lock plate 39 (the inclined portions 39c) and the guide portions 16a, becomes more robust.

In addition, the inclined portions 39c are formed only at the edge portions of the lock plate 39 in the width direction, and therefore do not affect the angles at which the inclined portions 39c intersect with the respective inner flanges 14. Thus, the lock plate 39 intersects with the inner flanges 14 in a state, that is, at an angle which is close to the right angle. Consequently, engagement between the lock plate 39 and the inner flanges 14 in a shear direction, the engagement which is associated with the contact between the lock plate 39 and the inner flanges 14, remains more robust.

In addition, the guide portions 16a are provided at the upper end portions of the outer flanges 16 and the outer openings 16b are provided at the respective guide portions 16a, and the lock plate 39 is inserted in the outer openings 16b in the width direction. Thus, a rotation trajectory of the lock plate 39 when rotating about the support shaft 22 is released below the guide portions 16a. Then, the lock plate 39 and the outer flanges 16 are prevented from interfering with each other or an amount of movement of the lock plate 39 in the up/down direction (a stroke of the lock lever 30) is increased.

(7) According to this embodiment, the lock plate 39 is restricted, by the restriction protruding portion 39d, from moving in the width direction relative to the upper rail 4, and thus, in association with the rotation of the lock lever 30, the engaging/disengaging operation of the locking holes 39b and the corresponding locking protrusions 13b relative to each other is more stabilized. Particularly, the restriction protruding portion 39d is provided at the lock plate 39 (at a position at which the locking holes 39b and the locking protrusions 13b are engaged with each other), which is away from a rotation center of the lock lever 30. Therefore, it is prevented that a slight deviation of the restriction on the movement in the width direction is amplified or is made larger at the lock plate 39, which might occur in a case, for example, where the restriction protruding portion 39d is provided in a vicinity of the rotation center (the support shaft 22).

A second embodiment of this disclosure will be explained. The second embodiment differs from the first embodiment mainly in that the wedging portion is provided at the long hole of the lock lever, instead of being provided at the lock spring, and therefore, detailed explanations about the configurations that are identical to those of the first embodiment will be omitted.

Figure 11:
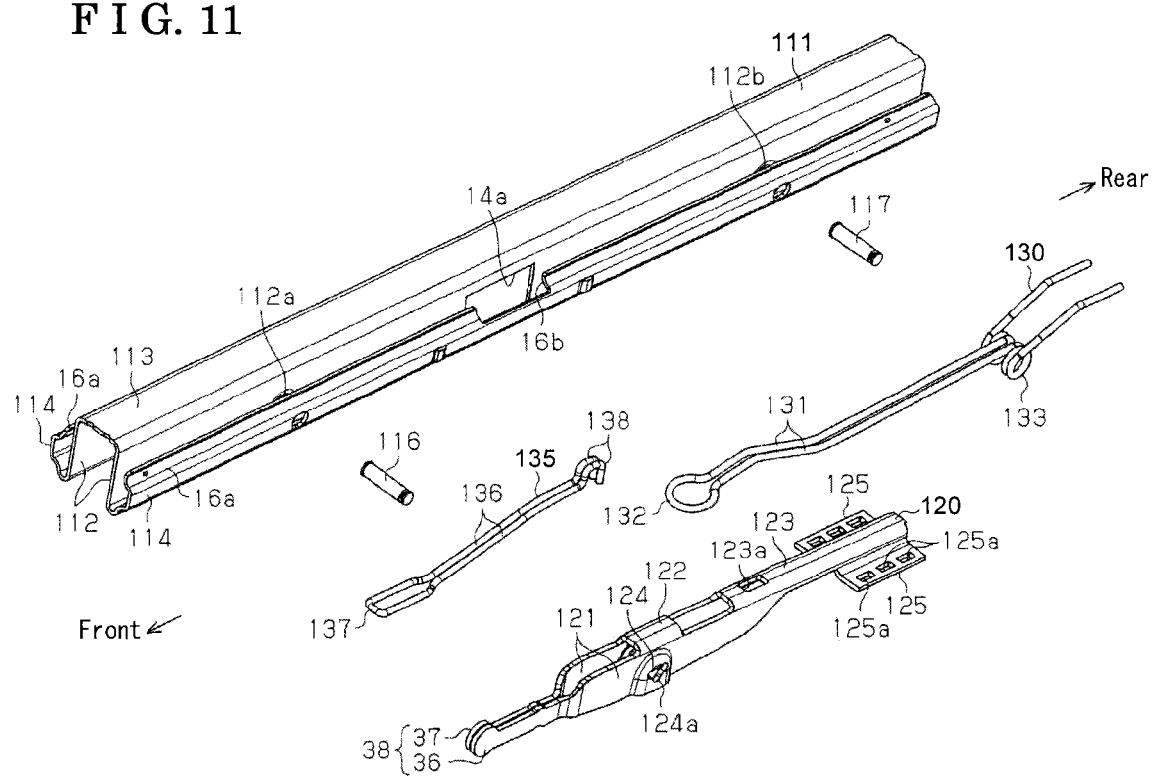
FIG. 11 is an exploded perspective view illustrating the seat slide apparatus according to the second embodiment.
Figure 12:
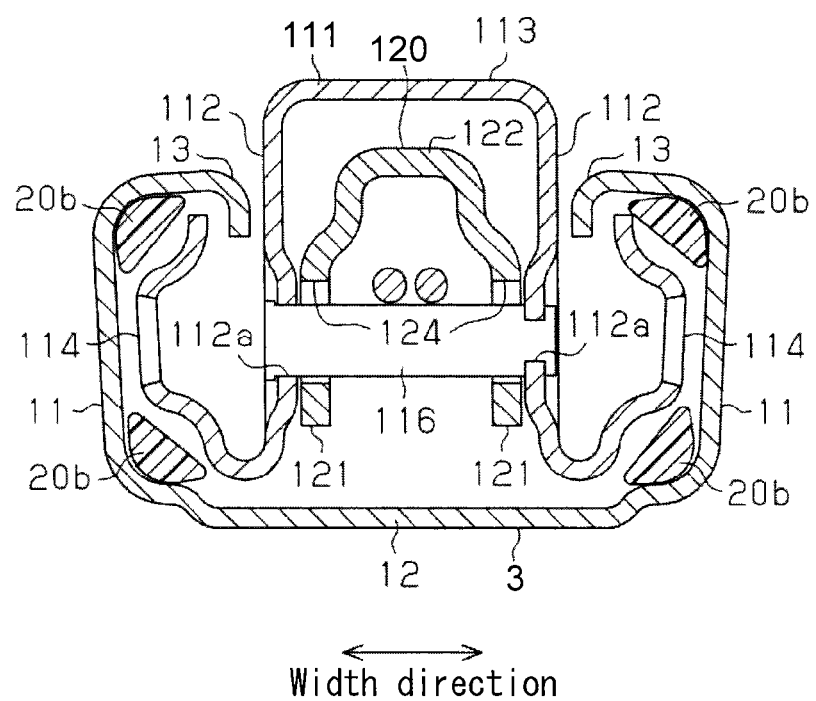
FIG. 12 is a cross-sectional view taken along line XII-XII in FIG. 13A illustrating the seat slide apparatus according to the second embodiment.

As illustrated in FIGS. 11 and 12, an upper rail 111 (i.e., the second rail) of this embodiment is made of plate material, and includes a pair of inner flanges 112 and a cover wall portion 113. The pair of inner flanges 112 (i.e., the first and second inner flanges) is arranged to extend in the up/down direction between the flanges 13 of the lower rail 3. The cover wall portion 113 connects base ends (that is, upper ends), which are away from the lower rail 3, of the inner flanges 112 to each other. An outer flange 114 is continuously provided at a distal end (that is, a lower end) of each of the inner flanges 112. The outer flange 114 projects outwardly in the width direction and then is folded back so as to be surrounded by the corresponding side wall portion 11 and the corresponding flange 13.

A shaft attachment hole 112a formed in a circular shape is provided at each of the inner flanges 112, at a vehicle front-side relative to the inner opening 14a. The shaft attachment holes 112a are concentric relative to each other and are in communication with each other in the width direction. A support shaft 116 formed in a cylindrical shape is supported at the inner flanges 112. End portions of the support shaft 116 are inserted in and secured at the respective shaft attachment holes 112a. A central line (i.e., the axis line) of the support shaft 116 extends in the width direction.

In a similar manner, a shaft attachment hole 112b formed in a circular shape is provided at each of the inner flanges 112, at a vehicle rear-side relative to the inner opening 14a. The shaft attachment holes 112b are concentric relative to each other and are in communication with each other in the width direction. A spring support shaft 117 formed in a cylindrical shape is supported at the inner flanges 112. End portions of the spring support shaft 117 are inserted in and secured at the respective shaft attachment holes 112b.

At an inner side of the inner flanges 112 in the width direction, a lock lever 120 (i.e., the lock member) is rotatably connected to an inside of the upper rail 111 by means of the support shaft 116. Specifically, the lock lever 120 is made of plate material extending in the front/rear direction. The lock lever 120 is arranged in a standing condition in a manner that a pair of longitudinal wall portions 121 each extending in the long-side direction of the lock lever 120 are arranged side by side in the width direction. A distance between the longitudinal wall portions 121 in the width direction is set to be smaller than a distance between the inner flanges 112 of the upper rail 111 in the width direction. At an intermediate portion of each of the longitudinal wall portions 121 in the long-side direction thereof, the longitudinal wall portions 121 are connected to each other, at upper end edges thereof, in the width direction by means of a connection wall 122. In addition, at a rear end portion of each of the longitudinal wall portions 121 in the long-side direction thereof, the longitudinal wall portions 121 are connected to each other in the width direction, at the upper end edges thereof, by means of a ceiling plate portion 123. At the ceiling plate portion 123, a spring holding hole 123a which is formed in a rectangular shape and is in communication in the up/down direction through the ceiling plate portion 123 is provided.

Figure 13A:
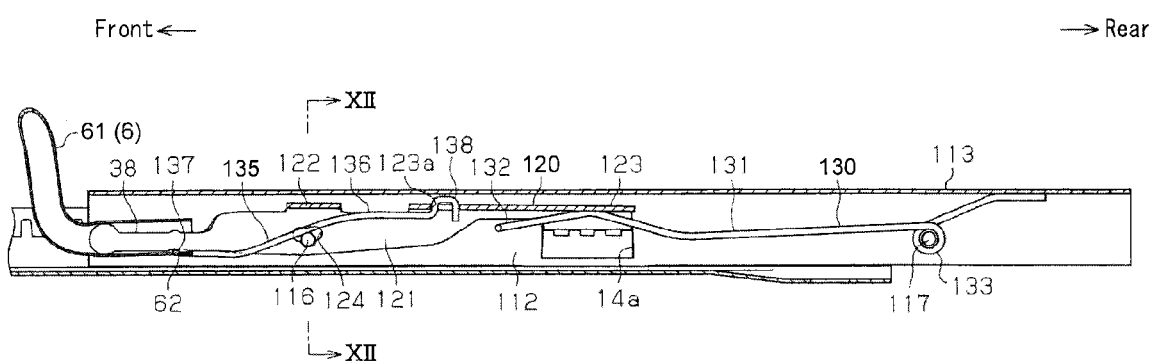
FIG. 13A is a section view illustrating the seat slide apparatus according to the second embodiment.
Figure 13B:
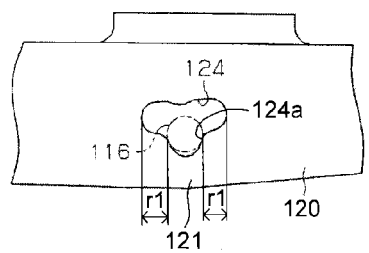
FIG. 13B is an enlarged partial view of FIG. 13A.

A long hole 124 (i.e., the elongated hole) is provided at each of the longitudinal wall portions 121, at an intermediate portion thereof in the front/rear direction. The long hole 124 is formed to extend in the front/rear direction at a height position which is equivalent to a height position of the support shaft 116 (the shaft attachment holes 112a). In this embodiment, the long hole 124 is, for example, a through hole. As illustrated in FIGS. 13A and 13B, each of the long holes 124 includes a wedging portion 124a (i.e., the restriction portion) which is formed to extend downwardly from a central portion of the long hole 124 in the long-side direction thereof, and each of the long holes 124 includes a substantially letter-T-shape. In a state where the longitudinal wall portions 121 of the lock lever 120 are interposed between the inner flanges 112 of the upper rail 111 in the width direction, the support shaft 116, whose end portions are secured at the shaft attachment holes 112a, is inserted through the long holes 124 in a manner that the support shaft 116 is held at the wedging portions 124a so as to be arranged at the wedging portions 124a. Accordingly, the lock lever 120, on an assumption that the support shaft 116 rides up the wedging portions 124a, is connected to the upper rail 111 so as to be rotatable in the up/down direction relative to the upper rail 111 in a state where the support shaft 116 is allowed to move in the front/rear direction in a range of the long hole 124.

As illustrated in FIG. 11, the lock lever 120 includes a flat plate portion 125 that is formed in a configuration of a pair of flanges. The flat plate portions 125 are provided so as to protrude from lower end edges of the rear end portions of the respective longitudinal wall portions 121 outwardly in the width direction, that is, in directions in which the flat plate portions 125 are away from each other. Each of the flat plate portions 125 is arranged to pass through the inner opening 14a of the corresponding inner flange 112 and through the outer opening 16b of the corresponding outer flange 114 in the width direction. At each of the flat plate portions 125, plural (for example, three) locking holes 125a (i.e., the lock portions) are provided in a manner that the locking holes 125a are arranged side by side so as to be away from each other for the predetermined distance in the front/rear direction. Each of the locking holes 125a opens in the up/down direction to face the flange 13 of the lower rail 3. The locking holes 125a are arranged at positions configured to match or conform to the plural (three) locking protrusions 13b that are adjacent to each other in the long-side direction of the lower rail 3.

In a case where the lock lever 120 rotates about the support shaft 116 so that the flat plate portions 125 rises, the locking protrusion 13b corresponding to each of the locking holes 125a may engage in the locking hole 125a. In a case where the locking protrusions 13b engage in the corresponding locking holes 125a, the relative movement of the lower rail 3 and the upper rail 111 relative to each other is locked. On the other hand, in a case where the lock lever 120 rotates about the support shaft 116 so that the flat plate portions 125 are lowered, each of the locking holes 125a is set to come out of, that is, disengage from the corresponding locking protrusion 13b. At this time, the locking imposed on the relative movement of the lower rail 3 and the upper rail 111 relative to each other is released.

A distance between the flat plate portions 125 in the width direction is set to be greater than the distance between the guide portions 16a of the upper rail 111 in the width direction and to be smaller than a distance in the width direction between the outer flanges 114 (i.e., the first and second outer flanges) which are positioned lower than the guide portions 16a. Accordingly, the flat plate portions 125 pass through the respective outer openings 16b in the width direction in the state where the relative movement of the lower rail 3 and the upper rail 111 relative to each other is locked, however, the flat plate portions 125 do not interfere with the outer flanges 114 in a state where the locking imposed on the relative movement of the lower rail 3 and the upper rail 111 relative to each other is released.

In the upper rail 111, at an inside of the inner flanges 112 in the width direction, a lock spring 130 (i.e., the biasing member and the support shaft biasing member) made of a single wire rod is supported by the spring support shaft 117. The lock spring 130 is formed in a substantially letter-U-shape which opens rearward when viewed in a plan view. The lock spring 130 includes a pair of extending portions 131 extending in the front/rear direction and being left-right symmetrical to each other. The lock spring 130 includes a connection portion 132 formed in an arc shape and connecting front ends of the respective extending portions 131 to each other in the width direction. In addition, each of the extending portions 131 includes a coil portion 133 which is formed by winding, in the clockwise direction towards rearward, the extending portion 131 at an intermediate portion in the long-side direction.

As illustrated in FIG. 13A, each of the coil portions 133 is wound around the spring support shaft 117, and thus the lock spring 130 is supported at the upper rail 111. In addition, at rear end portions of the respective extending portions 131 which extend from the coil portions 133 in the vehicle rear direction, the lock spring 130 is resiliently in contact with a bottom surface of the cover wall portion 113 of the upper rail 111. In addition, together with front end portions of the respective extending portions 131 which extend from the coil portions 133 in the vehicle front direction, at the connection portion 132 which enters in the lock lever 120, the lock spring 130 is resiliently in contact with a bottom surface of the ceiling plate portion 123 at the connection portion 132. At the connection portion 132, the lock spring 130 biases or pushes the lock lever 120 so that the lock lever 120 rotates towards a side at which the flat plate portions 125 of the lock lever 120 rise, that is, the side at which the locking protrusions 13b engage in the corresponding locking holes 125a.

As illustrated in FIG. 11, a handle spring 135 (i.e., the support shaft biasing member) made of a single wire rod is arranged in the upper rail 111. The handle spring 135 is formed in a substantially letter-U-shape which opens rearward when viewed in a plan view. The handle spring 135 includes a pair of extending portions 136 being left-right symmetrical to each other and extending in the front/rear direction. The handle spring 135 includes a connection portion 137 connecting front edges of front end portions, which are away from each other, of the respective extending portions 136 to each other in the width direction. A fixing portion 138 formed in a curved shape curved to protrude upwardly is provided at a rear end portion of each of the extending portions 136.

As illustrated in FIG. 13A, the handle spring 135 is arranged to extend in the front/rear direction above the support shaft 116. The fixing portions 138 engage in the spring holding hole 123a of the ceiling plate portion 123 and held thereat, and the connection portion 137 is inserted in the support groove 62 of the distal end portion 61 (the release handle 6), in which the handle insertion portion 38 is inserted. At the connection portion 137, the handle spring 135 biases or pushes the distal end portion 61 (the support groove 62) so that the distal end portion 61 rises.

The distal end portion 61, specifically, the front end portion of the handle insertion portion 38 inserted in the distal end portion 61, is supported so as to be pivotable or movable in the up/down direction at a vehicle front-side relative to the support groove 62 (that is, a biasing point at which the distal end portion 61 is biased by the handle spring 135), and is biased at the support groove 62 upwardly by the handle spring 135. Thus, the posture of the distal end portion 61 is controlled.

In a case where the front end of the distal end portion 61 is lifted upwardly, the lock lever 120, together with the distal end portion 61, rotates about the support shaft 116 towards a side at which the flat plate portions 125 are lowered, that is, the side at which each of the locking holes 125a disengages from the corresponding locking protrusion 13b against the biasing force of the lock spring 130.

Here, in a case where the operation force of the release handle 6 is released, the lock lever 120, together with the distal end portion 61 (the release handle 6), is rotated about the support shaft 116 by the biasing force of the lock spring 130 towards the side at which the flat plate portions 125 rise, that is, the side at which each of the locking holes 125a engages in the corresponding locking protrusion 13b. Thus, the relative movement of the lower rail 3 and the upper rail 111 relative to each other is locked in the above-explained manner. Accordingly, the position in the front/rear direction of the seat 5 supported by the upper rails 111 is maintained.

After this, in a case where the release handle 6 is operated so that the front end thereof is lifted upwardly, the lock lever 120, together with the distal end portion 61 (the release handle 6), rotates about the support shaft 116 towards the side at which the flat plate portions 125 are lowered, that is, the side at which each of the locking holes 125a disengages from the corresponding locking protrusion 13b, against the biasing force of the lock spring 130. Thus, the locking imposed on the relative movement of the lower rail 3 and the upper rail 111 relative to each other is released I the above-explained manner. Accordingly, the position of the seat 5 supported at the upper rails 111 can be adjusted in the front/rear direction.

When the handle spring 135 biases the distal end portion 61 (the support groove 62) at the connection portion 137 so that the distal end portion 61 rises, the handle spring 135 biases the support shaft 116 downwardly, that is, in a direction intersecting with the long-side direction of the long hole 124 by means of a reaction force of the biasing force acting on the distal end portion 61. Thus, movement of the support shaft 116, which is positioned at the wedging portions 124a (at the central portion of the long hole 124 in the front/rear direction), in the front/rear direction is locked. That is, the support shaft 116, which is held at the wedging portions 124a by insertion and is arranged thereat, is biased by the handle spring 135, and thus a position of the support shaft 116 in the front/rear direction is retained by the handle spring 135. However, in a case where the load applied in the front/rear direction equals to or exceeds the predetermined value, the support shaft 116 rides up the wedging portions 124a while resiliently deforming the handle spring 135, and moves at the long hole 124 in the front/rear direction.

Figure 14A:
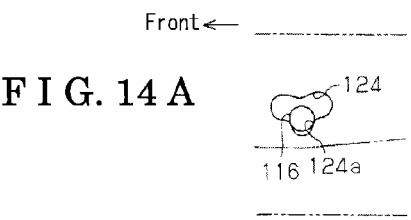
FIGS. 14A, 14B, 14C, and 14D are section views illustrating operations of the seat slide apparatus according to the second embodiment.

As illustrated in FIG. 14A, a clearance a11 in the front/rear direction between each of the flat plate portions 125 and the corresponding rear end surface 14b, and a clearance a12 in the front/rear direction between each of the flat plate portions 125 and the corresponding front end surface 14c are set to be equivalent to each other, that is, set at the clearance a. In addition, in the state where the relative movement of the lower rail 3 and the upper rail 111 relative to each other is locked, a clearance b11 in the front/rear direction between each of the flat plate portions 125 and the rear end surface 16c of the outer flanges 114 at the outer openings 16b, and a clearance b12 in the front/rear direction between each of the flat plate portions 125 and the front end surface 16d of the outer flange 114 at the outer openings 16b are set to be equivalent to each other, that is, set at the clearance b. The clearance b is set to be greater than the clearance a and to be smaller than the movable distance r of the support shaft 116 from the wedging portion 124a. That is, for example, in a case where the upper rail 111 and the lock lever 120 (the flat plate portions 125) relatively move in the front/rear direction due to the load in the front/rear direction which is associated with a vehicle collision, even if the flat plate portions 125 come in contact with the rear end surface 14b or the front end surface 14c of the inner opening 14a, the flat plate portions 125 do not come in contact with the rear end surface 16c or the front end surface 16d of the outer opening 16b. Alternatively, even in a case where the flat plate portions 125 come in contact with the rear end surface 16c of the outer opening 16b or the front end surface 16d of the outer opening 16b, the support shaft 116 does not reach end edges of the long hole 124 in the front/rear direction. In other words, even in a case where the flat plate portions 125 come in contact with the rear end surface 16c of the outer opening 16b or the front end surface 16d of the outer opening 16b, the support shaft 116 moves in the front/rear direction in the range of the long hole 124, while resiliently deforming the handle spring 135.

Next, operation of this embodiment will be described hereunder. In the locked state in which the relative movement of the lower rail 3 and the upper rail 111 relative to each other is locked as illustrated in FIG. 14A, in a case where the load in the vehicle front direction is inputted relative to the seat 5 in association with, for example, the front collision of the vehicle, the upper rail 111 tends to move in the vehicle front direction together with the seat 5. Accordingly, the lock lever 120 tends to move in the vehicle rear direction relative to the upper rail 111. At the same time, the lower rail 3 tends to move in the vehicle rear direction relative to, including, for example, the upper rail 111.

However, in a case where the load in the front/rear direction at this time is below the predetermined value F, the biasing force applied by the handle spring 135 surpasses the load in the front/rear direction which is applied relative to the wedging portions 124a, and therefore movement (backlash) of the support shaft 116 in the front/rear direction is prevented or reduced by the wedging action. On the other hand, in a case where the load in the front/rear direction at this time equals to or exceeds the predetermined value F, the biasing force applied by the handle spring 135 yields to the load in the front/rear direction which is applied relative to the wedging portions 124a, and thus the lock lever 120 starts to move in the vehicle rear direction, while the support shaft 116 resiliently deforming the handle spring 135 so that the support shaft 116 rides up the wedging portions 124a, and the support shaft 116 slidably moving at the long hole 124.

Figure 14B:
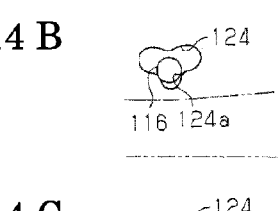

In a case where the load in the front/rear direction further increases, the flat plate portions 125 of the lock lever 120, which has moved in the vehicle rear direction, fill the clearance a and then come in contact with the rear end surfaces 14b as illustrated in FIG. 14B. Thus, for the time being, the load from the lock lever 120 at that time is received at the rear end surfaces 14b.

In this state where the flat plate portions 125 are in contact with the rear end surfaces 14b, in a case where the load in the front/rear direction further increases, the flat plate portions 125 start to fracture or break the rear end surfaces 14b and bite into the rear end surfaces 14b. Thus, the rotation of the lock lever 120 in the up/down direction is restricted. Accordingly, at this stage, even in a case where the locking protrusions 13b are deformed so as to be inclined in the vehicle front direction and thus a contact angle between each of the locking protrusions 13b and the corresponding locking hole 125a increases, there is a low probability that the locking holes 125a disengage from the locking protrusions 13b because the lock lever 120 is prevented from rotating.

Figure 14C:
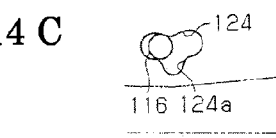

In a case where the load in the front/rear direction further increases, the flat plate portions 125, which have bitten into the rear end surfaces 14b, fill the clearance b and then come in contact also with the rear end surfaces 16c as illustrated in FIG. 14C. Thus, the load from the lock lever 120 is received also at the rear end surfaces 16c. That is, the load is received at the inner flanges 112 and at the outer flanges 114 in cooperation with each other in a state where the rotation of the lock lever 120 is restricted at the rear end surfaces 14b, into which the flat plate portions 125 have bitten into. Because the load is received by the inner flanges 112 and by the outer flanges 114 in a manner that the load is shared between the inner flanges 112 and the outer flanges 114, progression of the fracture of the rear end surfaces 14b is interrupted and the bending fracture (shearing) of the locking protrusions 13b is prevented or reduced. In this state, a front end of the long hole 124 comes closer to the support shaft 116, however, the front end of the long hole 124 does not reach the support shaft 116. In other words, at least until this state is established, the support shaft 116 only moves in the front/rear direction at, that is, within the long hole 124 relative to the long hole 124 while the support shaft 116 riding over the wedging portions 124a, however, the support shaft 116 is not deformed by the inputted load or the support shaft 116 comes off the long hole 124.

Figure 14D:
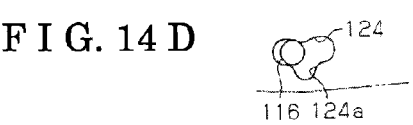

In a case where the load in the front/rear direction further increases, and even in a case where the locking protrusions 13b are deformed so as to be inclined in the vehicle front direction and thus the contact angle between each of the locking protrusions 13b and the corresponding locking hole 125a increases as the lower rails 3 move in the vehicle rear direction relative to, including, for example, the upper rails 111 as indicated in a change from FIGS. 14C to 14D, there is a low probability that the locking holes 125a disengage from the locking protrusions 13b because the rotation of the lock lever 120 is restricted. In a case where the load in the front/rear direction further increases, the currently-engaged locking protrusions 13b which are currently engaged in the corresponding locking hole 125a are bent and fractured (sheared), and then are removed from or come off the lower rail 3, and the next locking protrusion 13b which is positioned next to the currently-engaged locking protrusions 13b in the vehicle front direction comes in contact with the corresponding flat plate portion 125 as the upper rails 111 relatively move in the vehicle front direction so as to serve as the resistance to the movement in the vehicle front direction. In a case where the load in the front/rear direction further increases, the bending fracture of the current locking protrusion 13b, and the contact between the flat plate portion 125 and the next locking protrusion 13b which is positioned next to the current locking protrusion 13b in the vehicle forward direction, are repeated. Thus, the resistance to the relative movement of the upper rail 111 in the vehicle front direction continues without stopping, and an input energy associated with, for example, the vehicle front collision is absorbed, while the movement of the upper rail 111 in the vehicle front direction is being prevented or reduced.

In a case where a load in the vehicle rear direction is inputted relative to the seat 5 in association with, for example, the rear collision of the vehicle, the operation same as that in a case of the front collision of the vehicle is performed, except that the relation between front and rear is switched. In addition, the idea or concept about the predetermined value F, at which the support shaft 116 starts to move in the front/rear direction relative to the long hole 124, is identical to that of the first embodiment.

As explained in detail above, according to this embodiment, the following effects and advantages are obtained in addition to the effects and advantages (1) to (3) and (5) of the first embodiment. (1) In this embodiment, a configuration of each of the wedging portions 124a may be formed more accurately because the wedging portions 124a are provided at the respective long holes 124.

A third embodiment of this disclosure will be explained. The third embodiment differs from the first embodiment and the second embodiment mainly in that the long hole including the wedging portion is provided at the upper rail-side (the bracket), instead of being provided at the lock lever, and therefore, detailed explanations about the configurations that are identical to those of the aforementioned embodiments will be omitted.

Figure 15:
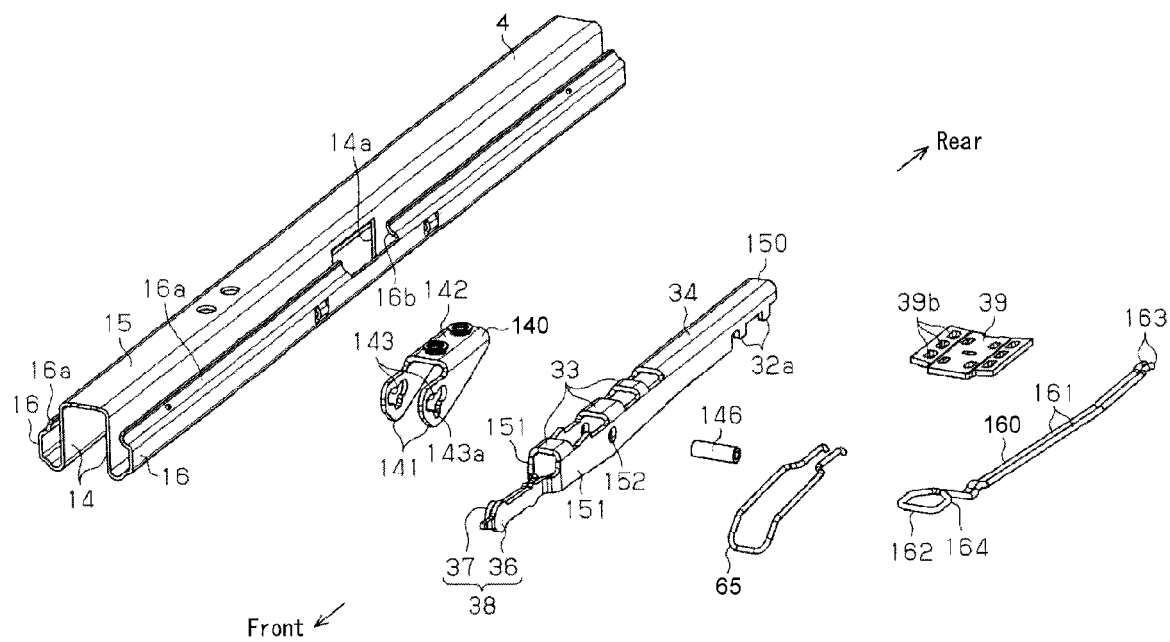
FIG. 15 is an exploded perspective view illustrating the seat slide apparatus according to the third embodiment.

As illustrated in FIG. 15 and FIG. 17, a bracket 140 is attached to the cover wall portion 15 of the upper rail 4 at a portion at a front side relative to, for example, the inner openings 14a. The bracket 140 includes a pair of support wall portions 141 extending in the up/down direction between the inner flanges 14 of the upper rail 4. The bracket 140 includes a ceiling plate portion 142 connecting base ends (that is, upper ends), which are away from the lower rail 3, of the support wall portions 141 to each other. At the ceiling plate portion 142, the bracket 140 is fastened to the cover wall portion 15 of the upper rail 4 in a state where the support wall portions 141 are interposed between the inner flanges 14 of the upper rail 4 in the width direction.

Figure 17A:
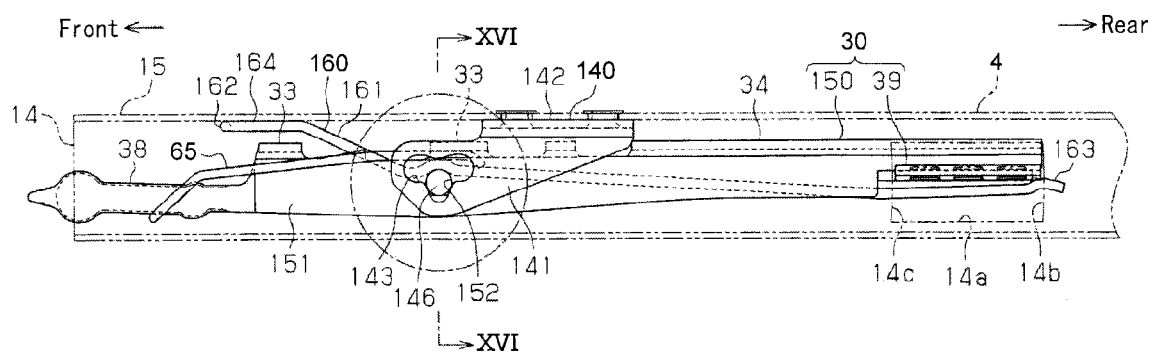
FIG. 17A is a section view illustrating the seat slide apparatus according to the third embodiment.
Figure 17B:
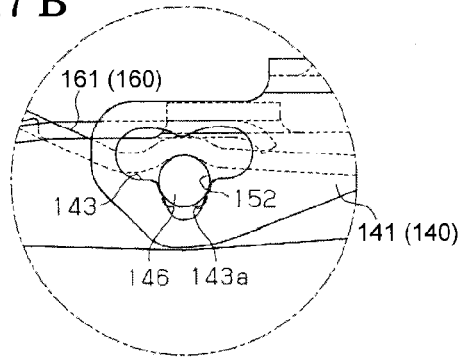
FIG. 17B is an enlarged partial view of FIG. 17A.
Figure 18:
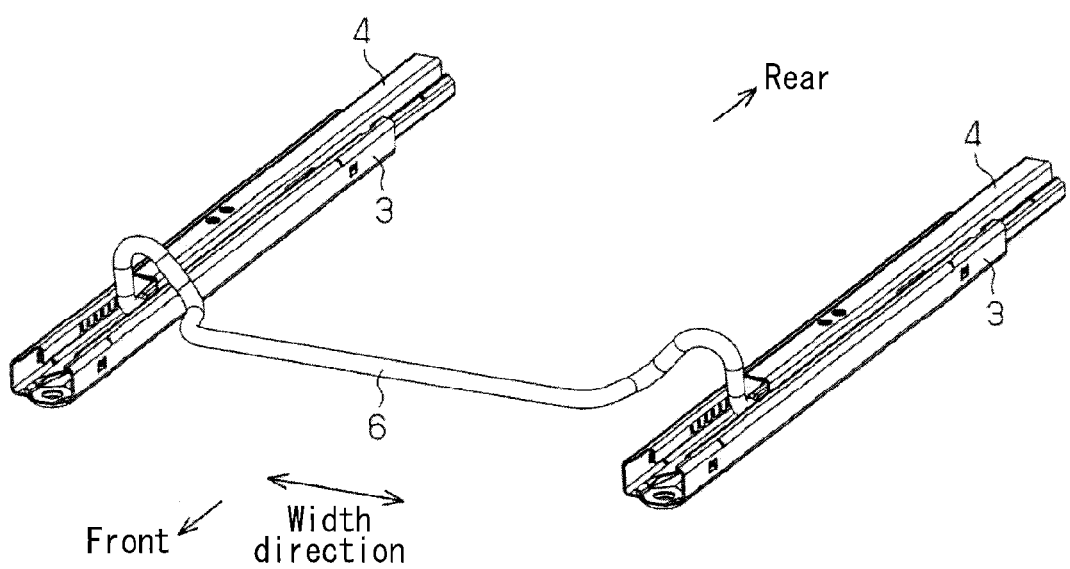
FIG. 18 is a perspective view of the seat slide apparatus according to the fourth embodiment.

A long hole 143 (i.e., the elongated hole) is provided at each of the support wall portions 141, at a front lower portion thereof so as to extend in the front/rear direction. As illustrated in FIGS. 17A and 17B, each of the long holes 143 includes a wedging portion 143a (i.e., the restriction portion) which is formed to extend downwardly from a central portion of the long hole 143 in the long-side direction thereof, and each of the long holes 143 includes a substantially letter-T-shape. At each of the inner flanges 14, a support shaft 146 is supported. The support shaft 146 is formed in a cylindrical shape and of which end portions are inserted in the respective long holes 143 with allowance between the end portions of the support shaft 146 and the long holes 143, so that the end portions of the support shaft 146 are held at the respective wedging portions 143a by insertion and arranged thereat. A diameter of the support shaft 146 is set to be equivalent to an opening width of each of the long holes 143 in the short-side direction (that is, the up/down direction). A central line of the support shaft 146 extends in the width direction.

As illustrated in FIG. 15, at an inner side of the support wall portions 141 in the width direction, a stem portion 150 of the lock lever 30 is rotatably connected to the inside of the upper rail 4 by means of the support shaft 146. Specifically, the stem portion 150 is made of plate material extending in the front/rear direction. The lock lever 30 is arranged in a standing condition in a manner that a pair of longitudinal wall portions 151 each extending in the long-side direction of the lock lever 30 are arranged side by side in the width direction. A distance between the longitudinal wall portions 151 in the width direction is set to be smaller than a distance between the support wall portions 141 of the bracket 140 of the bracket 140 in the width direction.

A shaft attachment hole 152 formed in a circular shape is provided at an intermediate portion of each of the longitudinal wall portions 151 in the long-side direction thereof, at a height position which is equivalent to a height position of the support shaft 146 (the long hole 143). The shaft attachment holes 152 are concentric relative to each other and are in communication with each other in the width direction. As illustrated in FIG. 16, in a state where the longitudinal wall portions 151 of the stem portion 150 is interposed between the support wall portions 141 of the bracket 140 in the width direction, the support shaft 146, whose end portions are inserted in the respective long holes 143 with allowance between the end portions of the support shaft 146 and the long holes 143, is inserted through the respective shaft attachment holes 152 and fixed thereat.

Accordingly, the stem portion 150 (the lock lever 30), on an assumption that the support shaft 146 rides up the wedging portions 143a, is connected to the upper rail 4 so as to be rotatable in the up/down direction relative to the upper rail 4 in a state where the support shaft 146 is allowed to move in the front/rear direction in a range of the long hole 143.

As illustrated in FIG. 15 and FIG. 16, a lock spring 160 (i.e., the biasing member and the support shaft biasing member) made of a single wire rod is arranged in the upper rail 4. The lock spring 160 is formed in a substantially letter-U-shape which opens rearward when viewed in a plan view. The lock spring 160 includes a pair of extending portions 161 extending in the front/rear direction and being left-right symmetrical to each other. The lock spring 160 includes a connection portion 162 connecting front edges of front end portions, which are away from each other, of the respective extending portions 161 to each other in the width direction. In addition, the lock spring 160 includes a lever-side lock end portion 163 made by bending a rear end portion of each of the extending portions 161 upwardly in a curved shape. In addition, the front end portions, which are away from each other, of the respective extending portions 161 make up a substantially pentagonal-shape as a whole in cooperation with the connection portion 162, thereby forming a rail-side lock end portion 164.

As illustrated in FIGS. 17A and 17B, the lock spring 160 is arranged to extend in the front/rear direction above the support shaft 146. The lock spring 160 is arranged substantially in the stem portion 150 in a manner that the rail-side lock end portion 164 protrudes upwardly from between the adjacent connection walls 33 of the stem portion 150 at a front side relative to the support shaft 146. The lock spring 160 is resiliently in contact with the support shaft 146 from above the support shaft 146. At the lever-side lock end portions 163, the lock spring 160 is resiliently in contact with the lock plate 39 from below. At the rail-side lock end portion 164, the lock spring 160 is resiliently in contact with the bottom surface of the cover wall portion 15 of the upper rail 4. Thus, the lock spring 160 is supported at, including, for example, the upper rail 4. At the rear end portions of the extending portions 161, the lock spring 160 biases or pushes the stem portion 150 (the lock lever 30) so that the stem portion 150 (the lock lever 30) rotates towards the side at which the lock plate 39 rises, that is, the side at which the locking protrusions 13b engage in the corresponding locking holes 39b. In addition, by means of a reaction force of the biasing force acting on the stem portion 150, the lock spring 160 biases the support shaft 146 in the downward direction, that is, in the direction intersecting with the long-side direction of the long hole 143, thereby locking movement of the support shaft 146 in the front/rear direction within the long hole 143. Accordingly, the movement of the support shaft 146, which is positioned at the wedging portions 143a (at the central portion of the long hole 143 in the front/rear direction), in the front/rear direction is locked. That is, the support shaft 146, which is held at the wedging portions 143a by insertion and arranged thereat, is biased by the lock spring 160, and thus a position of the support shaft 146 in the front/rear direction is retained by the lock spring 160. However, in a case where the load applied in the front/rear direction equals to or exceeds the predetermined value, the support shaft 146 rides up the wedging portions 143a while resiliently deforming the lock spring 160, and moves at the long hole 124 in the front/rear direction.

The relation among the clearance (a) in the front/rear direction between the lock plate 39 and the rear end surface 14b of the inner flange 14 or between the lock plate 39 and the front end surface 14c of the inner flange 14, the clearance (b) in the front/rear direction between the lock plate 39 and the rear end surface 16c of the outer flange 16 or between the lock plate 39 and the front end surface 16d of the outer flanges 16, and a movable distance of the support shaft 146 from the central portion of the wedging portion 143a, is identical to that of the first embodiment. Accordingly, the operation of the seat slide apparatus in a case where, for example, the vehicle collision (the front collision or the rear collision) occurs, is identical to that of the first embodiment, and therefore the explanation of the operation is omitted. In addition, the idea or concept about the predetermined value F, at which the support shaft 146 starts to move relative to the long hole 143, is identical to that of the first embodiment.

As explained in detail above, according to this embodiment, the effects and advantages (1) to (3) and (5) to (7) of the first embodiment, and (1) of the second embodiment are obtained.

The aforementioned embodiments may be modified as follows. In the first embodiment, the bracket 17 may be omitted and the support shaft 22 may be fixedly attached directly to the upper rail 4.

In the first embodiment, relation of the arrangement of the bracket 17 (or the upper rail 4) and the lock lever 30, and the support shaft 22 and the long hole 35 may be reversed. In this case, instead of the long hole 35, a long hole which is formed in a groove configuration and is not continuous in the width direction may be provided at the bracket 17 (or the upper rail 4).

In the first embodiment, the wedging portion 53 is provided at the lock spring 50. However, the wedging portion may be provided at the long hole 35 instead of being provided at the lock spring 50. Alternatively, the wedging portion may be provided at the long hole 35 in addition to being provided at the lock spring 50. In the first embodiment, part (the wedging portion 53) of the lock spring 50 is used for biasing the support shaft 22. However, the support shaft 22 may be biased by a support shaft biasing member (for example, a formed wire spring and/or a plate spring) which is provided separately from the lock spring 50.

In the first embodiment, the support shaft 22 is biased downwardly by the support shaft biasing member (the wedging portion 53). However, a direction of biasing the support shaft 22 may be arbitrarily changed as long as the biasing direction intersects with a direction in which the long hole 35 extends (the direction of the relative movement).

In the first embodiment, the clearance a1 and the clearance a2 may be different from each other. Similarly, the clearance b1 and the clearance b2 may be different from each other. In the first embodiment, one or both of the clearance a1, b1 and the clearance a2, b2 may be set to be equivalent to each other. Alternatively, one or both of the clearance a1, b1 and the clearance a2, b2 may be set so that a magnitude relation between the clearance a1, b1 and the clearance a2, b2 is reversed.

In the first and third embodiments, the lock lever where the stem portion 31, 150 and the lock plate 39 are formed integrally with each other may be employed. In the second embodiment, the support shaft 116 may be fixed indirectly to the upper rail 111 via an appropriate bracket.

In the second embodiment, relation of the arrangement of the upper rail 111 and the lock lever 120, and the support shaft 116 and the long hole 124 may be reversed. In this case, instead of the long hole 124, a long hole which is formed in a groove configuration and is not continuous in the width direction may be provided at the upper rail 111.

In the second embodiment, the wedging portion 124a is provided at the long hole 124. However, the wedging portion may be provided at the handle spring 135 instead of being provided at the long hole 124. Alternatively, the wedging portion may be provided at the handle spring 135 in addition to being provided at the long hole 124. In the second embodiment, part of the handle spring 135 is used for biasing the support shaft 116. However, the support shaft 116 may be biased by a support shaft biasing member (for example, a formed wire spring and/or a plate spring) which is provided separately from the handle spring 135.

In the second embodiment, the support shaft 116 is biased downwardly by the support shaft biasing member (the handle spring 135). However, a direction of biasing the support shaft 116 may be arbitrarily changed as long as the biasing direction intersects with a direction in which the long hole 124 extends (the direction of the relative movement).

In the second embodiment, the clearance a11 and the clearance a12 may be different from each other. Similarly, the clearance b11 and the clearance b12 may be different from each other. In the second embodiment, one or both of the clearance a11, b11 and the clearance a12, b12 may be set to be equivalent to each other. Alternatively, one or both of the clearance a11, b11 and the clearance a12, b12 may be set so that a magnitude relation between the clearance a11, b11 and the clearance a12, b12 is reversed.

In the second embodiment, the lock lever may include a flat plate portion or flat plate portions which is formed separately from the lock lever and is fixedly attached to the lock lever. In the third embodiment, the bracket 140 may be omitted and the support shaft 146 may be supported directly at the upper rail 4.

In the third embodiment, relation of the arrangement of the bracket 140 (or the upper rail 4) and the lock lever 30, and the support shaft 146 and the long hole 143 may be reversed. In the third embodiment, the wedging portion 143a is provided at the bracket 140. However, the wedging portion may be provided at the lock spring 160. Alternatively, the wedging portion may be provided at the lock spring 160 in addition to being provided at the bracket 140.

In the third embodiment, part of the lock spring 160 is used for biasing the support shaft 146. However, the support shaft 146 may be biased by a support shaft biasing member (for example, a formed wire spring and/or a plate spring) which is provided separately from the lock spring 160.

In the third embodiment, the support shaft 146 is biased downwardly by the support shaft biasing member (the lock spring 160). However, a direction of biasing the support shaft 146 may be arbitrarily changed as long as the biasing direction intersects with a direction in which the long hole 143 extends (the direction of the relative movement).

In each of the aforementioned embodiments, a timing when the locking protrusion 13b starts to deform so as to incline in the front/rear direction may be a timing when the flat plate portion starts to bite into the inner flange (the rear end surface 14b or the front end surface 14c) or a timing when the flat plate portion starts to bite into the outer flange (the rear end surface 16*c* or the front end surface 16*d*), or alternatively, may be an intermediate timing which is between the timing when the flat plate portion starts to bite into the inner flange and the timing when the flat plate portion starts to bite into the outer flange.

In each of the aforementioned embodiments, instead of the locking hole 39*b* of the lock plate 39, a locking groove which opens in the width direction may be employed. That is, the lock plate formed in a comb teeth-configuration, where the locking grooves are arranged like teeth of a comb, may be used. In each of the aforementioned embodiments, in the locked state in which the relative movement of the lower rail 3 and the upper rail relative to each other is locked, the clearance b between the outer flange (the rear end surface 16*c* or the front end surface 16*d*) and the flat plate portion at each of the outer openings 16*b* may be set to be equivalent to the movable distance r of the support shaft at, that is, within the long hole, or may be set to be greater than the movable distance r of the support shaft at the long hole.

In each of the aforementioned embodiments, the guide portions 16*a* do not need to be provided at the outer flanges of the upper rail. In this case, the outer opening may be formed in such a manner that the flat plate portion is allowed to pass through the outer flange in the width direction over an entire range of a rotation range of the lock lever (the flat plate portion). In this case, the outer opening may be a cut-out opening upwardly or may be an opening (hole) that is closed in the upward direction. In addition, in this case, the inclined portions (39*c*) do not need to be provided at the edge portions of the flat plate portion in the width direction.

In each of the aforementioned embodiments, the support shaft does not need to be arranged at the central portion of the long hole in the long-side direction thereof. For example, the support shaft may be in contact with or closer to the front end of the long hole so that the support shaft is movable at the long hole only in the vehicle rear direction, and may be in contact with or closer to the rear end of the long hole so that the support shaft is movable at the long hole only in the vehicle front direction.

In each of the aforementioned embodiments, the clearance a may be substantially zero. However, for absorbing variations occurring during an assembling work, it is more ideal that a certain amount of clearance is set as the clearance a. In each of the aforementioned embodiments, the lock spring may be configured to include one extending portion 51, 131, 161. Alternatively, the lock spring may be configured to include the extending portion 51, 131, 161 constituted by plural extending portions which are independent from each other.

In each of the aforementioned embodiments, for example, a coil spring and/or a plate spring may be employed as the lock spring. In each of the aforementioned embodiments, the handle spring may be configured to include one extending portion 66, 136. Alternatively, the handle spring may be configured to include the extending portion 66, 136 constituted by plural extending portions which are independent from each other.

In each of the aforementioned embodiments, for example, a coil spring and/or a plate spring may be employed as the handle spring. In each of the aforementioned embodiments, the lower rail 3 may include a structure where plural pieces of plate material which are joined to each other by, for example, welding. In addition, the cross section of each of the lower rails 3 is an example and not limited thereto as long as the lower rail 3 includes a pair of flanges provided with the locking protrusion.

In each of the aforementioned embodiments, the upper rail may include a structure where plural pieces of plate material which are joined to each other by, for example, welding. In addition, the cross section of each of the upper rails is an example and not limited thereto as long as the upper rail includes the pair of inner flanges at which the respective inner openings are provided and the pair of outer flanges at which the respective outer openings are provided.

In each of the aforementioned embodiments, relation of fixation (that is, relation of the arrangement in the up/down direction) of the lower rail and the upper rail, and the vehicle floor 2 and the seat 5 may be reversed. In this case, the operation for releasing the lock lever that is arranged at a side of the vehicle floor 2 may be conducted from an appropriate operation member via, for example, a cable.

In each of the aforementioned embodiments, the lower rail and the upper rail (the seat slide apparatus for a vehicle) may include a configuration that one each of the lower rail and the upper rail is arranged relative to the seat 5, or a configuration that three or more of the lower rails and three or more of the upper rails are arranged relative to the seat 5.

In each of the aforementioned embodiments, the direction of the relative movement of the lower rail and the upper rail relative to each other may be, for example, the vehicle width direction. In this case, the relative movement in a case of a lateral collision of the vehicle is effectively restricted.

In the first embodiment, instead of the restriction protruding portion 39*d*, a restriction member for restricting a movement of the lock plate 39 relative to the upper rail 4 in the width direction may be separately provided at the lock plate 39. In addition, the restriction protruding portion 39*d* of the lock plate 39 may be omitted.

In the first embodiment, the inclined portions 39*c* may not be provided at the respective edge portions of the lock plate 39 in the width direction.

In the first embodiment, a circular hole instead of the long hole 35 may be formed at the stem portion 31 of the lock lever 30. Then, the support shaft 22 is inserted and fitted to the circular hole so that the lock lever 30 is rotatably connected to the upper rail 4 (the bracket 17). In this case, however, at a time when the lock plate 39 of the lock lever 30 makes contact with the inner flanges 14, specifically, the rear end surfaces 14*b* or the front end surfaces 14*c*, because of the movement of the lock lever 30 in the front/rear direction in association with a vehicle collision, for example, the support shaft 22 may be deformed. Relation of the arrangement of the bracket 17 (or the upper rail 4) and the lock lever 30, and the support shaft 22 and the circular hole may be reversed.

A fourth embodiment of this disclosure will be explained next. According to the fourth embodiment, similar components and members to those of the first embodiment bear the same reference numerals. Hereunder, a vehicle front/rear direction will be referred to as "a front/rear direction".

As illustrated in FIG. 1, the lower rail 3 is fixed at the vehicle floor 2 so as to extend in the front/rear direction. The upper rail 4 is attached to or mounted on the lower rail 3 so as to be movable in the front/rear direction relative to the lower rail 3. That is, in this embodiment, a long-side direction (a direction of the relative movement) of the lower rail 3 and the upper rail 4 coincides with the front/rear direction.

As also illustrated in FIG. 2, the lower rails 3 (i.e., first and second lower rails) are provided as a pair and the upper rails 4 (i.e., first and second upper rails) are provided as a pair, in a width direction (that is, in FIG. 1, a direction that is orthogonal to a paper surface on which FIG. 1 is drawn). Here, the lower rail 3 and the upper rail 4 which are arranged on the left side when facing the front direction are illustrated. The seat 5, which forms or includes a seating portion for an occupant, is fixedly supported at the upper rails 4. Normally, the relative movement of the lower rails 3 and the upper rails 4 relative to each other is in a locked state, and the release handle 6 serving as an operation handle for releasing the locked state is provided at the apparatus.

As illustrated in FIG. 2, the lower rail 3 is made of plate material, and includes the pair of side wall portions 11 and the bottom wall portion 12. The side wall portions 11 are provided at respective sides of the lower rail 3 in the width direction and extend in an up/down direction. The bottom wall portion 12 connects base ends (that is, lower ends) of the respective side wall portions 11 to each other. The flange 13 is continuously formed at a distal end (that is, an upper end) of each of the side wall portions 11. The flange 13 projects inwardly in the width direction and is folded back towards the base end of the corresponding side wall portion 11.

At an intermediate portion in the long-side direction of each of the flanges 13 (i.e., first and second flanges) of the lower rail 3, the plural cut-outs 13*a* are provided. The cut-outs 13*a* are formed upwardly from a distal end (that is, a lower end) of the flange 13 and are spaced away from each other for a predetermined distance in the long-side direction. The locking protrusion 13*b* formed in a rectangular-shaped tooth is provided between every adjacent cut-outs 13*a*. Thus, the plural locking protrusions 13*b* are arranged at the lower rail 3 in the long-side direction thereof so as to be spaced away from each other by the predetermined distance.

On the other hand, the upper rail 4 is made of plate material, and includes the pair of inner flanges 14 (i.e., the first and second inner flanges) and the cover wall portion 15 as illustrated in FIGS. 3A and 3B. The pair of inner flanges 14 is arranged to extend in the up/down direction between the flanges 13 of the lower rail 3. The cover wall portion 15 connects base ends (that is, upper ends), which are away from the lower rail 3, of the inner flanges 14 to each other. The outer flange 16 is continuously formed at a distal end (that is, a lower end) of each of the inner flanges 14. The outer flange 16 projects outwardly in the width direction and is folded back so as to be surrounded by the corresponding side wall portion 11 and the flange 13.

That is, the lower rail 3 includes a rail cross section formed in a shape of a letter U, the upper rail 4 includes a rail cross section formed in a shape of a letter U, and opening sides of the cross sections of the lower rail 3 and the upper rail 4 face each other. The lower rail 3 and the upper rail 4 are prevented from coming off from each other in the up/down direction mainly by means of engagement of the flanges 13 and the outer flanges 16 with each other. A rail cross section formed by the lower rail 3 and the upper rail 4 is a so-called box shape including a rectangular shape. The lower rail 3, in cooperation with the upper rail 4, defines the space portion S.

The plurality of balls 20*a* are arranged so as to be interposed between a lower end portion of each of the outer flanges 16 and the lower end portion of the corresponding side wall portion 11, and between an upper end portion of each of the outer flanges 16 and the upper end portion of the corresponding side wall portion 11. At the upper end portion of each of the outer flanges 16, the guide portion 16*a* is provided. The guide portion 16*a* is formed in an arc shape by being bent inwardly in the width direction towards an upper side so that the guide portion 16*a* matches an outer shape of the ball 20*a*.

As illustrated in FIG. 2 and FIG. 3, each of the balls 20*a* is attached to the holder 20*b* which is made of resin and is arranged to extend in the front/rear direction (that is, a rail long-side direction). The balls 20*a* are arranged at a front end portion of each holder 20*b* as a pair and at a rear end portion of each holder 20*b* as a pair. That is, in this embodiment, for example, four of the balls 20*a* are arranged at each holder 20*b*. The upper rail 4 is supported at the lower rail 3 so as to be slidable in the long-side direction (that is, the front/rear direction) relative to the lower rail 3 in a manner that the balls 20*a* are rolled between the upper rail 4 and the lower rail 3.

The inner opening 14*a* (i.e., the inner opening 14*a*) formed in a substantially rectangular shape is provided at an intermediate portion, in the long-side direction, of each of the inner flanges 14 of the upper rail 4. The outer opening 16*b* (i.e., the outer opening portion) formed in a substantially rectangular shape is provided at the upper end portion (that is, the guide portion 16*a*) of each of the outer flanges 16 of the upper rail 4 so that a position of the outer opening 16*b* matches a position of the corresponding inner opening 14*a* in the long-side direction. The inner opening 14*a* and the outer opening 16*b* are in communication with each other in the width direction. Specifically, each of the outer openings 16*b* corresponds to a cut-out which opens also in an upward direction.

The bracket 17 is attached to the cover wall portion 15 of the upper rail 4, at a forward portion relative to the inner opening 14*a* and the like. The bracket 17 includes the pair of support wall portions 18 extending in the up/down direction between the inner flanges 14 of the upper rail 4, and the ceiling plate portion 19 connecting base ends (that is, upper ends), which are away from the lower rail 3, of the support wall portions 18 to each other. In a state where the support wall portions 18 are interposed between the inner flanges 14 of the upper rail 4 in the width direction, the bracket 17 is fastened to the cover wall portion 15 of the upper rail 4 at the ceiling plate portion 19. The shaft attachment hole 18*a* formed in a circular shape is provided at a front end lower portion of each of the support wall portions 18. The shaft attachment holes 18*a* provided at the respective support wall portions 18 are concentric relative to each other and are in communication with each other in the width direction.

As illustrated in FIG. 3B, the support shaft 22 formed in a cylindrical shape is supported at the support wall portions 18 of the bracket 17. End portions of the support shaft 22 are secured at the respective shaft attachment holes 18*a* by insertion. A central line (an axis line) of the support shaft 22 extends in the width direction. At an inner side of the support wall portions 18 in the width direction, the lock lever 30 is rotatably connected to an inside of the upper rail 4 by means of the support shaft 22.

Specifically, as illustrated in FIG. 2, the lock lever 30 includes the stem portion 31 made of plate material extending in the front/rear direction. The stem portion 31 is arranged in a standing condition in a manner that the pair of longitudinal wall portions 32 each extending in the long-side direction of the stem portion 31 are arranged side by side in the width direction. A distance between the longitudinal wall portions 32 in the width direction is set to be smaller than a distance between the support wall portions 18 of the bracket 17 in the width direction. At front end portions of the respective longitudinal wall portions 32, upper end edges of the longitudinal wall portions 32 are connected to each other in the width direction via the plural (for example, three) connection walls 33 which are arranged side by side in the front/rear direction. At rear end portions of the respective longitudinal wall portions 32, the upper end edges of the longitudinal wall portions 32 are connected to each other in the width direction via the ceiling plate portion 34.

Figure 19A:
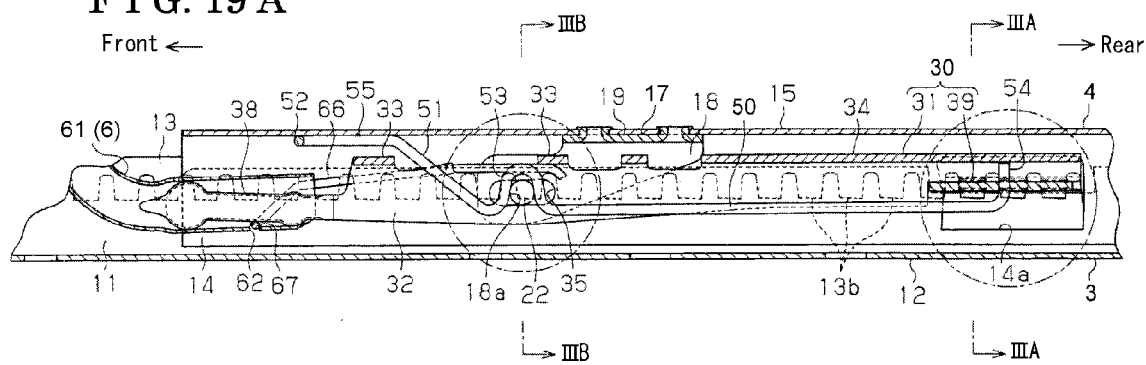
FIGS. 19A, 19B and 19C are section views illustrating the seat slide apparatus according to the fourth embodiment.
Figure 19B:
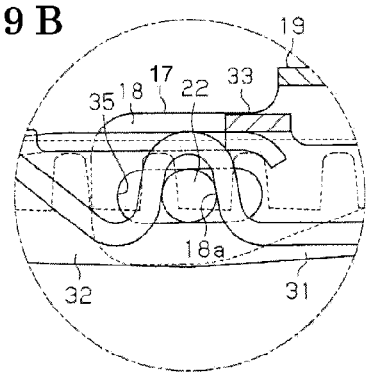

As illustrated in FIGS. 19A and 19B, the long hole 35 (i.e., the elongated hole) is provided at each of the longitudinal wall portions 32. The long hole 35 is formed so that the elongated shape thereof extends in the front/rear direction and is provided at a height position which is equivalent to a height position of the support shaft 22 (the shaft attachment holes 18*a*). In this embodiment, the long hole 35 is, for example, a through hole. An opening width of the long hole 35 in a short-side direction (that is, the up/down direction) is set to be equivalent to a diameter of the support shaft 22. The support shaft 22, of which end portions are secured at the respective shaft attachment holes 18*a*, is inserted in the long holes 35 in a state where the longitudinal wall portions 32 of the stem portion 31 are interposed between the support wall portions 18 of the bracket 17 in the width direction. Thus, the stem portion 31 is connected to the upper rail 4 (the bracket 17) so as to be rotatable in the up/down direction relative to the upper rail 4 (the bracket 17) in a state where the stem portion 31 is allowed to move in the front/rear direction in a range of the long hole 35.

As illustrated in FIG. 2, the stem portion 31 includes the pair of insertion configuration portions 36, 37 each extending from a front end of each of the longitudinal wall portions 32 towards the vehicle front. The insertion configuration portions 36, 37 are formed to be reduced in size towards a downward direction relative to the front ends of the longitudinal wall portions 32. The insertion configuration portions 36, 37 are formed so as to come closer to each other in the width direction, in which the insertion configuration portions 36, 37 face each other, in a manner that the insertion configuration portions 36, 37 overlap with each other, thereby forming the handle insertion portion 38.

The pair of engagement pieces 32*a* is provided at the rear end portion of each of the longitudinal wall portions 32. The engagement pieces 32*a* are arranged to be away from each other in the front/rear direction and to protrude downwardly from a lower end of the rear end portion of each of the longitudinal wall portions 32. On the other hand, the lock lever 30 includes the lock plate 39 (i.e., the flat plate portion) extending or spreading in the front/rear direction and in the width direction in a manner that the lock plate 39 passes through the inner openings 14*a* and the outer openings 16*b*. At the lock plate 39, the engagement hole 39*a* which is formed in a slit-shape and opens in the up/down direction is provided at four positions in total so that the engagement holes 39*a* face the respective engagement pieces 32*a*. The engagement pieces 32*a* engage in the corresponding engagement holes 39*a* and fixed thereat, and thus the lock plate 39 is fixed at the stem portion 31.

In addition, the plural, for example, three locking holes 39*b* (i.e., the lock holes) are provided at the lock plate 39, at an outer side in the width direction relative to each pair of engagement pieces 32*a*. The locking holes 39*b* are arranged side by side in the front/rear direction while being away from each other in the front/rear direction by the predetermined distance. As illustrated in FIG. 3A, each of the locking holes 39*b* opens in the up/down direction to face the corresponding flange 13. The locking holes 39*b*, which are arranged side by side in the front/rear direction, are arranged at positions configured to match or conform to the plural (three) locking protrusions 13*b* that are adjacent to each other in the long-side direction of the lower rail 3.

As illustrated in FIG. 3A with the solid lines, in a case where the lock lever 30 rotates about the support shaft 22 so that the lock plate 39 rises, the corresponding locking protrusion 13*b* are engageable in each of the locking holes 39*b*. In a case where the locking protrusions 13*b* are engaged in the corresponding locking holes 39*b*, the relative movement of the lower rail 3 and the upper rail 4 relative to each other is locked. On the other hand, as illustrated in FIG. 3A with the double-dotted lines, in a case where the lock lever 30 rotates about the support shaft 22 so that the lock plate 39 lowers, each of the locking holes 39*b* is set to come out of, that is, to disengage from the corresponding locking protrusion 13*b*. At this time, the locking imposed on the relative movement of the lower rail 3 and the upper rail 4 with each other, that is, the state where the relative movement of the lower rail 3 and the upper rail 4 relative to each other is locked (locked state of the relative movement), is released.

A dimension of the lock plate 39 in the width direction is set to be greater than a distance in the width direction between the guide portions 16*a* of the upper rail 4 and to be smaller than a distance in the width direction between the outer flanges 16, which are positioned lower than the guide portions 16*a*. Accordingly, the lock plate 39 passes through the outer openings 16*b* in the width direction in a state where the relative movement of the lower rail 3 and the upper rail 4 relative to each other is locked, however, the lock plate 39 does not interfere with the outer flanges 16 in a state where the locking imposed on the relative movement of the lower rail 3 and the upper rail 4 relative to each other is released.

As illustrated in FIG. 2 and FIG. 4, the lock spring 50 (i.e., the biasing member and the support shaft biasing member) made of a single wire rod is arranged in the upper rail 4. The lock spring 50 is formed in a substantially letter-U-shape which opens rearward when viewed in a plan view. The lock spring 50 includes the pair of extending portions 51 extending in the front/rear direction and being left-right symmetrical to each other. The lock spring 50 includes the connection portion 52 connecting front edges of the front end portions, which are away from each other, of the respective extending portions 51 in the width direction. As illustrated in FIGS. 4A and 4B, the lock spring 50 includes the wedging portion 53 which is provided at an intermediate portion of each of the extending portions 51 in the long-side direction thereof. The wedging portion 53 is formed in a curved shape made by bending the intermediate portion of the extending portion 51 upwardly. The lock spring 50 includes the lever-side lock end portion 54 formed by bending a rear end portion of each of the extending portions 51 upwardly. In addition, the front end portions, which are away from each other, of the respective extending portions 51 and the connection portion 52 make up a substantially pentagonal-shape as a whole, thereby forming the rail-side lock end portion 55.

The lock spring 50 is arranged substantially in the stem portion 31 in a manner that the rail-side lock end portion 55 protrudes upwardly from between the adjacent connection walls 33 of the stem portion 31, at a front side relative to the support shaft 22. The lock spring 50 is supported at, for example, the upper rail 4 in a manner that the support shaft 22 is inserted in and held at the wedging portions 53, and that the wedging portions 53 hold the support shaft 22 from above the support shaft 22, the lever-side lock end portions 54 are fixed at the lock plate 39 by insertion through the lock plate 39 from below the lock plate 39, and the rail-side lock end portion 55 is in contact with a bottom surface of the cover wall portion 15 of the upper rail 4. At this time, at the rear end portions of the extending portions 51, the lock spring 50 biases or pushes the lock lever 30 so that the lock lever 30 rotates towards a side at which the lock plate 39 rises, that is, the side at which the locking protrusions 13*b* engage in the corresponding locking holes 39*b*. In addition, by means of a reaction force of the biasing force acting on the lock lever 30, at the wedging portion 53, the lock spring 50 biases the support shaft 22 in a downward direction, that is, in a direction intersecting with the long-side direction of the long hole 35. Thus, the lock spring 50 locks movement of the support shaft 22 in the front/rear direction within the long hole 35.

That is, the support shaft 22 is biased by the wedging portions 53 of the lock spring 50, and thus a position of the support shaft 22 in the front/rear direction within the long hole 35 is retained by the wedging portions 53 of the lock spring 50. In this embodiment, the support shaft 22 is biased and is kept at a central portion of the long hole 35 in the front/rear direction. However, in a case where a load applied in the front/rear direction equals to or exceeds a predetermined value, the support shaft 22 moves at the long hole 35, that is, within the long hole, in the front/rear direction while the support shaft 22 resiliently deforming the wedging portions 53.

Figure 19C:
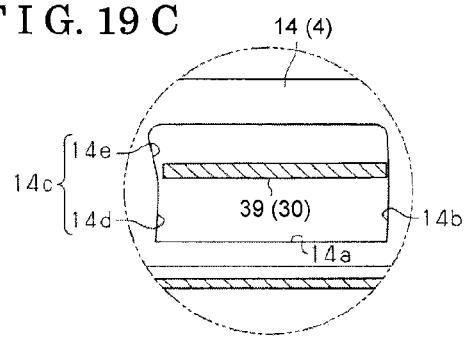

As illustrated in FIG. 19C, a rear end surface 14b of each of the inner flanges 14 at the inner openings 14a is formed in an arc shape whose center corresponds to the support shaft 22 (the shaft attachment hole 18a). Accordingly, a clearance between the lock plate 39 and each of the rear end surfaces 14b in the front/rear direction is set to be constant regardless of a rotational position of the lock lever 30.

A lower portion of the front end surface 14c of each of the inner flanges 14 at each of the inner openings 14a relative to the lock plate 39 in the locked state of the relative movement between the lower rail 3 and the upper rail 4 forms a flat portion 14d. The flat portion 14d is formed so that respective ends thereof in the up/down direction are positioned on an arc relative to the support shaft 22, i.e., to the shaft attachment hole 18a. An upper portion of the front end surface 14c relative to the lock plate 39 in the locked state of the relative movement between the lower rail 3 and the upper rail 4 forms an inclined portion 14e serving as a negative angle portion and a resistance generating portion. The inclined portion 14e inclines so as to separate from the lock plate 39 in the forward direction of the vehicle at an upper side in the rotation direction of the lock plate 39 at which the relative movement between the lower rail 3 and the upper rail 4 is restricted. That is, the inclined portion 14e inclines to separate from the lock plate 39 along the rotation direction of the lock plate 39 from the locked state of the relative movement between the lower rail 3 and the upper rail 4 to a side at which the relative movement is locked.

Figure 20:
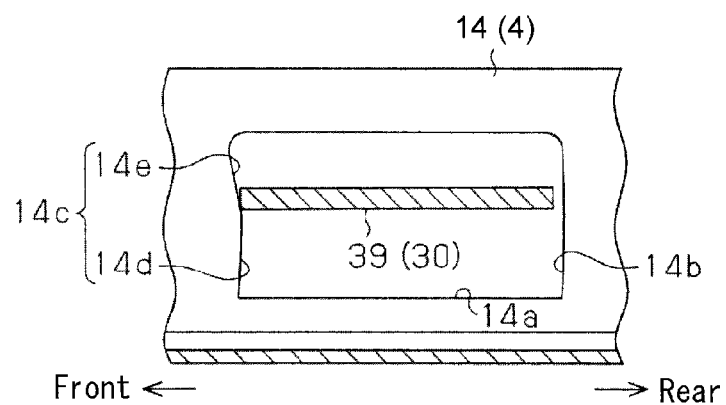
FIG. 20 is a section view illustrating operation of the seat slide apparatus according to the fourth embodiment.

Thus, in a case where the lock plate 39 (the lock lever 30) rotates downward, i.e., rotates to a side where the locked state of the relative movement is released, from the locked state of the relative movement, a clearance between the lock plate 39 and the front end surface 14c, i.e., the flat portion 14d, in the front/rear direction is set to be constant regardless of the rotational position of the lock lever 30. On the other hand, in a case where the lock plate 39 (the lock lever 30) rotates upward, i.e., to a side where the relative movement is restricted, from the locked state of the relative movement, the clearance between the lock plate 39 and the front end surface 14c, i.e., the flat portion 14d, in the front/rear direction is increasing while the lock plate 39 is rotating upwardly. That is, as illustrated in FIG. 20, a contact portion of each of the inner openings 14a with the lock plate 39 forms a negative angle by means of the inclined portion 14e.

As illustrated in FIG. 2, the release handle 6 is made of pipe material or tube material by means of bending and forming. The release handle 6 is arranged at a front side relative to the upper rails 4 in a manner that the release handle 6 apparently bridges the upper rails 4 with each other in the width direction. The distal end portion 61 (i.e., an end portion) extending rearward from a rear portion of the release handle 6 is formed in a flat cylindrical configuration which is reduced in size in the width direction. The distal end portion 61 includes an inner diameter, in the width direction, which is greater than a dimension of the handle insertion portion 38 in the width direction. The distal end portion 61 includes an outer diameter, in the width direction, which is smaller than a distance between the inner flanges 14 of the upper rail 4 in the width direction. The distal end portion 61 is inserted in the upper rail 4 from a front-side opening edge of the upper rail 4 and the handle insertion portion 38 is inserted in the distal end portion 61, and thus the distal end portion 61 is connected to the lock lever 30. Thus, basically, the distal end portion 61 rotates about the support shaft 22 integrally with the lock lever 30. The support groove 62 formed in a slit configuration and extending in the width direction is provided at a lower portion of the distal end portion 61.

The handle spring 65 made of a single wire rod is arranged in the upper rail 4. The handle spring 65 is formed in a substantially letter-U-shape which opens rearward when viewed in a plan view. The handle spring 65 includes the pair of extending portions 66 extending in the front/rear direction and being left-right symmetrical to each other. The handle spring 65 includes the connection portion 67 connecting the front ends of the respective extending portions 66 in the width direction.

As illustrated in FIG. 19A, the handle insertion portion 38 is inserted in the distal end portion 61 (the release handle 6), and the connection portion 67 of the handle spring 65 engages in the support groove 62 of the distal end portion 61 (the release handle 6). Rear end portions of the respective extending portions 66 are in contact with a bottom surface of the connection wall 33 of the lock lever 30 (the stem portion 31) at a vehicle rear-side relative to the support shaft 22. At the support groove 62, the distal end portion 61 is biased by the handle spring 65 so as to rise.

A front end portion of the handle insertion portion 38 inserted in the distal end portion 61 is supported at a vehicle front-side relative to the support groove 62 (that is, a biasing point at which the distal end portion 61 is biased by the handle spring 65) so as to be pivotable or movable in the up/down direction, and is biased at the support groove 62 upwardly by the handle spring 65. Thus, a posture of the distal end portion 61 is controlled.

In a case where a front end of the distal end portion 61 is lifted upwardly, the lock lever 30, together with the distal end portion 61, rotates about the support shaft 22 towards a side at which the lock plate 39 is lowered, that is, the side at which each of the locking holes 39b disengages from the corresponding locking protrusion 13b, against the biasing force of the lock spring 50.

Here, in a case where an operation force applied to the release handle 6 is released, the lock lever 30, together with the distal end portion 61 (the release handle 6), is rotated about the support shaft 22 by the biasing force of the lock spring 50 towards a side at which the lock plate 39 rises, that is, the side at which each of the locking holes 39b engages in the corresponding locking protrusion 13b in the above-explained manner. Thus, the relative movement of the lower rail 3 and the upper rail 4 relative to each other is locked. Accordingly, a position, in the front/rear direction, of the seat 5 supported by the upper rails 4 is maintained.

After this, in a case where the release handle 6 is operated so that a front end thereof is lifted upwardly, the lock lever 30, together with the distal end portion 61 (the release handle 6), rotates about the support shaft 22 towards the side at which the lock plate 39 is lowered, that is, the side at which each of the locking holes 39b disengages from the corresponding locking protrusion 13b, against the biasing force of the lock spring 50. Thus, the locking which is imposed on the relative movement of the lower rail 3 and the upper rail 4 relative to each other is released in the above-explained manner.

Accordingly, the position of the seat 5 supported at the upper rails 4 can be adjusted in the front/rear direction.

Figure 21A:
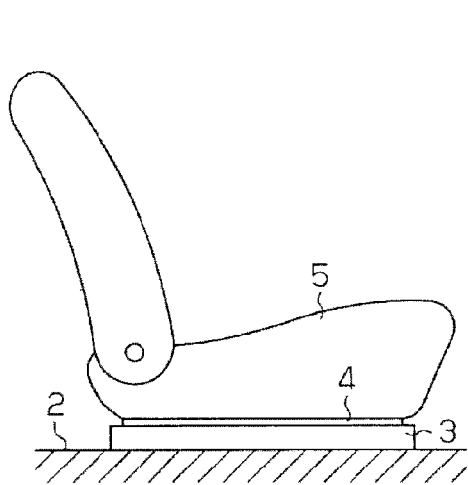
FIGS. 21A and 21B are schematic views illustrating the operation of the seat slide apparatus according to the fourth embodiment.
Figure 21B:
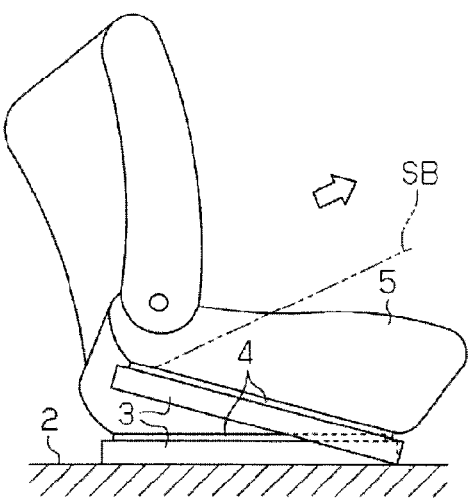

An operation of the seat slide apparatus according to the fourth embodiment will be explained. As indicated in a change from FIG. 21A to FIG. 21B, in a case where a large load is inputted to the seat 5 in the forward direction of the vehicle in association with a vehicle collision (front collision), for example, a rear end of one of the upper rails 4 at which an end portion of a seatbelt SB, i.e., a belt anchor, is attached may be lifted up together with the lower rail 3 relatively movably connected to the aforementioned upper rail 4, which may result in a deformation of the vehicle floor 2 that is peeled up. At this time, because both the lock levers 30 (i.e., first and second lock levers) hold and maintain the positions thereof by the rigidity of the release handle 6, one of the lock levers 30 supported by the upper rail 4 that is lifted up is brought to the same state as the state in which the lock lever 30 rotates in the direction where the locked state of the relative movement between the lower rail 3 and the upper rail 4 is released.

At the same time, a contact reaction force generated between the lower rail 3 that is likely to move in a relatively rearward direction of the vehicle and the lock lever 30 acts as a load for moving the lock lever 30 in the forward direction of the vehicle. Thus, the lock lever 30 is likely to move in the forward direction relative to the upper rail 4. At this time, in a case where the load applied to the seat 5 in the forward direction of the vehicle equals to or exceeds the predetermined value, the restriction of the movement of the support shaft 22 within the long hole 35 by the wedging portions 53 is released while the lock spring 50 is elastically or resiliently deformed. The lock lever 30 moves forward during an idle movement of the support shaft 22 within the long hole 35.

Then, the lock plate 39 and both the inner openings 14a, specifically, the front end surfaces 14c, make contact with one another. A contact portion between each of the inner openings 14a and the lock plate 39 forms a negative angle by the inclined portion 14e. Thus, in order for the lock lever 30 to relatively rotate in the direction where the locked state of relative movement between the lower rail 3 and the upper rail 4 is released, the inner openings 14a, specifically, the flat portions 14d, are necessarily crushed or fractured. As a result, an operation force for releasing the locked state of the relative movement between the lower rail 3 and upper rail 4 increases rapidly to thereby restrain the lock lever 30 from relatively rotating in the direction where the locked state of the relative movement is released. The relative movement between the lower rail 3 and the upper rail 4 is restrained accordingly.

As explained in detail above, according to this embodiment, the following effects and advantages are obtained. (1) The operation force necessary for releasing the locked state of the relative movement between the lower rail 3 and the upper rail 4 increases rapidly by the inclined portions 14e in the event of a vehicle collision such as a frontal collision, for example, to thereby restrain the relative movement between the lower rail 3 and the upper rail 4. In addition, the seat 5 is restrained from moving in the front/rear direction of the vehicle. Further, the relative rotation of the lock lever 30 in the direction where the locked state of the relative movement of the lower rail 3 and the upper rail 4 is released may be restrained by a simple structure of negative angle portions obtained by the inclined portions 14e that are formed at the contact portions between the lock plate 39 and both the inner openings 14a.

(2) In the event of a vehicle collision (frontal collision), for example, the operation force necessary for releasing the locked state of the relative movement between the lower rail 3 and the upper rail 4 may increase rapidly by the inclined portions 14e including extremely simple configurations. (3) The inclined portions 14e inhibit the lock lever 30 from rotating in the direction where the locked state of the relative movement between the lower rail 3 and the upper rail 4 is released at the lock plate 39 that is positioned away from the rotation center of the lock lever 30, i.e., an engagement position between the lock lever 30 and the locking protrusions 13b. Thus, as compared to a case where the inclined portions 14e are provided in the vicinity of the rotation center of the lock lever 30 (the support shaft 22), for example, the relative rotation of the lock lever 30 in the direction where the locked state of the relative movement is released may be further effectively restrained.

In this embodiment, the lock lever 30, which is rotatably connected to the upper rail 4 via the support shaft 22, is movable in the front/rear direction in the range of the long hole 35. In a case where the load applied in the front/rear direction is below the predetermined value F, the support shaft 22, which is biased by the lock spring 50, is restricted by the wedging portions 53 from moving in the front/rear direction at the long hole 35. Then, the lock lever 30 is restricted from moving relative to the upper rail 4 in the front/rear direction. Thus, the backlash of the upper rail 4 and the lock lever 30 in the front/rear direction, that is, the backlash of the lower rail 3 and the upper rail 4 in the front/rear direction is reduced. Then, without being strict about an opening width in the front/rear direction between the support shaft 22 and the long hole 35, backlash (or vibrations) of the seat 5 in the front/rear direction is reduced.

(4) In a case where a large load is applied to the seat 5 in the forward direction of the vehicle by a vehicle collision, for example, in the locked state of the relative movement between the upper rail 4 and the lower rail 3, and the load applied in the forward direction is equal to or greater than the predetermined value, the restriction of the movement of the support shaft 22 within the long hole 35 by the wedging portions 53 is released while the lock spring 50 is elastically or resiliently deformed. The lock lever 30 moves in the forward direction of the vehicle during the idle movement of the support shaft 22 within the long hole 35. Then, the inner openings 14a, specifically, the inclined portions 14e, and the lock plate 39 make contact with one another. Therefore, in a case where the operation force for releasing the locked state of the relative movement between the lower rail 3 and the upper rail 4 increases rapidly, the deformation of the support shaft 22 may be minimized or eliminated by the movement of the support shaft 22 within the long hole 35. The locked state of the relative movement between the lower rail 3 and the upper rail 4 by the lock lever 30 may be further stabilized.

(5) In the fourth embodiment, the support shaft 22, which is biased by the lock spring 50, is restricted from moving in the front/rear direction at the long hole 35 by using the wedging portions 53 each including the extremely simple configuration. In addition, a restriction force for restricting the support shaft 22 from moving in the front/rear direction at the long hole 35 may be changed easily by adjusting, for example, the apex angle of each of the wedging portions 53, the friction coefficient between the support shaft 22 and the wedging portions 53, and the biasing force of the lock spring 50.

(6) In the fourth embodiment, the movement of the support shaft 22 in the front/rear direction at the long hole 35 is restricted without changing a configuration of the lock lever 30 because the wedging portions 53 are provided at the lock spring 50.

A fifth embodiment of this disclosure will be explained. According to the fifth embodiment, configurations for making each of the contact portions between the lock plate 39 and both the inner openings 14a to form a negative angle are changed. An explanation of similar configurations of the fifth embodiment to those of the fourth embodiment will be omitted.

Figure 22A:
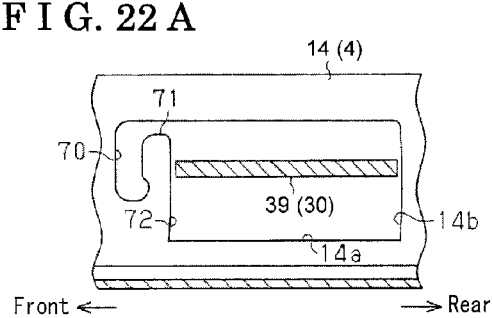
FIGS. 22A and 22B are section views illustrating operations of the seat slide apparatus according to the fifth embodiment.

According to the fifth embodiment, as illustrated in FIG. 22A, a substantially L-shaped groove portion 70 is formed at each of the inner openings 14a by extending downwardly from an upper front edge. In addition, in conformity to the shape of the groove portion 70, a projecting portion 71 (i.e., the resistance generating portion and the negative angle portion) is formed in a cantilever manner to be supported at a lower end. The projecting portion 71 projects along the rotation direction of the lock plate 39 from a side at which the locked state of the relative movement between the lower rail 3 and the upper rail 4 is released to a side at which the relative movement is locked. An end surface 72 of the projecting portion 71 opposing the rear end surface 14b is formed in an arc with the center of the support shaft 22, i.e., the shaft attachment hole 18a. Therefore, a clearance between the lock plate 39 and the end surface 72 in the front/rear direction is set to be constant regardless of the rotation position of the lock lever 30.

In a case where a large load is inputted to the seat 5 in the forward direction of the vehicle in association with a vehicle collision (frontal collision), for example, the rear end of one of the upper rails 4 at which the end portion of the seatbelt SB, i.e., the belt anchor, is attached may be lifted up together with the lower rail 3 relatively movably connected to the aforementioned upper rail 4, which may result in a deformation of the vehicle floor 2 that is peeled up. At this time, when the load applied to the seat 5 in the forward direction of the vehicle is equal to or greater than the predetermined value, the restriction of the movement of the support shaft 22 within the long hole 35 by the wedging portions 53 is released while the lock spring 50 is elastically or resiliently deformed. The lock lever 30 moves forward during the idle movement of the support shaft 22 within the long hole 35. Then, the lock plate 39 and both the inner openings 14a, i.e., the end surfaces 72 of the projecting portions 71, make contact with one another.

Figure 22B:
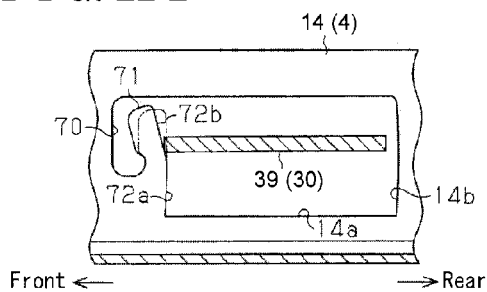

At this time, as illustrated in FIGS. 22A and 22B, each of the projecting portions 71 is deformed by inclining, specifically, forwardly inclining, so that the contact portion of the inner opening 14a with the lock plate 39 forms a negative angle. Specifically, a lower portion 72a of the end surface 72 of the projecting portion 71 positioned at a lower side than the lock plate 29 in the locked state of the relative movement between the lower rail 3 and the upper rails 4 is maintained to be formed in an arc with the center of the support shaft 22. On the other hand, an upper portion 72b of the end surface 72 of the projecting portion 71 positioned at an upper side than the lock plate 29 in the locked state of the relative movement inclines so as to separate from the lock plate 39 in the forward direction of the vehicle towards an upper side in the rotation direction of the lock plate 39 at which the relative movement between the lower rail 3 and the upper rail 4 is restricted. Accordingly, in a case where the lock plate 39 of the lock lever 30 rotates upwardly from the state in which the relative movement between the lower rail 3 and the upper rail 4 is locked, a clearance between the lock plate 39 and the end surface 72 of the projecting portion 71 in the front/rear direction increases in association with the rotation of the lock plate 39 upwardly.

Therefore, in order to relatively rotate the lock lever 30 in the direction where the locked state of the relative movement between the lower rail 3 and the upper rail 4 is released, the inner openings 14a, specifically, the lower portions 72a, are necessarily crushed or fractured. The operation force required for releasing the locked state of the relative movement increases rapidly, which restrains the relative rotation of the lock lever 30 in the direction where the locked state of the relative movement is released. The relative movement between the lower rail 3 and the upper rail 4 is restrained accordingly.

According to the fifth embodiment, in addition to the effects of (1), (3) to (6) of the fourth embodiment, the following effect may be obtained. (1) Before the projecting portion 71 (the inner opening 14a) makes contact with the lock plate 39, i.e., before the deformation of the projecting portion 71, a clearance between the projecting portion 71 and the lock plate 39 is maintained substantially at constant regardless of the rotation position of the lock lever 30. Consequently, the operation of the lock plate 39 in a normal state may be further stabilized.

A sixth embodiment of this disclosure will be explained. According to the sixth embodiment, configurations for rapidly increasing the operation force to release the locked state of the relative movement between the lower rail 3 and the upper rail 4 at the contact portions between the inner openings 14a and the lock plate 39 are changed. An explanation of similar configurations of the sixth embodiment to those of the fourth embodiment will be omitted.

Figure 23A:
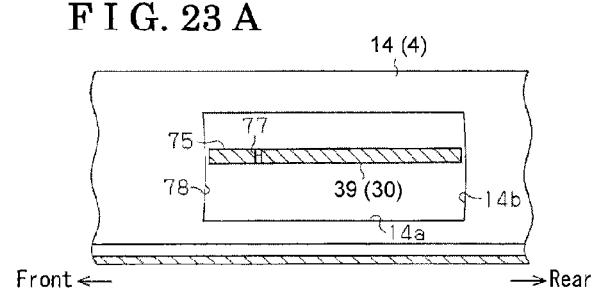
FIGS. 23A and 23B are section views illustrating the seat slide apparatus according to the sixth embodiment.
Figure 23B:
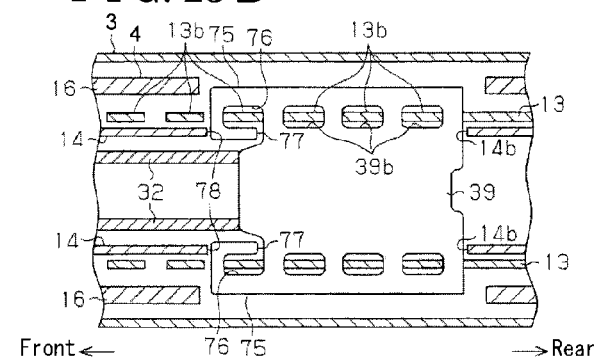

As illustrated in FIGS. 23A and 23B, a pair of extension walls 75 substantially in a U-shape in a plan view is formed at the lock plate 39 to be positioned further forward than the most forward locking holes 39b. In addition, locking holes 76 (i.e., the lock holes) are formed at respective center portions of the extension walls 75. Each of the locking holes 76 opens in up/down direction, i.e., in a vertical direction, while facing each of the flanges 13. The locking holes 76 and the other locking holes 39b in the rear of the locking holes 76 are arranged so as to be engageable with the plural locking protrusions 13b, specifically, four locking protrusions 13b, adjacent to one another in the front/rear direction of the lower rail 3. In a case where the locking protrusions 13b are fitted to engage with the corresponding locking holes 39b and 76, the relative movement between the lower rail 3 and the upper rail 4 is restricted.

A cut portion 77 is formed at an inner side in the width direction of a rear end of each of the locking holes 76 so as to extend inwardly in the width direction. That is, the cut portion 77 is formed at a contact portion between the lock plate 39 and each of the inner openings 14a obtained in a case where a load applied to the front/rear direction of the vehicle equals to or exceeds the predetermined value F. Accordingly, each of the locking holes 76 opens inwardly in the width direction via the cut portion 77. The cut portion 77 is arranged to face the inner flange 14 (the inner opening 14a) in the front/rear direction.

According to the sixth embodiment, a front end surface 78 of the inner flange 14 is formed in an arc with the center of the support shaft 22, i.e., the shaft attachment hole 18a. Thus, a clearance between the lock plate 39, specifically, the extension wall 75, and the front end surface 78 in the front/rear direction is constant regardless of the rotation position of the lock lever 30.

In a case where a large load is inputted to the seat 5 in the forward direction of the vehicle by a vehicle collision (frontal collision), for example, the rear end of one of the upper rails 4 at which the end portion of the seatbelt SB, i.e., the belt anchor, is attached may be lifted up together with the lower rail 3 relatively movably connected to the aforementioned upper rail 4, which may result in a deformation of the vehicle floor 2 that is peeled up. At this time, in a case where the load applied to the seat 5 in the forward direction of the vehicle equals to or exceeds the predetermined value, the restriction of the movement of the support shaft 22 within the long hole 35 by the wedging portions 53 is released while the lock spring 50 is elastically or resiliently deformed. The lock lever 30 moves forward during the idle movement of the support shaft 22 within the long hole 35. Then, the inner openings 14a, specifically, the front end surfaces 78, and the extension walls 75 of the lock plate 39 make contact with one another.

Figure 24:
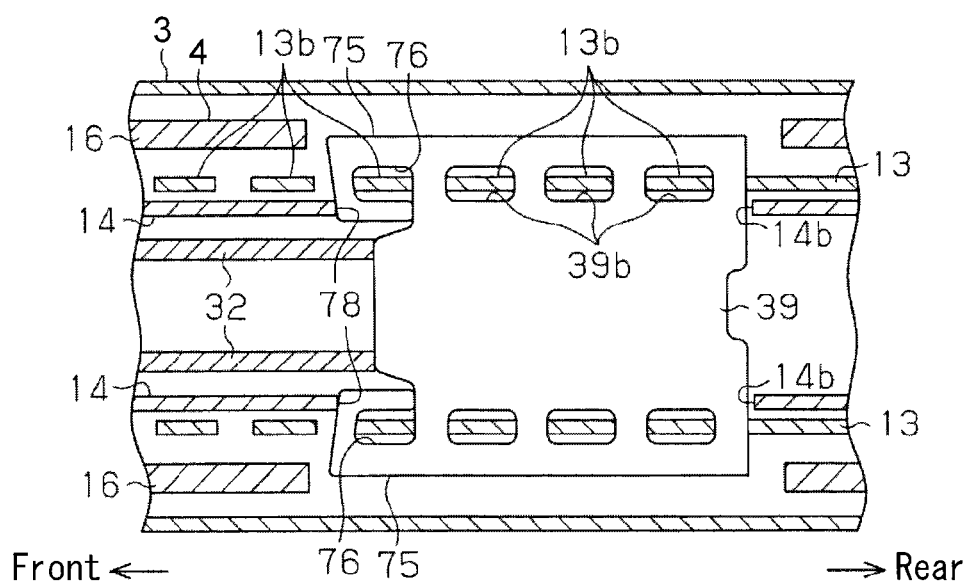
FIG. 24 is a section view illustrating operation of the seat slide apparatus according to the sixth embodiment.
Figure 25:
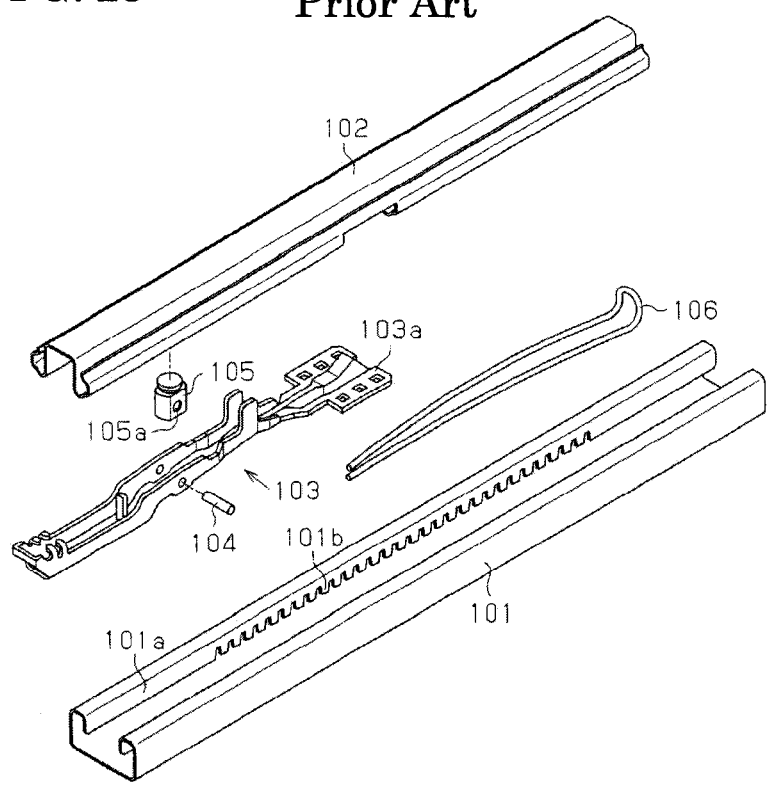
FIG. 25 is an exploded perspective view illustrating a known seat slide apparatus for a vehicle.
Figure 26:
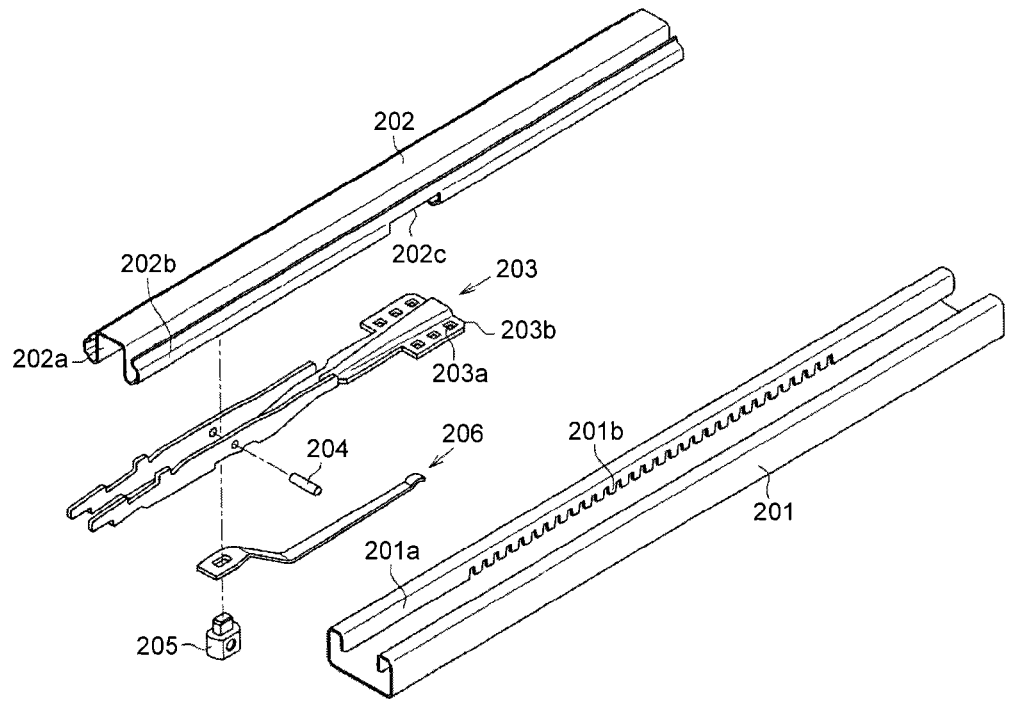
FIG. 26 is an exploded perspective view illustrating another known seat slide apparatus for a vehicle.
Figure 27:
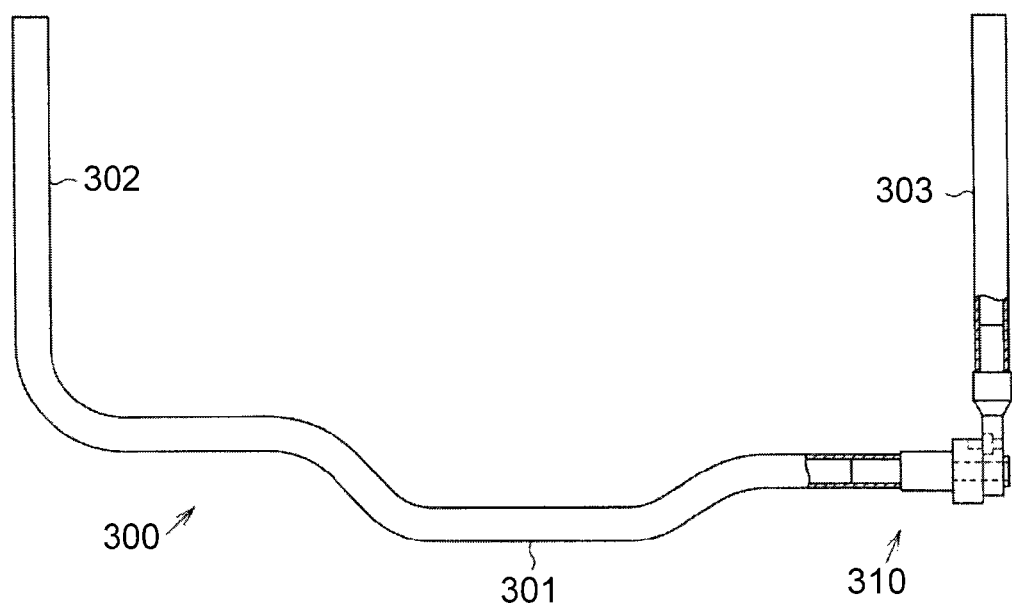
FIG. 27 is a plan view of an operation lever illustrating a still another known seat slide apparatus for a vehicle.

In this case, as indicated in a change from FIG. 23b to FIG. 24, the extension walls 75 are pressed against the respective front end surfaces 78 so that the locking protrusions 13b inserted and fitted to the locking holes 76 are wrapped and wound by the respective extension walls 75 because of the cut portions 77, which induces the deformation of each of the locking holes 76. Therefore, a friction force between each of the locking holes 76 and each of the locking protrusions 13b increases rapidly, which leads to a rapid increase of the operation force necessary for releasing the locked state of the relative movement between the lower rail 3 and the upper rail 4. The relative rotation of the lock lever 30 in the direction in which the locked state of the relative movement between the lower rail 3 and the upper rail 4 is released is restrained. The relative movement between the lower rail 3 and the upper rail 4 is retrained accordingly.

According to the sixth embodiment, the following effect may be obtained in addition to the effects of (1) to (6) according to the fourth embodiment.

(1) In the sixth embodiment, in a case of a vehicle collision such as a frontal collision, for example, the operation force for releasing the locked state of the relative movement between the lower rail 3 and the upper rail 4 increases rapidly by the cut portions 77. Thus, the relative movement between the lower rail 3 and the upper rail 4 is restrained to further restrain the movement of the seat 5 in the front/rear direction. In addition, the relative rotation of the lock lever 30 in the direction where the locked state of the relative movement between the lower rail 3 and the upper rail 4 is released is retrained by a simple structure of the cut portions 77 provided at the contact portions between the lock plate 39 and the inner openings 14a, specifically, the extension walls 75.

The aforementioned fourth to sixth embodiments may be modified as follows. According to the aforementioned fourth embodiment, the seat 5 is arranged to face forward in the vehicle. Alternatively, the seat 5 may be arranged to face rearward in the vehicle. In a case where a large load is inputted to the seat 5 in the forward direction of the vehicle in association with a vehicle collision (front collision), for example, the rear end of one of the upper rails 4 at which the end portion of the seatbelt SB, i.e., the belt anchor, is attached may be lifted up together with the lower rail 3 relatively movably connected to the aforementioned upper rail 4, which may result in a deformation of the vehicle floor 2 that is peeled up. At this time, the operation force for releasing the locked state of the relative movement between the lower rail 3 and the upper rail 4 increases rapidly by the inclined portions 14e to restrain the relative movement between the lower rail 3 and the upper rail 4. The seat 5 is restrained to move in the front/rear direction accordingly.

According to the aforementioned fifth embodiments, the seat 5 is arranged to face forward in the vehicle. Alternatively, the seat 5 may be arranged to face rearward in the vehicle. In a case where a large load is inputted to the seat 5 in the forward direction of the vehicle in association with a vehicle collision (front collision), for example, the rear end of one of the upper rails 4 at which the end portion of the seatbelt SB, i.e., the belt anchor, is attached may be lifted up together with the lower rail 3 relatively movably connected to the aforementioned upper rail 4, which may result in a deformation of the vehicle floor 2 that is peeled up. At this time, the operation force for releasing the locked state of the relative movement between the lower rail 3 and the upper rail 4 increases rapidly by the contact portions between the inner openings 14a and the lock plate 39, specifically, the end surfaces 72 of the projecting portions 71 to thereby restrain the relative movement between the lower rail 3 and the upper rail 4. The seat 5 is restrained from moving in the front/rear direction accordingly.

According to the aforementioned sixth embodiment, the seat 5 is arranged to face forward in the vehicle. Alternatively, the seat 5 may be arranged to face rearward in the vehicle. In a case where a large load is inputted to the seat 5 in the forward direction of the vehicle in association with a vehicle collision (front collision), for example, the rear end of one of the upper rails 4 at which the end portion of the seatbelt SB, i.e., the belt anchor, is attached may be lifted up together with the lower rail 3 relatively movably connected to the aforementioned upper rail 4, which may result in a deformation of the vehicle floor 2 that is peeled up. At this time, the operation force for releasing the locked state of the relative movement between the lower rail 3 and the upper rail 4 increases rapidly by the cut portions 77 to thereby restrain the relative movement between the lower rail 3 and the upper rail 4. The seat 5 is restrained from moving in the front/rear direction accordingly.

In the sixth embodiment, the number of the locking holes 39b formed in the rear of the locking holes 76 may be arbitrary specified. In addition, instead of the locking holes 39b of the lock plate 39, locking grooves opening in the width direction may be used. That is, the lock plate in a comb-tooth form may be used.

In each of the fourth to sixth embodiments, as long as the outer flanges 16 are inhibited from making contact with the lock plate 39, the outer openings 16b may not be necessarily formed at the outer flanges 16 (the guide portions 16a). In addition, the support shaft 22 does not need to be arranged at the central portion of the long hole 35 in the long-side direction thereof. For example, the support shaft 22 may be in contact with or closer to the front end of the long hole 35 so that the support shaft 22 is movable within the long hole 35 only in the vehicle rear direction, and may be in contact with or closer to the rear end of the long hole 35 so that the support shaft 22 is movable within the long hole 35 only in the vehicle front direction.

In each of the fourth to sixth embodiments, the bracket 17 may be omitted and the support shaft 22 may be fixedly attached directly to the upper rail 4. In addition, relation of the arrangement of the bracket 17 (or the upper rail 4) and the lock lever 30, and the support shaft 22 and the long hole 35 may be reversed. In this case, instead of the long hole 35, a long hole which is formed in a groove configuration and is not continuous in the width direction may be provided at the bracket 17 (or the upper rail 4).

In each of the fourth to sixth embodiments, the wedging portion 53 is provided at the lock spring 50. Alternatively, the wedging portion may be provided at the long hole 35 instead of being provided at the lock spring 50. Further, alternatively, the wedging portion may be provided at the long hole 35 in addition to being provided at the lock spring 50. In addition, part (the wedging portion 53) of the lock spring 50 is used for biasing the support shaft 22. Alternatively, the support shaft 22 may be biased by a support shaft biasing member (for example, a formed wire spring and/or a plate spring) which is provided separately from the lock spring 50.

In each of the fourth to sixth embodiments, the support shaft 22 is biased downwardly by the support shaft biasing member (the wedging portion 53). However, a direction of biasing the support shaft 22 may be arbitrarily changed as long as the biasing direction intersects with a direction in which the long hole 35 extends (the direction of the relative movement).

In each of the fourth to sixth embodiments, the lower rail may include a structure where plural pieces of plate material which are joined to each other by, for example, welding. In addition, the cross section of each of the lower rails is an example. In addition, the upper rail may include a structure where plural pieces of plate material which are joined to each other by, for example, welding. In addition, the cross section of each of the upper rails is an example and not limited thereto as long as the upper rail includes the pair of inner flanges at which the respective inner openings are provided and the pair of outer flanges at which the respective outer openings are provided.

In each of the fourth to sixth embodiments, the lock lever where the stem portion 31 and the lock plate 39 are formed integrally with each other may be employed. In addition, the lock spring may be configured to include one extending portion 51. Alternatively, the lock spring may be configured to include the extending portion 51 constituted by plural extending portions which are independent from each other.

In each of the fourth to sixth embodiments, for example, a coil spring and/or a plate spring may be employed as the lock spring. In addition, in a case where the rear end of one of the upper rails 4 at which the end portion of the seatbelt SB, i.e., the belt anchor, is attached is lifted up by a large load input to the seat 5 in the forward direction of the vehicle by a vehicle collision (frontal collision), for example, the vehicle floor 2 is deformed to cause the lower rail 3 relatively movably connected to the aforementioned upper rail 4 to be lifted up together with the upper rail 4. On the other hand, as long as the rigidity of the vehicle floor 2 is sufficient, a deformation occurs between the lower rail 3 and the upper rail 4 for separating the lower rail 3 and the upper rail 4 from each other. In this case, engagement portions between the inner openings 14a and the lock plate 39 are changed to the other side in the front/rear direction. Therefore, configurations for rapidly increasing the operation force to release the locked state of the relative movement between the upper rail 4 and the lower rail 3 may be provided at engagement portions at the other side.

In each of the fourth to sixth embodiments, in a case where the rear end of one of the upper rails 4 at which the end portion of the seatbelt SB, i.e., the belt anchor, is attached is lifted up by a large load input to the seat 5 in the forward direction of the vehicle by a vehicle collision (frontal collision), for example, i.e., in a case where the left and right upper rails 4 are distorted or twisted, the relative movement between the lower rail 3 and the upper rail 4 is effectively restrained. In a state where a cushion air bag (CAB) is mounted to a vehicle for lifting-up an occupant restraint device that is provided to inhibit an occupant in the seat 5 from falling out by slipping through the seatbelt SB by instantaneously inflating an airbag apparatus incorporated in a seat cushion of the seat 5 when a vehicle collision is detected, for example, the relative movement between the lower rail 3 and the upper rail 4 is also effectively restrained during the operation of the cushion air bag.

According to the aforementioned first to third embodiments, backlash of the lock member that locks a relative movement between the lower rail and the upper rail in the directions of the relative movement may be restrained without a deterioration of control of components, and the locked state of the relative movement between the lower rail and the upper rail by the lock member may be stabilized in a case where a large load is inputted in the directions of the relative movement. In addition, according to the aforementioned first embodiment, the relative movement between the lower rail and the upper rail may be restrained in a case where a large load is inputted in the directions of the relative movement. Further, according to the aforementioned fourth to sixth embodiments, the locked state of the relative movement between the pair of lower rails and the pair of upper rails by the lock member may be maintained by a simple structure in a case where the pair of upper rails, for example, is relatively distorted or twisted in association with an input of a large load.

According to the aforementioned first to third embodiments, the lock lever 30, 120 rotatably connected to the upper rail 4, 111 via the support shaft 22, 116, 146 is movable in the front/rear direction (i.e., in the first and second directions of the relative movement between the lower rail 3 and the upper rail 4, 111) in the range of the long hole 35, 124, 143. In a case where the load applied in the front/rear direction is below the predetermined value F, the support shaft 22, 116, 146 biased by the lock spring 50, 130, 160 is restricted by the wedging portions 53, 124a, 143a from moving in the front/rear direction at the long hole 35, 124, 143. The lock lever 30, 120 is restricted from moving relative to the upper rail 4, 111 in the front/rear direction. Accordingly, without being strict about an opening width in the front/rear direction between the support shaft 22, 116, 146 and the long hole 35, 124, 143, the backlash of the upper rail 4, 111 and the lock lever 30, 120 in the front/rear direction and further the backlash of the lower rail 3 and the upper rail 4, 111 in the front/rear direction may be restrained.)

In a case where the load applied in the front/rear direction (i.e., in one of the first and second directions of the relative movement between the lower rail 3 and the upper rail 4, 111) in association with a vehicle collision, for example, equal to or exceeds the predetermined value F in the locked state of the relative movement by the lock lever 30, 120, the restriction of the movement of the support shaft 22, 116, 146 in the front/rear direction at the long hole 35, 124, 143 by the wedging portions 53, 124a, 143a is released by the elastic deformation of the lock spring 50, 130, 160 (i.e., because the support shaft 22, 116, 146 resiliently deforms the lock spring 50, 130, 160). The support shaft 22, 116, 146 moves together with the upper rail 4, 111 or the lock lever 30, 120 at the long hole 35, 124, 143 in the front/rear direction. Thus, the lock plate (the flat plate portion) 39, 125 makes contact with the inner flanges 14, 112 or the outer flanges 16, 114 and the inner flanges 14, 112 or the outer flanges 16, 114 receive the load. Consequently, in a case where the load is supported sufficiently by the inner flanges 14, 112 or the outer flanges 16, 114, the deformation of the support shaft 22, 116, 146 may be reduced to be extremely small or to be none because the support shaft 22, 116, 146 moves at the long hole 35, 124, 143. Thus, the locking imposed by the lock lever 30, 120 on the relative movement may be more stabilized.

According to the aforementioned first to third embodiments, the restriction portion (wedging portions) 53, 124a, 143a is formed at at least one of the long hole 124, 143 and the lock spring 50, the restriction portion (wedging portions) 53, 124a, 143a serving as a wedging portion that makes pressure-contact with the support shaft 22, 116, 146.

Accordingly, each of the wedging portions 53, 124a, 143a including an extremely simple configuration may be used as the restriction portion. In addition, a restriction force for restricting the support shaft 22, 116, 146 from moving in the front/rear direction (i.e., in the first and second directions of the relative movement) at the long hole 35, 124, 143 is changeable by adjustments of, for example, the apex angle of each of the wedging portions 53, 124a, 143a, the friction coefficient between the support shaft 22, 116, 146 and the wedging portions 53, 124a, 143a, and the biasing force of the lock spring 50, 130, 160.

Accordingly, the wedging portion including an extremely simple configuration may be used as the restriction portion. In addition, a restriction force for restricting the support shaft from moving in the first and second directions of the relative movement at the elongated hole is changeable by adjustments of, for example, an apex angle of the wedging portion, a friction coefficient between the support shaft and the wedging portion, and a biasing force of the support shaft biasing member.

According to the aforementioned first to third embodiments, one of the clearance b between each of the outer flanges 16, 114 and the lock plate (flat plate portion) 39, 125 in each of the outer openings 16b and the clearance a between each of the inner flanges 14, 112 and the lock plate (flat plate portion) 39, 125 in each of the inner openings 14a in at least one of the first and second directions of the relative movement between the lower rail 3 and the upper rail 4, 111 (in the front/rear direction) is specified to be smaller than the movable distance r, r1 of the support shaft 22, 116, 146 within the long hole 35, 124, 143 in a state where the relative movement is locked by the lock lever 30, 120.

According to the aforementioned first to third embodiments, even in a case where the load applied in the front/rear direction (i.e., in one the first and second directions of the relative movement between the lower rail 3 and the upper rail 4, 111) in association with a vehicle collision, for example, equals to or exceeds the predetermined value F in the locked state of the relative movement by the lock lever 30, 120, the movement of the support shaft 2, 116, 146 is allowed in the range of the long hole 35, 124, 143 at least until the lock plate (the flat plate portion) 39, 125 makes contact with the inner flanges 14, 112 or the outer flanges 16, 114 and the inner flanges 14, 112 or the outer flanges 16, 114 receive the load. Therefore, as long as the inner flanges 14, 112 or the outer flanges 16, 114 sufficiently support the load, the support shaft 2, 116, 146 simply moves at the long hole 35, 124, 143 and the deformation of the support shaft 22, 116, 146 is extremely small or none. Therefore, the locking imposed by the lock lever 30, 120 on the relative movement is more stabilized.

Accordingly, even in a case where the load applied in one of the first and second directions of the relative movement between the first rail and the second rail in association with a vehicle collision, for example, equals to or exceeds the predetermined value in the locked state of the relative movement by the lock member, the movement of the support shaft is allowed in the range of the elongated hole at least until the flat plate portion makes contact with the inner flanges or the outer flanges and the inner flanges or the outer flanges receive the load. Therefore, as long as the inner flanges or the outer flanges sufficiently support the load, the support shaft simply moves at the elongate hole and the deformation of the support shaft is extremely small or none. Therefore, the locking imposed by the lock member on the relative movement is more stabilized.

According to the aforementioned first embodiment, the wedging portion 53 is formed at the lock spring 50.

Accordingly, the movement of the support shaft 2 in the front/rear direction (i.e., in the first and second directions of the relative movement between the lower rail 3 and the upper rail 4) at the long hole 35 may be restricted without changing a configuration of the upper rail 4 or the lock lever 30.

Accordingly, the movement of the support shaft in the first and second directions of the relative movement between the lower rail 3 and the upper rail 4 at the elongated hole may be restricted without changing a configuration of the second rail or the lock member.

According to the aforementioned second and third embodiments, the wedging portion 124a, 143a is formed at the long hole 124, 143.

Accordingly, each of the wedging portions 124a, 143a may be further accurately formed.

Accordingly, the wedging portion may be further accurately formed.

According to the aforementioned first embodiment, in a case where a large load in the front/rear direction (i.e., in one of the first and second directions of the relative movement between the lower rail 3 and the upper rail 4) is inputted as a result of, for example, a vehicle collision, in the locked state of the relative movement by the lock lever 30, and the lock lever 30 and the upper rail 4 are displaced in one of the front direction and the rear direction of the relative movement) by a deformation associated with the large load, the lock plate 39 makes contact with the inner flanges 14, each of which includes a smaller clearance a1, a2 with the lock plate 39, so that each of the inner flanges 14 receives the aforementioned load. Then, when the load in the front/rear direction further increases, the lock plate 39 fractures the inner flanges 14 and bites into the inner flanges 14. As a result, the rotation of the lock lever 30 is restricted. When the load in the front/rear direction further increases, the lock plate 39 makes contact with the outer flanges 16, each of which includes a larger clearance b1, b2 with the lock plate 39, so that each of the outer flanges 16 receives the load in cooperation with each of the inner flanges 14. Therefore, even in a case where the locking protrusions 13b are deformed by inclining in the other one of the front direction and the rear direction so that the contact angle of each of the locking protrusions 13b relative to the corresponding locking hole 39b increases, the rotation of the lock lever 30 is restricted to thereby restrain the relative movement between the lower rail 3 and the upper rail 4.)

According to the aforementioned first embodiment, the lock lever 30 is rotatably connected to the upper rail 4 in a state where the support shaft 22 fixed to one of the upper rail 4 and the lock lever 30 and including the axis line that extends in the width direction is inserted to be positioned within the long hole 35 formed at the other of the upper rail 4 and the lock lever 30 to be movable in the front/rear direction and is biased by the lock spring 50 in a direction orthogonal to the front/rear direction. The wedging portion 53 is formed at at least one of the long hole 35 and the lock spring 50 to make pressure-contact with the support shaft 22, the wedging portion 53 restricting the support shaft 22 from moving within the long hole 35 in the front/rear direction in a case where a load applied in one of the front and rear directions is smaller than the predetermined value F.

In a case where the load applied in the front/rear direction (i.e., in one of the first and second directions of the relative movement between the lower rail 3 and the upper rail 4, 111) in association with a vehicle collision, for example, equals to or exceeds the predetermined value F in the locked state of the relative movement by the lock lever 30, the restriction of the movement of the support shaft 22 in the front/rear direction at the long hole 35 by the wedging portions 53 is released by the elastic deformation of the lock spring 50 (i.e., because the support shaft 22 resiliently deforms the lock spring 50). The support shaft 22 moves together with the upper rail 4 or the lock lever 30 at the long hole 35 in the front/rear direction. Thus, the lock plate 39 makes contact with the inner flanges 14 or the outer flanges 16 and the inner flanges or the outer flanges receive the load. Consequently, in a case where the load is supported sufficiently by the inner flanges 14 or the outer flanges 16, the deformation of the support shaft 22 may be reduced to be extremely small or to be none because the support shaft 22 moves at the long hole 35. Thus, the locking imposed by the lock lever 30 on the relative movement may be more stabilized.

According to the aforementioned first embodiment, each of the outer flanges 16 includes the guide portion 16a at an upper end portion to bend inwardly in the width direction towards an upper side. The lock plate 39 includes the inclined portions 39c at the opposing edges in the width direction, each of the inclined portions 39c inclining from the inner side to the outer side in the width direction towards the upper side of each of the outer flanges 16 in a state where the relative movement between the lower rail 3 and the upper rail 4 is locked.

At the guide portions 16a, the outer flanges 16 are formed to come closer to the inner side in the width direction towards the distal end side (i.e., the upper side) of the outer flanges 16. However, at the inclined portions 39c of the lock plate 39, the edge portions (i.e., opposing edges) of the lock plate 39 in the width direction are formed to come closer to the distal end side of the outer flanges 16 towards the outer side in the width direction. Therefore, in a case where the lock plate 39 makes contact with the guide portion 16a of the outer flange 16 in the locked state of the relative movement between the lower rail 3 and the upper rail 4, the lock plate 39 intersects with the guide portion 16a at an angle which is closer to the right angle. As a result, engagement between the inclined portions 39c of the lock plate 39 and the guide portions 16a of the outer flanges 16 in a shearing direction in association with the contact between the inclined portions 39c and the guide portions 16a becomes more robust.

According to the aforementioned first embodiment, the seat slide apparatus further includes the restriction protruding portion 39d provided at the lock plate 39 to restrict the lock plate 39 from moving in the width direction relative to the upper rail 4.

Accordingly, the engagement and disengagement between the locking holes 39b and the corresponding locking protrusions 13b in association with the rotation of the lock lever 30 may be further stabilized. Specifically, the restriction protruding portion 39d is provided at the lock plate 39 (at a position at which the locking holes 39b and the locking protrusions 13b are engaged with each other) away from a rotation center of the lock lever 30. Therefore, it is prevented that a slight deviation of the restriction on the movement in the width direction is amplified or is made larger at the lock plate 39, which might occur in a case, for example, where the restriction protruding portion 39d is provided in a vicinity of the rotation center (the support shaft 22).

According to the aforementioned first embodiment, the clearance b between each of the outer flanges 16 and the lock plate 39 is specified to be smaller than the movable distance r of the support shaft 22 within the long hole 35 in the front/rear direction in a state where the relative movement is locked by the lock lever 30.

In a case where the load applied in the front/rear direction (i.e., in one of the first and second directions of the relative movement between the lower rail 3 and the upper rail 4) in association with a vehicle collision, for example, equals to or exceeds the predetermined value F in the locked state of the relative movement by the lock lever 30, the restriction of the movement of the support shaft 22 in the front/rear direction at the long hole 35 by the wedging portions 53 is released by the elastic deformation of the lock spring 50 (i.e., because the support shaft 22 resiliently deforms the lock spring 50). The support shaft 22 moves together with the upper rail 4 or the lock lever 30 at the long hole 35 in the front/rear direction. At this time, the movement of the support shaft 22 is allowed in the range of the long hole 35 at least until the lock plate 39 makes contact with the outer flanges 16 and the outer flanges 16 receive the load. Therefore, as long as the inner flanges 14 and the outer flanges 16 sufficiently support the load, the support shaft 22 simply moves at the long hole 35 and the deformation of the support shaft 22 is extremely small or none. Therefore, the locking imposed by the lock lever 30 on the relative movement is more stabilized.

According to the aforementioned fourth to sixth embodiments, in a case where a rear end of one of the upper rails 4 at which the end portion of the seatbelt SB is attached is lifted up in association with a vehicle collision, for example, and thus the lower rail 3 relatively movably connected to the aforementioned upper rail 4 or the vehicle floor 2 that supports the aforementioned lower rail 3 is deformed, the lock levers 30 hold and maintain the positions thereof by rigidity of the release handle 6. Therefore, one of the lock levers 30 supported by the aforementioned upper rail 4 is brought to the same state as the state in which the lock lever 30 rotates in the direction in which the locked state of the relative movement is released. At this time, in a case where the load applied to one of the front and rear directions of the vehicle equals to or exceeds the predetermined value F, the restriction of the movement of the support shaft 22 in the front/rear direction by the wedging portions 53 is released by the elastic deformation of the lock spring 50. The support shaft 22 moves in the front/rear direction at the long hole 35 together with the aforementioned upper rail 4 or lock lever 30. Then, the inner openings 14a and the lock plate 39 make contact with one another. Because the resistance generating portion (the inclined portion, the projecting portion) 71, 14e is provided at the contact portion between the lock plate 39 and each of the inner openings 14a, the lock lever 30 is restrained from rotating in the direction in which the locked state of the relative movement is released. As a result, the relative movement between the lower rails 3 and the upper rails 4 may be restrained. In addition, the relative rotation of each of the lock levers 30 in the direction in which the locked state of the relative movement is released may be restrained by a simple configuration achieved by the resistance generating portion (the inclined portion, the projecting portion) 71, 14e that is provided at the contact portion between the lock plate 39 and each of the inner openings 14a.)

According to the aforementioned fourth to sixth embodiments, in a case where a rear end of one of the upper rails 4 at which the end portion of the seatbelt SB is attached is lifted up by a vehicle collision, for example, and thus the lower rail 3 relatively movably connected to the aforementioned upper rail 4 or the vehicle floor 2 that supports the aforementioned lower rail 3 is deformed, the lock levers 30 hold and maintain the positions thereof by rigidity of the release handle 6. Therefore, one of the lock levers 30 supported by the aforementioned upper rail 4 is brought to the same state as the state in which the lock lever 30 rotates in the direction in which the locked state of the relative movement is released. At this time, in a case where the load applied to one of the front and rear directions of the vehicle equals to or exceeds the predetermined value F, the restriction of the movement of the support shaft 22 in the front/rear direction by the wedging portions 53 is released by the elastic deformation of the lock spring 50. The support shaft 22 moves in the front/rear direction at the long hole 35 together with the aforementioned upper rail 4 or lock lever 30. Then, the inner openings 14a and the lock plate 39 make contact with one another. The contact portions between the lock plate 39 and the inner openings 14a form a negative angle by the negative angle portions (the inclined portion, the projecting portion) 71, 14e. Thus, in order for each of the lock levers 30 to relatively rotate in the direction in which the locked state of relative movement is released, the inner openings 14a are necessarily crushed or fractured by the lock plate 39. An operation force for releasing the locked state of the relative movement increases rapidly, which restrains the relative rotation of the lock lever 30 in the direction where the locked state of the relative movement is released. As a result, the relative movement between the lower rails 3 and the upper rails 4 may be restrained. In addition, the relative rotation of each of the lock levers 30 in the direction in which the locked state of the relative movement is released may be restrained by a simple configuration achieved by each of the negative angle portions (the inclined portion, the projecting portion) 71, 14e that is provided at the contact portion between the lock plate 39 and each of the inner openings 14a.)

According to the aforementioned fourth embodiment, each of the negative angle portions is the inclined portion 14e that inclines to separate from the lock lever 30 along the rotation direction of the lock lever 30 from the locked state of the relative movement between the lower rails 3 and the upper rails 4 to a side at which the relative movement is locked.

Accordingly, the operation force for releasing the locked state of the relative movement increases rapidly by the inclined portion 14e including a simple configuration at a time of a vehicle collision, for example.

According to the aforementioned fifth embodiment, each of the negative angle portions is the projecting portion 71 supported at each of the inner openings 14a in a cantilever manner, each of the projecting portions 71 projecting along the rotation direction of the lock plate 39 from the locked state of the relative movement between the lower rails 3 and the upper rails 4 to a side at which the relative movement is locked.

Accordingly, at a time of a vehicle collision, for example, each of the inner openings 14a makes contact with the lock plate 39 via the projecting portion 71. At this time, the projecting portion 71 pressed by the lock plate 39 is deformed while inclining, which causes the contact portion between each of the inner openings 14a and the lock plate 39 to form a negative angle. That is, before the projecting portion 71 (the inner openings 14a) makes contact with the lock plate 39, i.e., before the deformation of the projecting portion 71, a clearance between the projecting portion 71 and the lock plate 39 is maintained at substantially constant regardless of the rotation position of each of the lock levers 30 to thereby further stabilize the operation of the lock lever 30 in a normal state.)

According to the aforementioned fourth to sixth embodiments, in a case where a rear end of one of the upper rails 4 at which the end portion of the seatbelt SB is attached is lifted up in association with a vehicle collision, for example, and thus the lower rail 3 relatively movably connected to the aforementioned upper rail 4 or the vehicle floor 2 that supports the aforementioned lower rail 3 is deformed, the lock levers 30 hold and maintain the positions thereof by rigidity of the release handle 6. Therefore, one of the lock levers 30 supported by the aforementioned upper rail 4 is brought to the same state as the state in which the lock lever 30 rotates in the direction in which the locked state of the relative movement is released. At this time, in a case where the load applied to one of the front and rear directions of the vehicle equals to or exceeds the predetermined value F, the restriction of the movement of the support shaft 22 in the front/rear direction by the wedging portions 53 is released by the elastic deformation of the lock spring 50. The support shaft 22 moves in the front/rear direction at the long hole 35 together with the aforementioned upper rail 4 or lock lever 30. Then, the inner openings 14a and the lock plate 39 make contact with one another. Because the cut portion 77 is provided at the contact portion between the lock plate 39 and each of the inner openings 14a, at least one of the locking holes 76 is deformed to cause at least one of the locking protrusions 13b to be wound. As a result, the operation force for releasing the locked state of the relative movement increases rapidly by a rapid increase of a friction force between the aforementioned locking hole 76 and the locking protrusion 13b, which may restrain the lock lever 30 from rotating in the direction in which the locked state of the relative movement is released. The relative movement between the lower rails 3 and the upper rails 4 may be restrained accordingly. In addition, the relative rotation of each of the lock levers 30 in the direction in which the locked state of the relative movement is released may be restrained by a simple configuration achieved by the cut portion 77 that is provided at the contact portion between the lock plate 39 and each of the inner openings 14a.)

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
    a first rail including first and second flanges arranged side by side in a width direction of the first rail, each of the first and second flanges including a plurality of locking protrusions at an end portion;
    a second rail connected to the first rail to be relatively movable to the first rail, the second rail including first and second inner flanges arranged side by side in the width direction at an inner side of the first and second flanges of the first rail in the width direction, the second rail including first and second outer flanges that are arranged to be extended outwardly from respective ends of the first and second inner flanges in the width direction to separate from each other and are arranged to be folded back at an outer side of the first and second flanges of the first rail in the width direction, the first and second inner flanges including inner opening portions respectively, the first and second outer flanges including outer opening portions respectively, the inner opening portions and the outer opening portions being connected to one another in the width direction;
    a lock member connected to the second rail to be rotatable about an axis line that extends in the width direction at an inner side of the first and second inner flanges in the width direction, the lock member including a flat plate portion that passes through the inner opening portions and the outer opening portions in the width direction and that includes lock portions with which the locking protrusions are engageable, the lock portions being formed at opposing ends of the flat plate portion in the width direction, the lock member selectively restricting a relative movement between the first rail and the second rail by engagement and disengagement between the lock portions and the corresponding locking protrusions in association with the rotation of the lock member;

a biasing member biasing the lock member to rotate in a direction to restrict the relative movement between the first rail and the second rail, the lock member being rotatably connected to the second rail in a state where a support shaft fixed to one of the second rail and the lock member and including the axis line that extends in the width direction is inserted to be positioned within an elongated hole formed at the other of the second rail and the lock member to be movable in first and second directions of the relative movement between the first rail and the second rail and is biased by a support shaft biasing member in a direction orthogonal to the first and second directions of the relative movement between the first rail and the second rail; and a restriction portion restricting the support shaft from moving within the elongated hole in the first and second directions of the relative movement between the first rail and the second rail in a case where a load applied in one of the first and second directions of the relative movement between the first rail and the second rail is smaller than a predetermined value.

2. The seat slide apparatus according to claim 1, wherein the restriction portion is formed at at least one of the elongated hole and the support shaft biasing member, the restriction portion serving as a wedging portion that makes pressure-contact with the support shaft.

3. The seat slide apparatus according to claim 1, wherein one of a clearance between each of the first and second outer flanges and the flat plate portion in each of the outer opening portions and a clearance between each of the first and second inner flanges and the flat plate portion in each of the inner opening portions in at least one of the first and second directions of the relative movement between the first rail and the second rail is specified to be smaller than a movable distance of the support shaft within the elongated hole in a state where the relative movement is locked by the lock member.

4. The seat slide apparatus according to claim 2, wherein the wedging portion is formed at the support shaft biasing member.

5. The seat slide apparatus according to claim 2, wherein the wedging portion is formed at the elongated hole.

6. A seat slide apparatus for a vehicle, comprising:
a first rail including first and second flanges arranged side by side in a width direction of the first rail, each of the first and second flanges including a plurality of locking protrusions at an end portion;
a second rail connected to the first rail to be relatively movable to the first rail, the second rail including first and second inner flanges arranged side by side in the width direction at an inner side of the first and second flanges of the first rail in the width direction, the second rail including first and second outer flanges that are arranged to be extended outwardly from respective ends of the first and second inner flanges in the width direction to separate from each other and are arranged to be folded back at an outer side of the first and second flanges of the first rail in the width direction, the first and second inner flanges including inner opening portions respectively, the first and second outer flanges including outer opening portions respectively, the inner opening portions and the outer opening portions being connected to one another in the width direction;

a lock member connected to the second rail to be rotatable about an axis line that extends in the width direction at an inner side of the first and second inner flanges in the width direction, the lock member including a flat plate portion that passes through the inner opening portions and the outer opening portions in the width direction and that includes lock portions with which the locking protrusions are engageable, the lock portions being formed at opposing ends of the flat plate portion in the width direction, the lock member selectively restricting a relative movement between the first rail and the second rail by engagement and disengagement between the lock portions and the corresponding locking protrusions in association with the rotation of the lock member; and a biasing member biasing the lock member to rotate in a direction to restrict the relative movement between the first rail and the second rail, wherein a clearance between each of the first and second outer flanges and the flat plate portion is specified to be greater than a clearance between each of the first and second inner flanges and the flat plate portion in at least one of first and second directions of the relative movement between the first rail and the second rail in a state where the relative movement is locked by the lock member.

7. The seat slide apparatus according to claim 6, wherein the lock member is rotatably connected to the second rail in a state where a support shaft fixed to one of the second rail and the lock member and including the axis line that extends in the width direction is inserted to be positioned within an elongated hole formed at the other of the second rail and the lock member to be movable in the first and second directions of the relative movement between the first rail and the second rail and is biased by a support shaft biasing member in a direction orthogonal to the first and second directions of the relative movement between the first rail and the second rail, and wherein a wedging portion is formed at at least one of the elongated hole and the support shaft biasing member to make pressure-contact with the support shaft, the wedging portion restricting the support shaft from moving within the elongated hole in the first and second directions of the relative movement between the first rail and the second rail in a case where a load applied in one of the first and second directions of the relative movement between the first rail and the second rail is smaller than a predetermined value.

8. The seat slide apparatus according to claim 6, wherein each of the first and second outer flanges includes a guide portion at an upper end portion to bend inwardly in the width direction towards an upper side, and wherein the flat plate portion includes inclined portions at opposing edges in the width direction, each of the inclined portions inclining from an inner side to an outer side in the width direction towards the upper side of each of the first and second outer flanges in a state where the relative movement between the first rail and the second rail is locked.

9. The seat slide apparatus according to claim 6, further comprising a widthwise restriction member provided at the flat plate portion to restrict the flat plate portion from moving in the width direction relative to the second rail.

10. The seat slide apparatus according to claim 7, wherein a clearance between each of the first and second outer flanges and the flat plate portion is specified to be smaller than a movable distance of the support shaft within the elongated hole in at least one of the first and second directions of the relative movement between the first rail and the second rail in a state where the relative movement is locked by the lock member.

11. A seat slide apparatus for a vehicle, comprising:
first and second lower rails arranged to be extended in a front/rear direction of a vehicle and arranged at opposing ends in a width direction of the vehicle;
first and second upper rails connected to the first and second lower rails to be movable to the first and second lower rails in the front/rear direction, each of the first and second upper rails including first and second inner flanges arranged side by side in the width direction, the first and second inner flanges including inner opening portions respectively that are connected to each other in the width direction;
first and second lock members connected to the first and second upper rails respectively, each of the first and second lock members being rotatable about an axis line that extends in the width direction at an inner side of the first and second inner flanges in the width direction, each of the first and second lock members including a flat plate portion that passes through the inner opening portions in the width direction, the first and second lock members selectively restricting a relative movement between the first and second lower rails and the first and second upper rails by rotating to engage and disengage relative to the lower rails;
first and second biasing members biasing the first and second lock members to rotate in a direction to restrict the relative movement between the first and second lower rails and the first and second upper rails;
an operation handle arranged to be extended in the width direction and including opposing end portions connected to the first and second lock members respectively, the operation handle being configured to transmit an operation force for releasing a locked state of the relative movement between the first and second lower rails and the first and second upper rails;
each of the first and second lock members being rotatably connected to each of the first and second upper rails in a state where a support shaft fixed to one of the first or second upper rail and the first or second lock member and including the axis line that extends in the width direction is inserted to be positioned within an elongated hole formed at the other of the first or second upper rail and the first or second lock member to be movable in the front/rear direction of the vehicle and is biased by a support shaft biasing member in a direction orthogonal to the front/rear direction of the vehicle;
a wedging portion formed at at least one of the elongated hole and the support shaft biasing member to make pressure-contact with the support shaft, the wedging portion restricting the support shaft from moving in the front/rear direction of the vehicle within the elongated hole in a case where a load applied in the front/rear direction of the vehicle is smaller than a predetermined value; and
a resistance generating portion provided at a contact portion between the flat plate portion and each of the first and second inner opening portions obtained in a state where a load applied to at least one of the front and rear directions of the vehicle exceeds the predetermined value, the resistance generating portion rapidly increasing an operation force for releasing the locked state of the relative movement between the first and second lower rails and the first and second upper rails.

12. A seat slide apparatus for a vehicle, comprising:
first and second lower rails arranged to be extended in a front/rear direction of a vehicle and arranged at opposing ends in a width direction of the vehicle;
first and second upper rails connected to the first and second lower rails to be movable to the first and second lower rails in the front/rear direction, each of the first and second upper rails including first and second inner flanges arranged side by side in the width direction, the first and second inner flanges including inner opening portions respectively that are connected to each other in the width direction;
first and second lock members connected to the first and second upper rails respectively, each of the first and second lock members being rotatable about an axis line that extends in the width direction at an inner side of the first and second inner flanges in the width direction, each of the first and second lock members including a flat plate portion that passes through the inner opening portions in the width direction, the first and second lock members selectively restricting a relative movement between the first and second lower rails and the first and second upper rails by rotating to engage and disengage relative to the lower rails;
first and second biasing members biasing the first and second lock members to rotate in a direction to restrict the relative movement between the first and second lower rails and the first and second upper rails;
an operation handle arranged to be extended in the width direction and including opposing end portions connected to the first and second lock members respectively, the operation handle being configured to transmit an operation force for releasing a locked state of the relative movement between the first and second lower rails and the first and second upper rails;
each of the first and second lock members being rotatably connected to each of the first and second upper rails in a state where a support shaft fixed to one of the first or second upper rail and the first or second lock member and including the axis line that extends in the width direction is inserted to be positioned within an elongated hole formed at the other of the first or second upper rail and the first or second lock member to be movable in the front/rear direction of the vehicle and is biased by a support shaft biasing member in a direction orthogonal to the front/rear direction of the vehicle;
a wedging portion formed at at least one of the elongated hole and the support shaft biasing member to make pressure-contact with the support shaft, the wedging portion restricting the support shaft from moving in the front/rear direction of the vehicle within the elongated hole in a case where a load applied in the front/rear direction of the vehicle is smaller than a predetermined value; and
first and second negative angle portions causing contact portions between the flat plate portion and the first and second inner opening portions obtained in a state where a load applied to at least one of the front and rear directions of the vehicle exceeds the predetermined value to form a negative angle.

13. The seat slide apparatus according to claim 12, wherein each of the first and second negative angle portions is an inclined portion that inclines to separate from the lock member along a rotation direction of the lock member from the locked state of the relative movement between the first and second lower rails and the first and second upper rails to a side at which the relative movement is locked.

14. The seat slide apparatus according to claim 12, wherein each of the first and second negative angle portions is a projecting portion supported at each of the first and second inner opening portions in a cantilever manner, each of the first and second negative angle portions projecting along a rotation direction of the flat plate portion from the locked state of the relative movement between the first and second lower rails and the first and second upper rails to a side at which the relative movement is locked.

15. A seat slide apparatus for a vehicle, comprising:
first and second lower rails arranged to be extended in a front/rear direction of a vehicle and arranged at opposing ends in a width direction of the vehicle, each of the first and second lower rails including first and second flanges that are arranged side by side in the width direction, each of the first and second flanges including a plurality of locking protrusions at an end portion;
first and second upper rails connected to the first and second lower rails to be movable relative to the first and second lower rails, each of the first and second upper rails including first and second inner flanges arranged side by side in the width direction at an inner side of the first and second flanges of each of the first and second lower rails in the width direction, the first and second inner flanges including inner opening portions respectively connected to each other in the width direction;
first and second lock members connected to the first and second upper rails to be rotatable about axis lines, each of the axis lines extending in the width direction at an inner side of the first and second inner flanges in the width direction, each of the first and second lock members including a flat plate portion that passes through the inner opening portions in the width direction and that includes lock holes with which the locking protrusions are engageable, the lock holes being formed at opposing ends of the flat plate portion in the width direction, the first and second lock members selectively restricting a relative movement between the first and second lower rails and the first and second upper rails by engagement and disengagement between the lock portions and the corresponding locking protrusions in association with the rotation of the first and second lock members;
first and second biasing members biasing the first and second lock members to rotate in a direction to restrict the relative movement between the first and second lower rails and the first and second upper rails;
an operation handle arranged to be extended in the width direction and including opposing end portions connected to the first and second lock members respectively, the operation handle being configured to transmit an operation force for releasing a locked state of the relative movement between the first and second lower rails and the first and second upper rails;
each of the first and second lock members being rotatably connected to each of the first and second upper rails in a state where a support shaft fixed to one of the first or second upper rail and the first or second lock member and including the axis line that extends in the width direction is inserted to be positioned within an elongated hole formed at the other of the first or second upper rail and the first or second lock member to be movable in the front/rear direction of the vehicle and is biased by a support shaft biasing member in a direction orthogonal to the front/rear direction of the vehicle;
a wedging portion formed at at least one of the elongated hole and the support shaft biasing member to make pressure-contact with the support shaft, the wedging portion restricting the support shaft from moving in the front/rear direction of the vehicle within the elongated hole in a case where a load applied in the front/rear direction of the vehicle is smaller than a predetermined value; and
a cut portion formed at a contact portion between the flat plate portion and each of the first and second inner opening portions obtained in a state where a load applied to at least one of the front and rear directions of the vehicle exceeds the predetermined value, the cut portion inducing a deformation of at least one of the lock holes with which at least one of the locking protrusions is engaged, the deformation of at least one of the lock holes causing at least one of the locking protrusions to be wound.

* * * * *